(12) United States Patent
Tighe

(10) Patent No.: US 6,934,905 B1
(45) Date of Patent: Aug. 23, 2005

(54) AUTOMATED DOCUMENT DRAFTING SYSTEM

(76) Inventor: Rodger W. Tighe, 47 Kensington Rd., Garden City, NY (US) 11530

( * ) Notice: Subject to any disclaimer, the term of this patent is extended or adjusted under 35 U.S.C. 154(b) by 0 days.

(21) Appl. No.: 09/465,143

(22) Filed: Dec. 16, 1999

(51) Int. Cl.[7] .......................... G06F 15/00; G06F 17/21; G06N 5/00; G06N 5/04
(52) U.S. Cl. ....................... 715/500; 715/505; 715/506; 715/507; 715/515; 715/530; 706/11; 706/45; 706/46; 706/60
(58) Field of Search ................................ 715/500, 505, 715/506, 507, 515, 530, 502; 706/11, 45, 46, 60

(56) References Cited

U.S. PATENT DOCUMENTS

| | | | |
|---|---|---|---|
| 5,006,998 A | | 4/1991 | Yasunobu et al. |
| 5,367,619 A | * | 11/1994 | Dipaolo et al. ............. 715/506 |
| 5,398,300 A | | 3/1995 | Levey |

(Continued)

OTHER PUBLICATIONS

Microsoft Corporation, Microsoft Visual Basic Programmer's Guide (1995), pp. 137–138.*
Capsoft, HotDocs 5 Features (Jul. 16, 1999).
Smartwords, The Technology Group (Apr. 13, 1999).
IQ DOCS, LLC, Intelligent Document Assembly, (Apr. 14, 1999).
RoboDocs (Apr. 13, 1999).
Legal Expert Systems Limited (Apr. 13, 1999).
MasterDraft (Apr. 13, 1999).
Legaldocs (Apr. 13, 1999).

*Primary Examiner*—Joseph Feild
*Assistant Examiner*—Chau Nguyen
(74) *Attorney, Agent, or Firm*—Ostrolenk, Faber, Gerb & Soffen, LLP

(57) ABSTRACT

A system for automated drafting of a customized document, the system interfacing with a word processing application having a plurality of word processing functionalities and with a database having a plurality of data base functionalities, the system including a user interface and controller having a plurality of programming functionalities, the user interface and controller interfacing with a user by presenting a sequence of requests to the user so that the user provides information necessary to prepare the document, the user interface and controller communicating with the data base whereby the data base supplies data stored in the data base to the user interface and controller, the data being provided to the user interface and controller for providing a format for the requests to the user and for preparing text in the document, the user interface and controller and the word processing application communicating so that the user interface and controller controls the word processing application to prepare and generate the document, wherein the user interface and controller comprises a program for providing the sequence of requests to the user to obtain the information from the user for the preparation of the document and further for manipulating the document using the word processing application in response to the information received from the user, and further wherein the sequence of requests is dynamically altered by the program in response to the information provided in response to previous requests, the program determining the next request of the dynamically alterable sequence of requests to be provided to the user and when and how to manipulate the document.

48 Claims, 66 Drawing Sheets

U.S. PATENT DOCUMENTS

| | | | |
|---|---|---|---|
| 5,485,551 A | 1/1996 | Ejima et al. | |
| 5,493,729 A | 2/1996 | Nigawara et al. | |
| 5,673,369 A | 9/1997 | Kim | |
| 5,729,751 A * | 3/1998 | Schoolcraft | 715/530 |
| 5,732,221 A * | 3/1998 | Feldon et al. | 705/3 |
| 5,787,234 A | 7/1998 | Molloy | |
| 5,819,248 A | 10/1998 | Kegan | |
| 5,819,249 A | 10/1998 | Dohanich et al. | |
| 5,822,745 A | 10/1998 | Hekmatpour | |
| 5,835,900 A | 11/1998 | Flagg, III et al. | |
| 5,893,914 A * | 4/1999 | Clapp | 715/507 |
| 5,960,419 A | 9/1999 | Flagg, III et al. | |
| 5,963,931 A | 10/1999 | Flagg, III et al. | |
| 5,978,784 A | 11/1999 | Flagg, III et al. | |
| 6,009,420 A | 12/1999 | Flagg, III et al. | |
| 6,018,732 A | 1/2000 | Bertrand | |
| 6,134,568 A * | 10/2000 | Tonkin | 715/526 |
| 6,226,656 B1 * | 5/2001 | Zawadzki et al. | 715/506 |
| 6,314,415 B1 * | 11/2001 | Mukherjee | 706/47 |
| 6,345,278 B1 * | 2/2002 | Hitchcock et al. | 707/100 |
| 6,473,892 B1 * | 10/2002 | Porter | 717/106 |

* cited by examiner

{—8A MERGEFORMAT}  {DATE\@MMMM d, yyyy" \}
{—8A        8C                                              8B
            )
        Re: {DOCVARIABLE "GeneralDefinition" \*MERGEFORMAT}
{—8A
                                                         8A
   You have requested that I provide to I the I referred to below {I—8A

III{—8A

I any of the following occur: I or ({SEQ level0\*arabic \*MERGEFORMAT}) any of the fees provided for in the Commitment Documents are not paid when due.

I

I

II and each of their respective directors, officers, employees, agents, attorneys and controlling persons (each an "Indemnified Person") from and against any and all losses, claims, liabilities and legal and other expenses which any Indemnified Person incurs in respect of investigating, defending or participating in any legal or other proceedings (commenced or threatened) related to or arising out of any of the Commitment Documents, or the proposed or actual use of the credit provided pursuant to the {DOCVARIABLE "GeneralDefinition" \*MERGEFORMAT} (whether or not any Indemnified Person is a party to any such proceeding), other than any of the foregoing claimed by any Indemnified Person to the extent finally determined by a court of competent jurisdiction to have resulted directly and primarily from the gross negligence or willful misconduct of such Indemnified Person. I shall not be responsible or liable to you or any other person for consequential damages. Your obligations under this paragraph shall survive any termination of the Commitment Documents and shall be effective regardless of whether any definitive financing agreements are executed. The foregoing provisions of this paragraph shall be in addition to any rights that I or any other Indemnified Person may have at common law or otherwise.

You agree to reimburse I fees and expenses in incurred in connection the preparation, execution and delivery of each of the Commitment Documents, and all activities related to or contemplated by such Commitment Documents, including but not limited to the conducting of due diligence and the preparation of documentation for the {DOCVARIABLE "GeneralDefinition" \*MERGEFORMAT}, including the reasonable fees I , whether or not definitive documentation for the {DOCVARIABLE "GeneralDefinition" \*MERGEFORMAT} is executed or the {DOCVARIABLE "GeneralDefinition" \*MERGEFORMAT} are provided.

Each of the Commitment Documents is delivered to you on the condition that each such Document be kept confidential and not shown to or discussed with any third party (other than on a confidential and need to know basis with your counsel, governing board, and financial advisors and except as required by applicable law or court order or subpoena) without set forth in this letter will terminate at 5:00p.m. on , unless you accept the Commitment Documents at or prior to that time by signing and returning to counterparts of each of the Commitment Documents.  under the Commitment Documents, if accepted by you, will in any event terminate at 5:00p.m. on  if the closing of the {DOCVARIABLE "GeneralDefinition" \*MERGEFORMAT}, including satisfaction of all conditions percedent set forth in the Commitment Documents, has not occured on or prior to such date.

Each of the Commitment Documents may be executed in any number of counterparts, each of which shall be an original and all of which, when taken together, shall constitute one agreement, and none of the Commitment Documents may be assigned by you without the prior written consent of  and may not be amended or any provision of any Commitment Document waived or modified except by an instrument in writing signed by each of the parties to such Documents. Each of the Commitment Documents shall be governed by and construed in accordance with the laws of  .

We look forward to working together to complete this transaction.

| | |
|---|---|
| | |

Accepted and Agreed
this _____ day of

FIG. 8B

TERM SHEET
FOR
{ DOCVARIABLE "GeneralDefinition" \*MERGEFORMAT}

| Parties | |
|---|---|
| | |

Definitions

| | |
|---|---|
| Definitions in Commitment Letter: | Unless otherwise specified all terms defined in the Commitment Letter to which this Term Sheet is attached have the same meaning in this Term Sheet as are specified in such Commitment Letter. |
| | |
| Closing Date: | Date all documentation required for the { DOCVARIABLE "GeneralDefinition" \* MERGEFORMAT} is executed and delivered and all conditions precedent in all such documents are satisfied . |

| Documentation | |
|---|---|
| | |
| General: | The { DOCVARIABLE "GeneralDefinition" \* MERGEFORMAT} will be subject to the negotiation, execution and delivery of a definitive credit agreement and all related documentation, all in form and substance acceptable to { DOCVARIABLE "CreditProviderApprovingDocumentation" \* MERGEFORMAT}. Such documentation will contain provisions typical for a transaction of this type, as well as those required by { DOCVARIABLE "CreditProviderApprovingDocumentation" \* MERGEFORMAT}, including but not limited to those set forth below. |
| | |
| Conditions Precedent: | Each of the following: |

FIG. 8C

|  | Fees, Expenses and Compensation. To the extent due, payment of all costs, fees (including but not limited to legal fees), expenses and other compensation payable pursuant to the Commitment Documents. |
|---|---|
| Representations and Warranties: |  |
| Covenants: | Customary in transactions of this type and as required by { DOCVARIABLE "GeneralDefinition" \ * MERGEFORMAT}, including but not limited to each of the following: |
|  | Reporting Requirements. |
|  | Affirmative Covenants. |
|  | Negative Covenants. |
|  | Financial Covenants. |
| Events of Default: |  |

| Taxes: | All payments are to be made free and clear of all taxes (other than net income and franchise taxes), imposts, assessments, withholdings or any other deductions. |
|---|---|

| Indemnities: | { DOCVARIABLE "CreditReceiversGeneral" \* MERGEFORMAT} will provide imdemnities customary for a transaction of this type. |
|---|---|

| Governing Law: |  |
|---|---|
| Jurisdiction: | { DOCVARIABLE "CreditReceiversGeneral" \* MERGEFORMAT} will submit to the non-exclusive jurisdiction and venue of the federal and state courts of . |
| Jury Trial | { DOCVARIABLE "CreditReceiversGeneral" \* |

FIG. 8D

|  | by jury. |
|---|---|
| Counsel to : | |

FIG. 8E

General Information [x]

Do you want the right to terminate the commitment if there are problems in the syndication markets?

[ Yes ] [ No ]

FIG. 11

General Information [x]

Specify the date by which the commitment letter must be accepted by:

October 05, 1999

- Click Here to Continue -

FIG. 12

General Information [x]

Specify the credit party approving additions to the syndicate:

Bank

- Click Here to Continue -

FIG. 13

```
┌─────────────────────────────────────────────┐
│ Adressee Information                     [X]│
│ Please enter the following information for  │
│              Addressee # 1:                 │
│      Name:  [Mr.▼] [John]       [Doc    ▼]  │
│     Title:  [Managing Partner            ▼] │
│ Company Name: [Law Firm                  ▼] │
│   Address:  [Law Firm Address             ] │
│             [                             ] │
│      City:  [Garden City                 ▼] │
│     State:  [New York    ▼]  Zip: [11530 ▼] │
│ ┌─────────────────────────────────────────┐ │
│ │       - Click Here to Continue -        │ │
│ └─────────────────────────────────────────┘ │
└─────────────────────────────────────────────┘
```

FIG. 20

```
┌─────────────────────────────────────────────┐
│ Data Entry - Issuer(s) Information          │
│ Please enter the following information for  │
│               Issuer # 1:                   │
│ Officier Name: [Bank Officier            ▼] │
│         Title: [Vice President           ▼] │
│          Name: [Bank Name                ▼] │
│    Abbr.Name:  [Abbr. Bank Name          ▼] │
│ ┌─────────────────────────────────────────┐ │
│ │       - Click Here to Continue -        │ │
│ └─────────────────────────────────────────┘ │
└─────────────────────────────────────────────┘
```

FIG. 21

Confirmation

Are these answers correct?

Specify the number of parties receiving credit facilities:
One
Specify the name of Credit Party:
Credit Party Name
Specify the number of Credit Facilities:
More Than One
Credit Facilities Selected:
**Revolving Credit Facility (Loans and Letter of Credit)
Term Loan on Closing Date**

| - YES - | - NO - |

FIG. 22

Revolving Credit Facility [x]

What elements are part of the Borrowing Base?

☑ Accounts Receivable

☐ Inventory

☑ Equipment

- Click Here to Continue -

FIG. 23

Revolving Credit Facility

Specify the periods:

From:   To:

| From | To |
|---|---|
| Six Months After Cl ▼ | Six Months After Cl ▼ |
| the 2 Tuesday of J ▼ | ▼ |
| the 2 Tuesday of J ▼ | ▼ |
| ▼ | ▼ |
| ▼ | ▼ |

- Click Here to Continue -

FIG. 26

Term Loan on Closing Date ☒

In the order in which each payment is to be made on the Term Loan specify the amount of each such payment:

Amount of Payments

| | | | | | |
|---|---|---|---|---|---|
| Payment - 1 | ▼ | ▼ | 2 ▼ | 000 ▼ | 00 ▼ |
| Payment - 2 | ▼ | ▼ | 2 ▼ | 000 ▼ | 00 ▼ |
| Payment - 3 | ▼ | ▼ | 4 ▼ | 000 ▼ | 00 ▼ |
| Payment - 4 | ▼ | ▼ | 5 ▼ | 000 ▼ | 00 ▼ |
| Payment - 5 | ▼ | ▼ | 4 ▼ | 000 ▼ | 00 ▼ |
| Payment - 6 | ▼ | ▼ | 5 ▼ | 000 ▼ | 00 ▼ |
| Payment - 7 | ▼ | ▼ | 2 ▼ | 000 ▼ | 00 ▼ |
| Payment - 8 | ▼ | ▼ | 1 ▼ | 000 ▼ | 00 ▼ |

- Click Here to Continue -

FIG. 27

Revolving Credit Facility

For Each Period Specified Below Specify the Start and the End of Each Period and the Amount Available Under the Revolving Credit Facility During Each Such Period:

| Start of Period | End of Period | Amount Available ($) |
|---|---|---|
| Fisrt Day Revolving Credit Facility Available | October 05,1999 | 1 000 000 00 |
| October 05,1999 | October 05,1999 | 2 000 000 00 |
| October 05,1999 | Last Day Revolving Credit Facility Available | 3 000 000 00 |

- Click Here to Continue -

FIG. 28

Selection of Multiple Credit Facilities

Please Select the Appropriate Combination of Credit Facilities:

*Revolving Credit Facility*
- ○ Revolving Credit Facility (Loans Only)
- ○ Revolving Credit Facility (Loans and Letters of Credit)

☐ Term Loan to Repay Revolving Credit Facility

*Term Loans on Closing Date*
- ○ ONE Term Loan on Closing Date
- ○ TWO Term Loans on Closing Date
- ○ THREE Term Loans on Closing Date ☐ Standby Term Loans ☐ Letter of Credit Facility (Separate from Revolving Credit Facility)

- Click Here to Continue -

FIG. 29

AUTOMATED DOCUMENT DRAFTING SYSTEM

BACKGROUND OF THE INVENTION

The present invention relates to a system for automatically drafting documents. More particularly, the present invention relates to a system for automatically preparing and generating the text of complex documents which have alternative text provisions, insertable text and/or multiple provisions that are selected in response to information relevant to the preparation of the document, such as a legal document. Even more particularly, the present invention relates to a system for generating, in response to user input to a series of dynamically alterable questions, documents such as legal documents, for example, loan commitment letters for use in a commercial lending transaction. The present invention allows complex documents of the type described to be generated efficiently based upon providing responses to a series of questions, which questions automatically change and the response to which format not only the document under creation, but the series of questions to be asked, based upon the answers to previous questions. In essence, the present invention mimics or emulates what a draftsperson does in drafting a complex, customized document. The system of the invention comprises an artificial intelligence system or expert system.

There is a need for a document preparation system which efficiently automatically generates documents, for example, legal documents such as loan commitment letters. Today, documents of this type, for example, loan commitment letters, are typically prepared by selecting a form and/or examples of such letters from prior transactions and then "cutting and pasting" the required provisions into the document, modifying those provisions to reflect the terms of the financing and then editing the entire agreement.

An aim of the present invention is to change how documents are prepared by utilizing the power of a complete programming environment to manipulate a full word processing application to create the document.

By utilizing the word processing and storage capacity of both a word processing environment such as Microsoft Word and a data base, an extensive number and variety of provisions can be included in the document generated. In addition, these provisions can be modified or supplemented by the user.

There is a need for a system which can efficiently access such provisions to create a tailored document, such as a loan commitment letter. In addition, there is a need for an automated document drafting system which will be able to manipulate the underlying documents so that after each response is given, all the required changes to the document will be made which are affected by the response.

To applicant's knowledge, there are no such systems available today. Products such as "Hot Docs" allow a user to create a program to interface with a word processing program to manipulate a document, but these systems do not take full advantage of a programming environment to control a word processing environment and of a database to manipulate a document. Accordingly, those systems are incapable of efficiently preparing a complex document because they do not have the ability to utilize all the functionality of a full programming environment and database. For example, systems of the prior art are not capable of using all logical functions and/or combinations of logical functions and/or embedded such logical functions of a full programming environment at all stages of document preparation to generate the desired document. In particular, such prior art systems are not capable of using combinations of such logical functions or using such logical functions in a manner such that logical functions are nested within each other. This allows the full advantage of using a full programming environment to control a full word processing environment to be achieved.

Additionally, systems of the prior art are not capable of tailoring the requests for information necessary to prepare the document so that, once an approach to preparation of the document is taken, the system dynamically tailors the questions asked so that unnecessary questions are not asked and so that the critical information necessary is obtained efficiently. For example, the program that "Hot Docs" creates to generate a document will present a series of questions to the user to enable generation of the document but this prior art program does not allow, to applicant's knowledge, dynamically altering the series of questions asked so that unnecessary, inconsistent or redundant questions are not asked after the user has already provided information. To applicant's knowledge, the "Hot Docs" program will still require the user to go through a structured series of questions. Hot Docs does present additional questions to the user at times, but does not have the flexibility to achieve greater efficiency by dynamically altering the sequence of questions asked in response to previous answers.

Accordingly, there is a need for a document preparation system that takes full advantage of a programming environment to manipulate a word processing environment to prepare and generate a document. Further, there is a need for such a system that allows a user to answer a series of questions to create the document and which dynamically, in response to questions previously answered, alters and determines the series of questions which are asked to obtain the information to create the final document and determines when and how to alter the document in response to information provided in response to the questions.

SUMMARY OF THE INVENTION

The present invention provides a system for automatically generating a document, such as a loan commitment letter for use in commercial lending, by using a full programming environment such as an application created through the use of Visual Basic as its "front end" to manipulate a "back end" which comprises a word processing application such as Microsoft Word. The invention includes both the logic for the generation of, as well as the provisions typically needed for, the preparation of a document, such as a commercial loan commitment letter. In addition, according to the invention, the word processing environment document, such as an MS Word document, created under control of the full programming environment, will have embedded code to enable the user to continue to modify the document even after the programming environment is no longer active.

The invention is designed to provide requests or ask questions of, and solicit information from, the user. Based on each user response, two subsequent events may occur. The queue of future questions and requests for information will be adjusted to reflect all prior selections and previously supplied information and the underlying document will be manipulated, at some point in the process, to reflect each such response. The user will only be asked to answer questions or provide information that is the logical extension of all prior responses, thus making the system efficient.

Those questions which need not be answered because of answers to previous questions are not asked by the system. Also, each answer will not merely determine whether or not a particular provision is included or excluded from the document, but rather will include and modify all provisions of a document affected by the answer or choice. The invention views the agreement as a whole, rather than as a group of individual provisions. Thus, the system can make all changes required to a document or group of documents necessitated by the information supplied based on the answer or answers to a specific question or series of questions, including inserting different text in different locations necessitated by the information provided by the user.

The invention also modifies the document "on the fly", as the user is responding to questions. Preferably, a portion of the display screen (preferably ⅓) displays the document being generated and the remainder of the screen (⅔) presents the questions. However, the system can optionally be operated to wait until all questions have been answered before modifying the document.

In one embodiment, once the system has all the information necessary to alter the document as affected by that information, the system will then alter the document. The user will thus be able to see the document being created during the question and answer process. The system can also optionally be controlled, at the user's discretion, to wait until all information is obtained for the entire document, and then, once all information has been obtained, generate the document. It is believed that the former method, i.e., generation of the document during the question and answer process, is more efficient, however.

The present invention guides the user through the steps required to solve to the level of detail required to ensure that all required provisions are included with the proper level of detail. This approach allows for both the expansion of the text in the document to include all required provisions with the level of detail desired, as well as the contraction of the provisions in the agreement with the desired level of detail.

Initially, the user determines whether and to what extent a provision or a series of related provisions is to be included in the document. To illustrate, if the document is a loan commitment letter, the user will be asked if a revolving credit facility is to be included in the document. If the response is no, then no other questions will be asked of the user with regard to a revolving credit facility and no provisions relating to a revolving credit facility will be included in the document. However, if the answer is yes, then the user will be asked for certain information, such as the first day the revolving credit facility is available, to solve for all information relating to the revolving credit facility. In addition, the user will be asked other questions to determine whether or not there are other issues to be solved such as whether or not the revolving credit facility is subject to a borrowing base. Again, if the answer is no, then no other questions regarding a borrowing base will be asked and no provisions relating to a borrowing base will be included. If the response is yes, then information regarding the borrowing base will be solicited and certain provisions under the revolving credit facility will be modified. This process will be repeated until all required provisions relating to the revolving credit facility are included in the document in a level of detail required.

Accordingly, the invention allows a user to specify an approach to be taken to address a particular issue relating to the preparation of the document and then automatically selects and modifies the series of further questions asked by the system to solicit the information necessary to prepare the document. The system solicits information from the user through computer input screens called herein "forms". The requests presented by the forms are dynamically altered in response to the information provided in response to the previous requests, as illustrated in the above example relating to the revolving credit facility. Not all user inputs result in immediate changes to the document. Some, such as selecting an approach to an issue, e.g., whether a revolving credit facility is to be used, initially only determine future requests for user input, i.e., determine the future requests necessary to prepare the document. The document is not altered, at a minimum, until all the information relating to a particular document topic is obtained.

The ability of the system to dynamically change the user inputs and alterations to the document makes the system very efficient. For example, if the user indicates that there will be three periods of time with different amounts available under the revolving credit facility, then the next form or input screen will display three periods and the table inserted into the document will contain three periods. Accordingly, in this instance, the input screen requesting further information is dynamically altered and the document itself is altered in response to the information provided. In other instances only the further input screen or screens will be initially altered. Further information is obtained by the dynamically altered input screens, and at the appropriate time, when all information necessary to prepare a provision or series of provisions is obtained, the document is altered.

This dynamic approach of the invention to the preparation of a document provides an additional functionality even after the initial preparation of the document. A user will be able either to expand or contract the provisions related to a particular topic. To continue with the example of a commitment letter having a revolving credit facility, if the user initially indicated that there would not be a borrowing base but then decides to include the concept, the user will be able to access directly from the document the programming logic for including those provisions and thereby add that concept to the agreement. The program logic is "embedded" in the generated document, i.e., it is associated from the document resident in the computer memory media.

In addition, if the borrowing base provisions were initially included in the document but the user decides to change certain provisions relating to the borrowing base, then the user will be led to the appropriate logic to resolve for the provisions related to the borrowing base. For example, the user may want to add inventory to the borrowing base. To do so, the user does not need to resolve all the provisions related to a borrowing base but only those provisions related to the collateral included in the borrowing base.

The system according to the present invention preferably runs as a standalone application. The functionality of the system is split between the program logic of an application created using a full programming environment such as Visual Basic (Version 6) standard executable file and a template in the word processing environment, for example, MS Word.

The major functional areas according to the invention are shown in a main interface which includes a single form called a menu screen, presenting the user with four choices, 1) create document, 2) customize tables 3) customize template and 4) customize programming settings.

1) By choosing "create document", the user implements the primary function of the invention, which is to create a document, such as a commitment letter, automatically.

Although the invention is applicable to documents of various types, herein it will be described with reference to a commercial loan commitment letter for purpose of illustration. The invention may be used to create documents other than loan commitment letters. The same principles apply to the generation of other type documents. The system asks the user pertinent questions and based upon the user responses, will create a tailored document for that user in response to a dynamically altered series of questions.

2) By choosing "Customize Tables", the user accesses the system data base. Through the use of a data base program, for example, Microsoft Access, the system allows the user to expand and maintain lists used by the system and add alternative provisions to those lists to supplement those included. To illustrate, the user can add "manager" to the titles list, and once added, it will be an available alternative in all subsequent operations. Also the user is able to add to the alternative provisions provided by the system, for example, the definition of the prime rate. Further, in the case where the user selects a number of items from a list, such as a listing of representations to be included in the document, the user is able to categorize these lists so that when a selection from that list is required, the user can select the predefined list.

3) By choosing "Customize Template" the user can access the word processing template. The present invention utilizes a template of the document in the word processing environment in order to create the final document. The template can be customized by the user to modify the underlying template used by the system in preparing the document so that the template and final document include provisions that are unique to that user. The user is able to modify the template in two ways. First, the user is able to add additional provisions to the template. Second, the provisions included in the initial template can be modified by the user.

Thus, the system provides the user with the ability to make additions or modifications to the underlying template. The user can directly add to the underlying template, or change, any provisions that will always be included in the document.

4) By choosing "Customize Programming Settings", the system according to the invention gives the user the ability to customize or preset certain of the logical functions of the program as well as certain of the information to be supplied by the user. The user is able to set program settings that determine how the system operates, including default settings for each of the screen forms and whether confirmation dialogs are on or off. The forms are the dynamically alterable screen displays that solicit necessary information from the user. Confirmation dialogs allow the user to confirm the information that has been entered. In addition, the user is able to determine the information to be provided such as, e.g., names, titles and the contents of a list, such as a list of financial covenants. Further, the user has the ability to establish a number of different settings so that there are different defaults for different types of transactions or clients. Furthermore, at the end of preparing a document, the user is asked whether the user wants to save the choices made in preparing the document. Such saved choices can then be accessed to prepare modified versions of that document.

The system according to the invention optionally provides confirmation dialogs. These dialogues ask for confirmation from the user that answers previously provided are correct before adjusting the document to reflect the answers given and choices previously made. The user can select whether to confirm certain key answers before proceeding further. In this way, the document is only altered once the user is sure of the approach to be taken. Accordingly, complex document manipulations are not performed until the user has confirmed that the information provided for generating the document is correct.

The system stores the series of questions asked as well as the answers provided in response thereto so that, if the user desires to change a response after the document has been altered, the user can view the question and response and go back to a question to provide a new response. The system will then lead the user through the following series of questions, dynamically altering the questions asked in accordance with any new information provided.

As described, the word processing document created by the full programming environment contains additional functionality. The functionality comes from macros from the full programming environment embedded in the document to take advantage of the functionality of both the full programming environment and the full word processing environment. These functions will enable the user to carry forward the logic of the full programming environment part of the system so that the user can make changes to the document after leaving the full programming environment.

The invention also provides the ability to add alternative textual provisions to the document. The user has the ability to add alternative choices to the list of textual provisions to be inserted into the document and these provisions can either be used only once in connection with preparing a document or can be saved to become additional alternative choices for future uses. Single use provisions are added while the system is being used to create a document. Permanent provisions are additions that are added by making additions directly to the data base or while creating a document.

The system provides the user the ability to modify existing textual provisions while the system is generating a document and either use the modified provision only once in connection with that document or permanently modify the underlying provision for future use. While the system is creating a document, the user can access the underlying textual provision to modify it to fit the requirements of the particular document being created. The modified provision can be used once or can become a permanent change.

The system also provides specifically designed user controls for inputting information. For example, the system provides a user control for inputting dollar amounts comprising a screen form in which the user can choose to insert only a selected most significant digit. The less significant digits are automatically set to zero. Thus, for example, if the amount of a loan transaction is twenty million dollars, the user sets the initial 20 and the remaining digits are set all to zeros. This provides convenience in entering round dollar amounts. Another example of a specifically designed user control is the user control for inputting dates. The system presents the user with windows for the input of month, date and year, and specifically does this by using "Smart Combo" boxes to be described in more detail below.

Other features and advantages of the present invention will become apparent from the following description of the invention which refers to the accompanying drawings.

BRIEF DESCRIPTION OF THE DRAWING(S)

The invention will now be described in greater detail in the following detailed description with reference to the drawings in which.

Figure 6A:
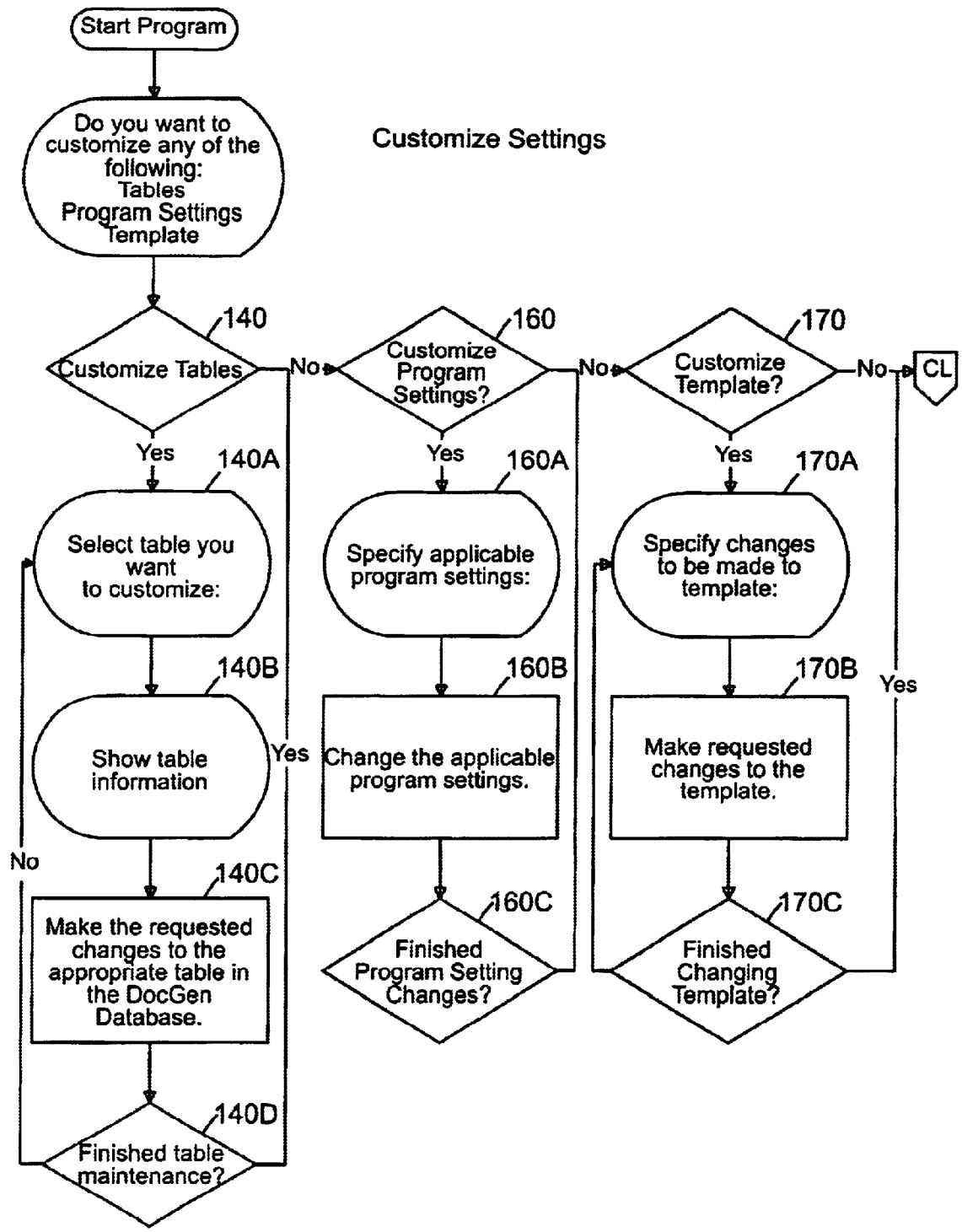
Figure 6B:
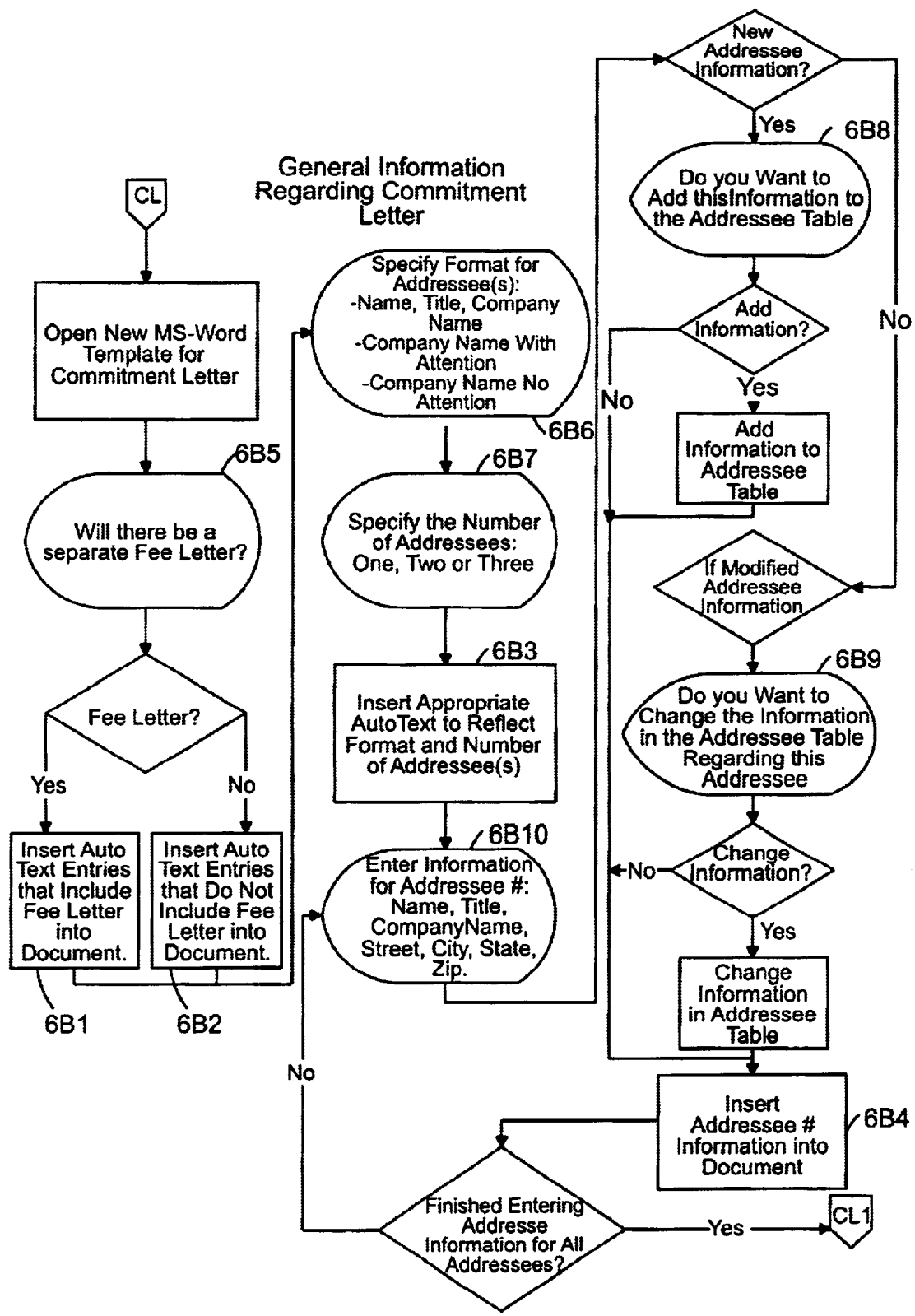
Figure 6C:
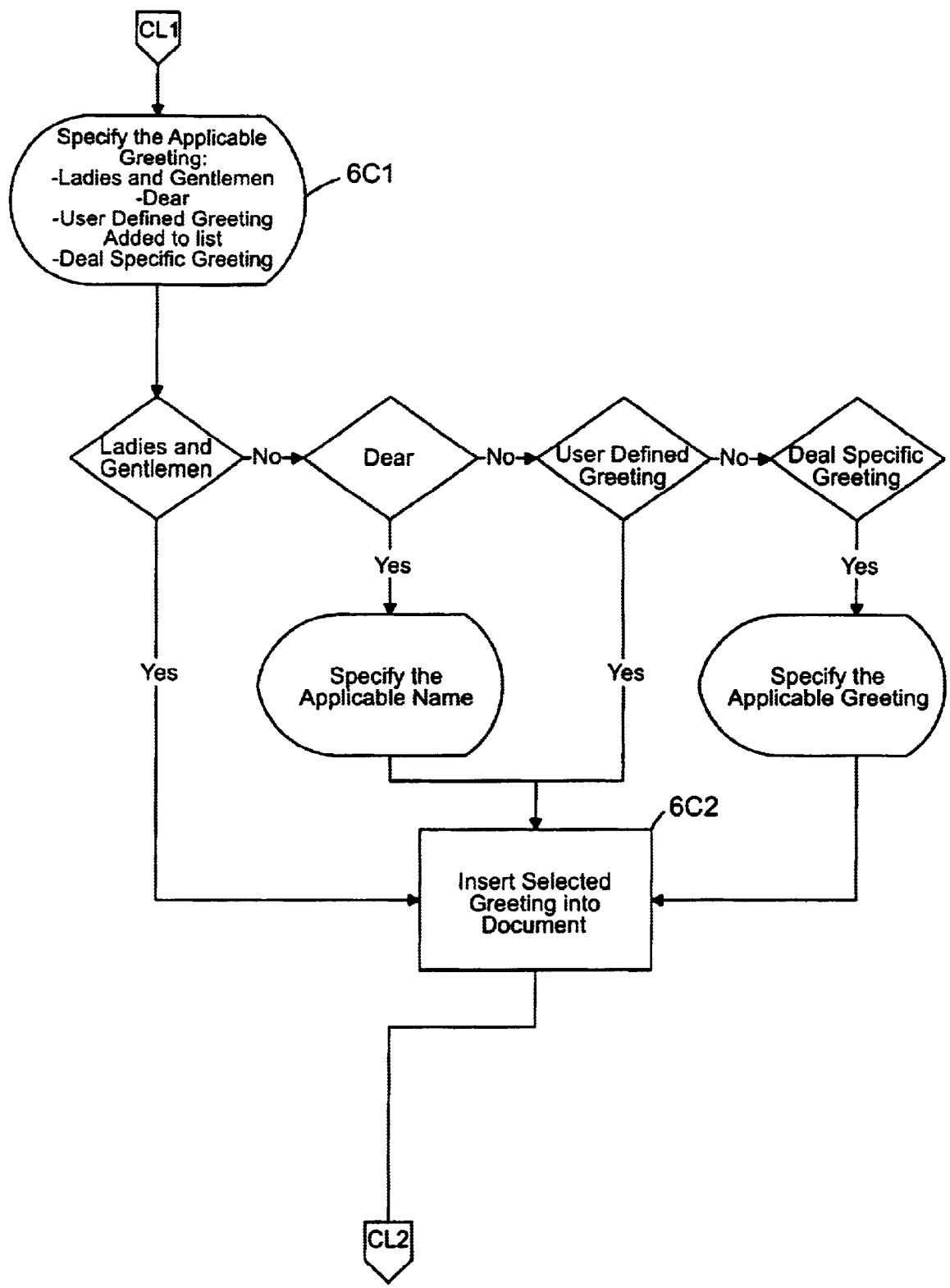
Figure 6D:
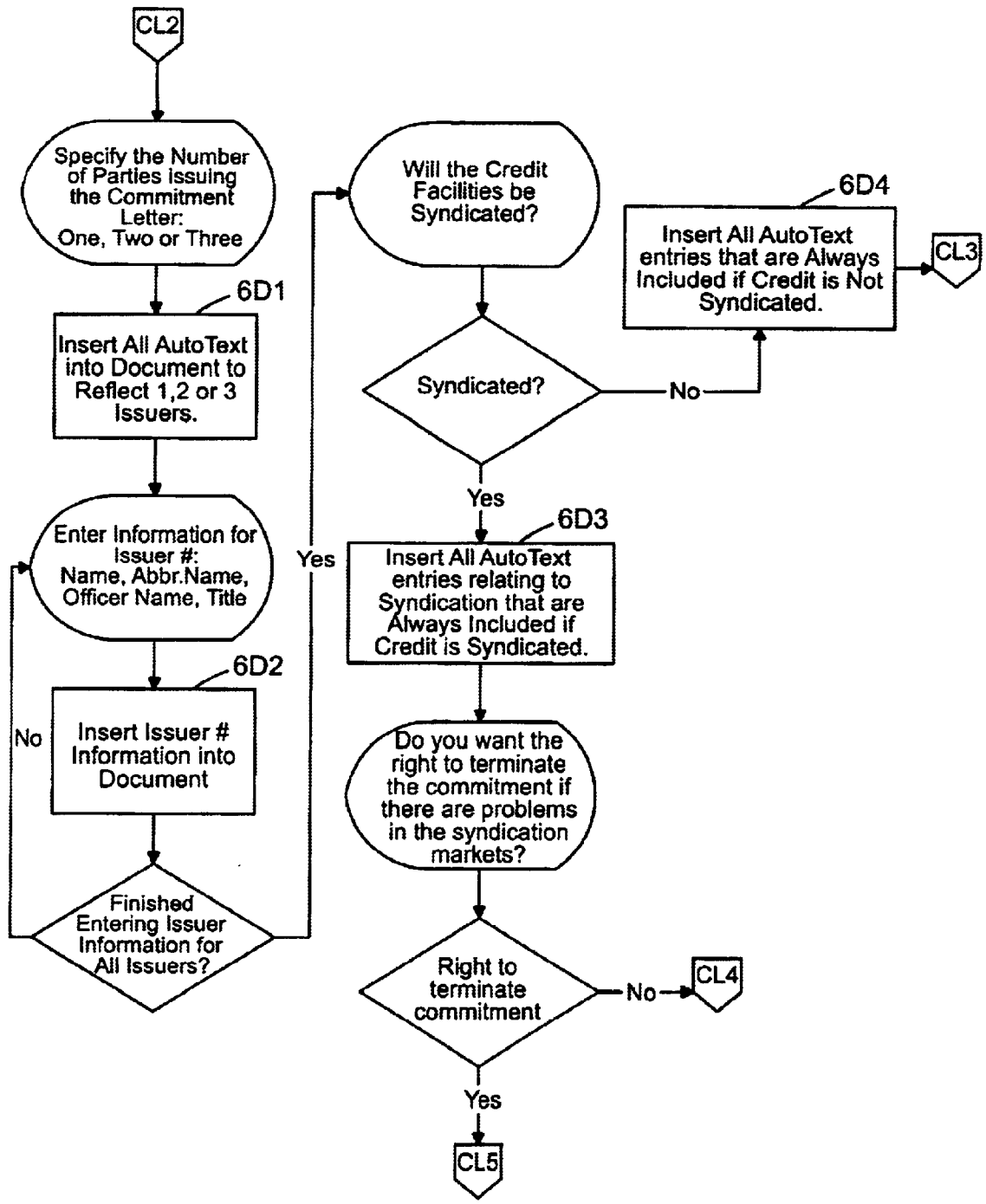
Figure 6E:
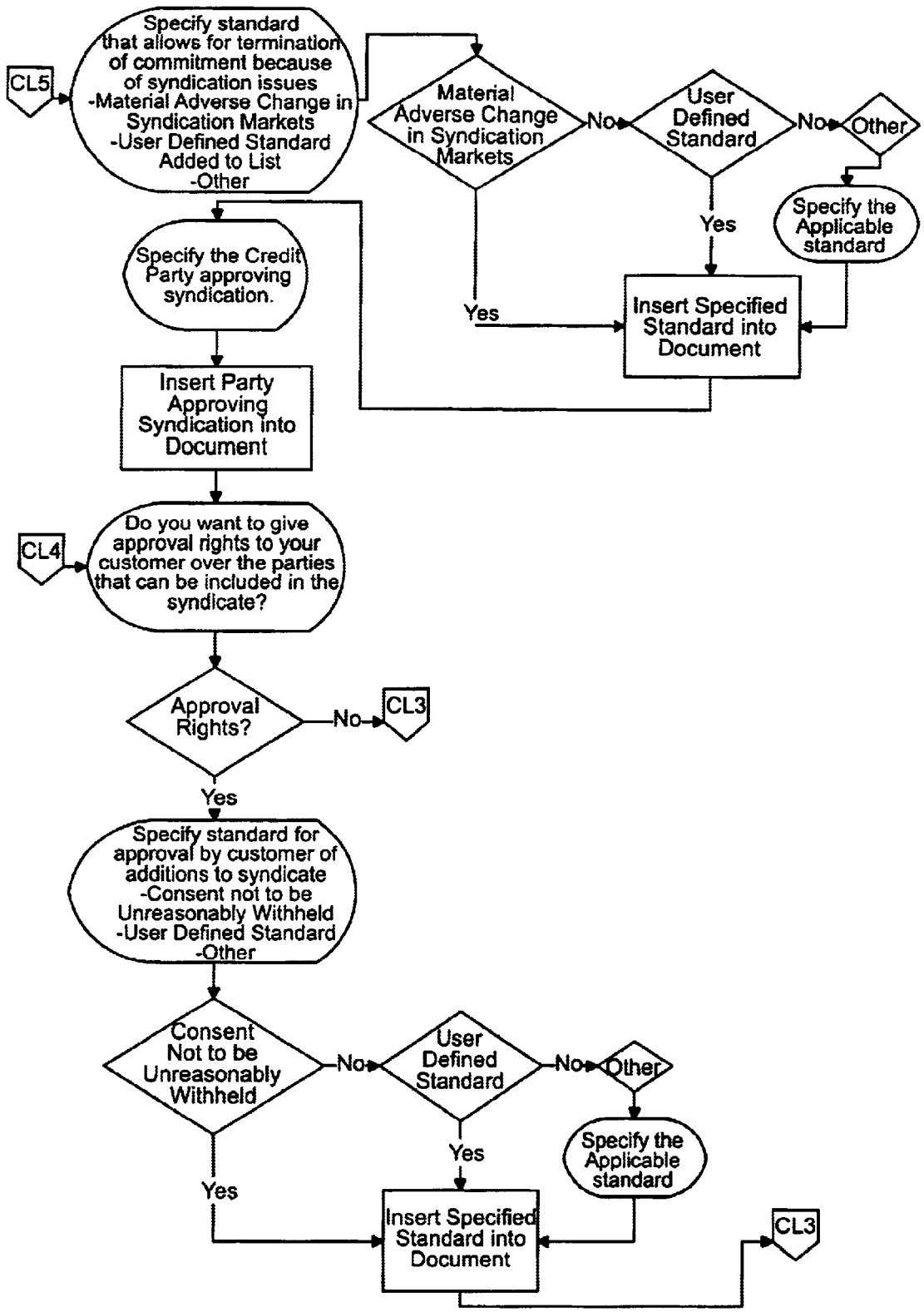
Figure 6F:
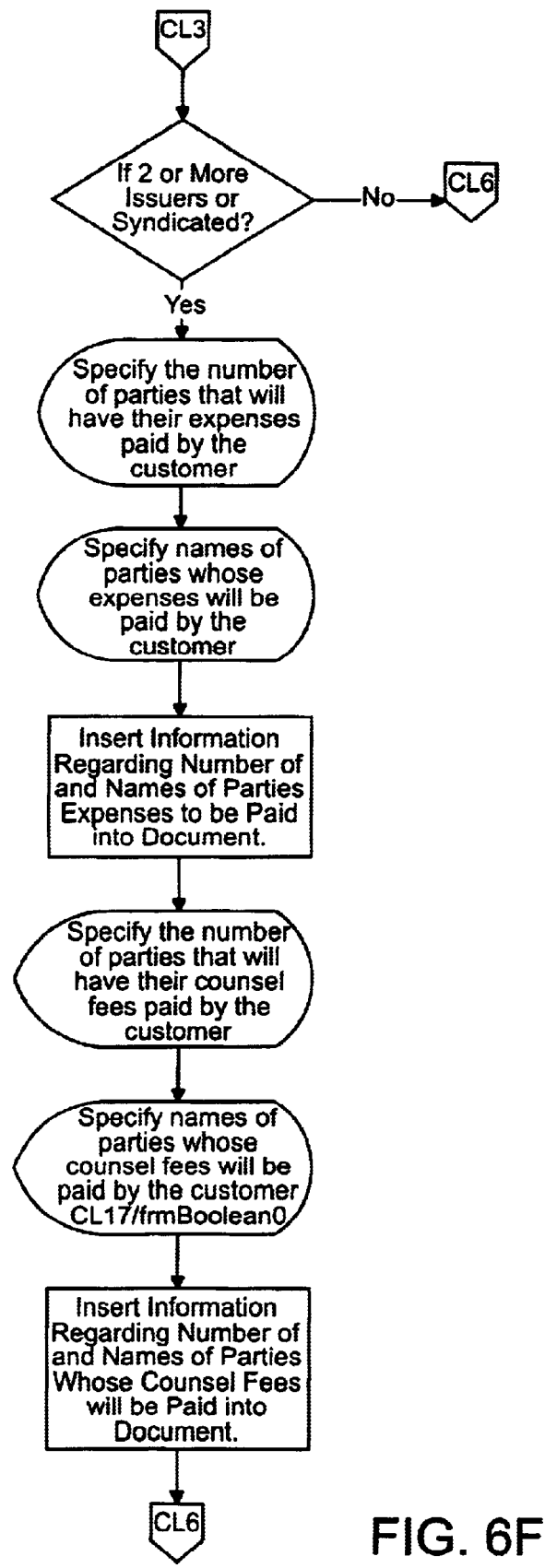
Figure 6G:
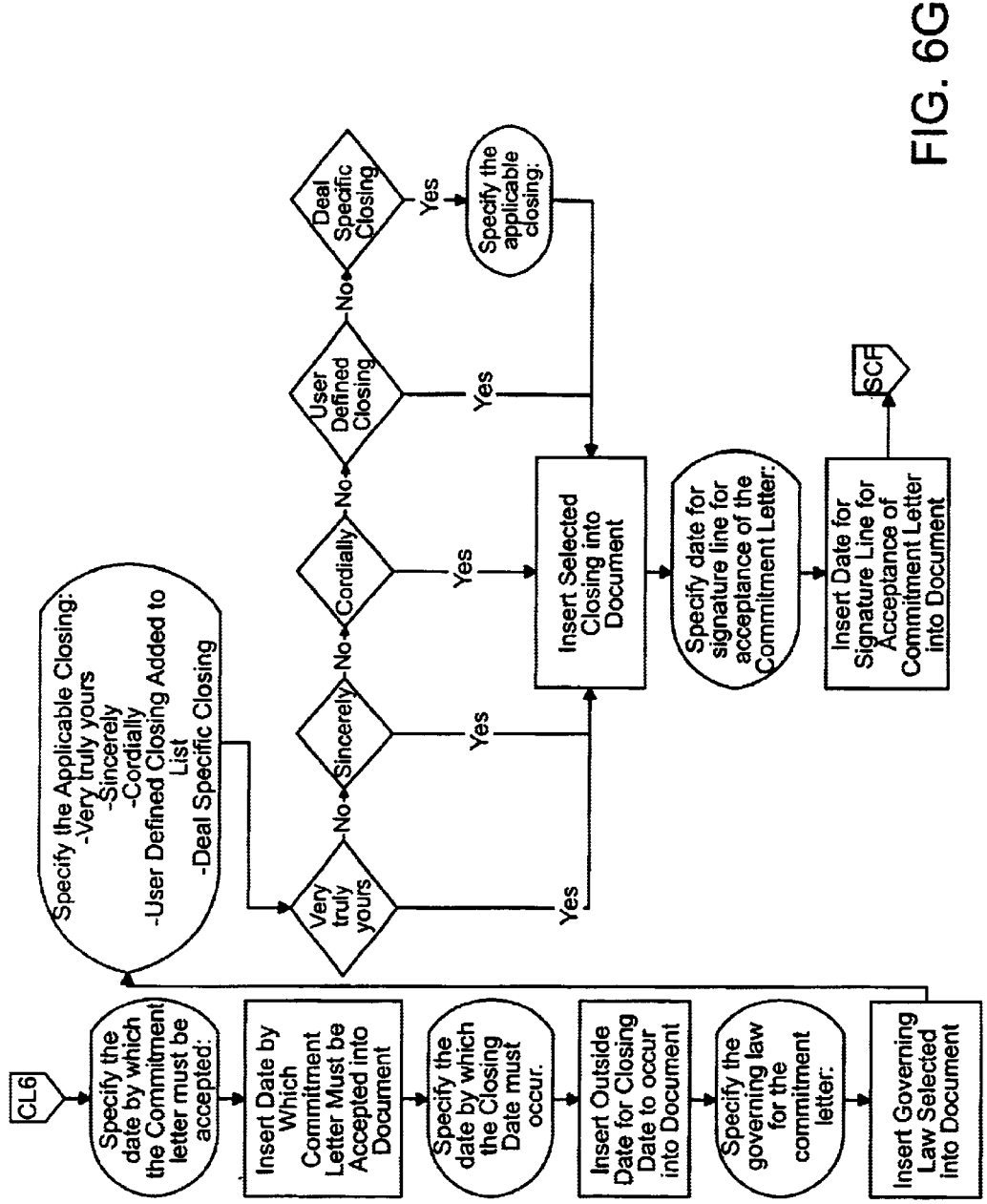
Figure 6H:
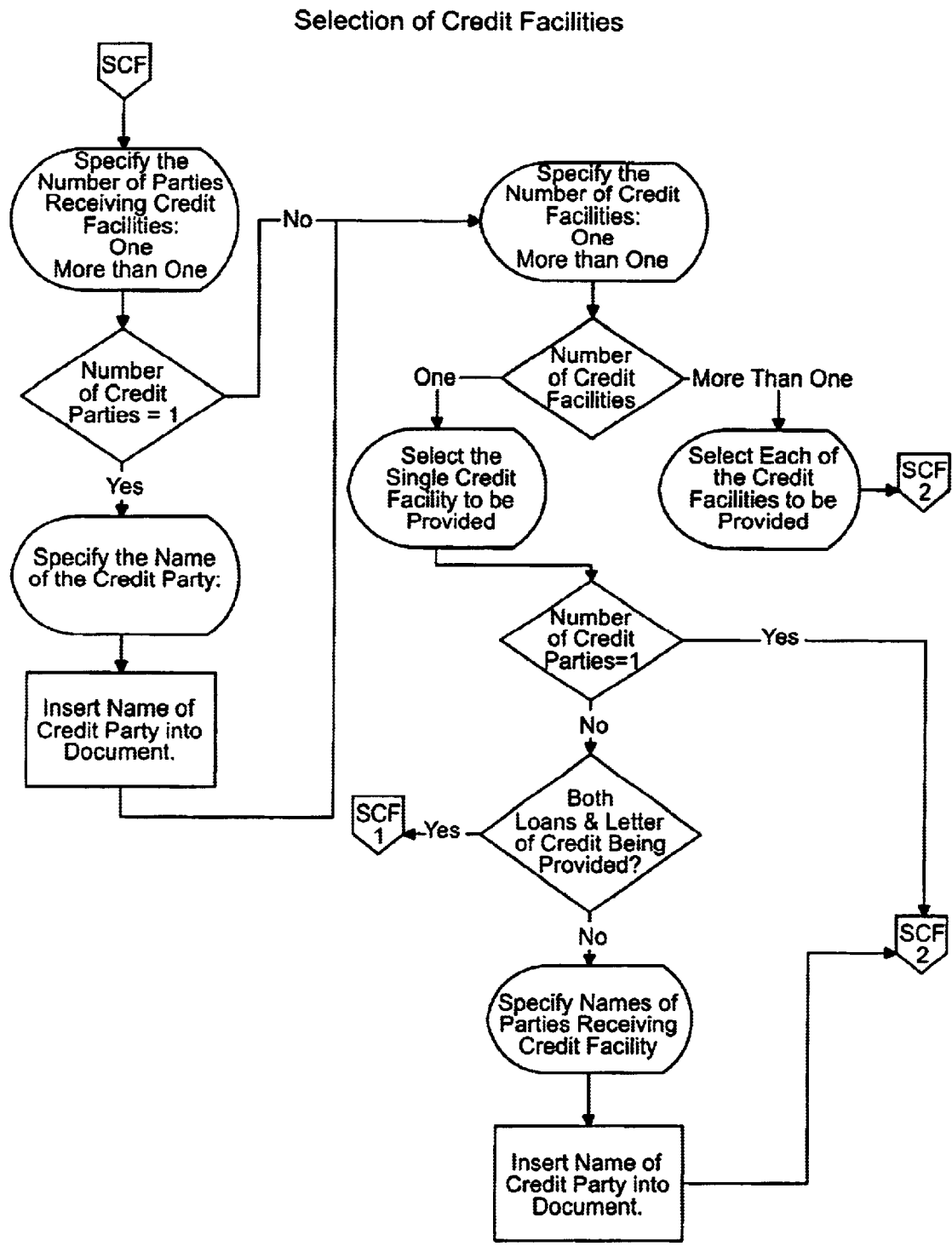
Figure 61:
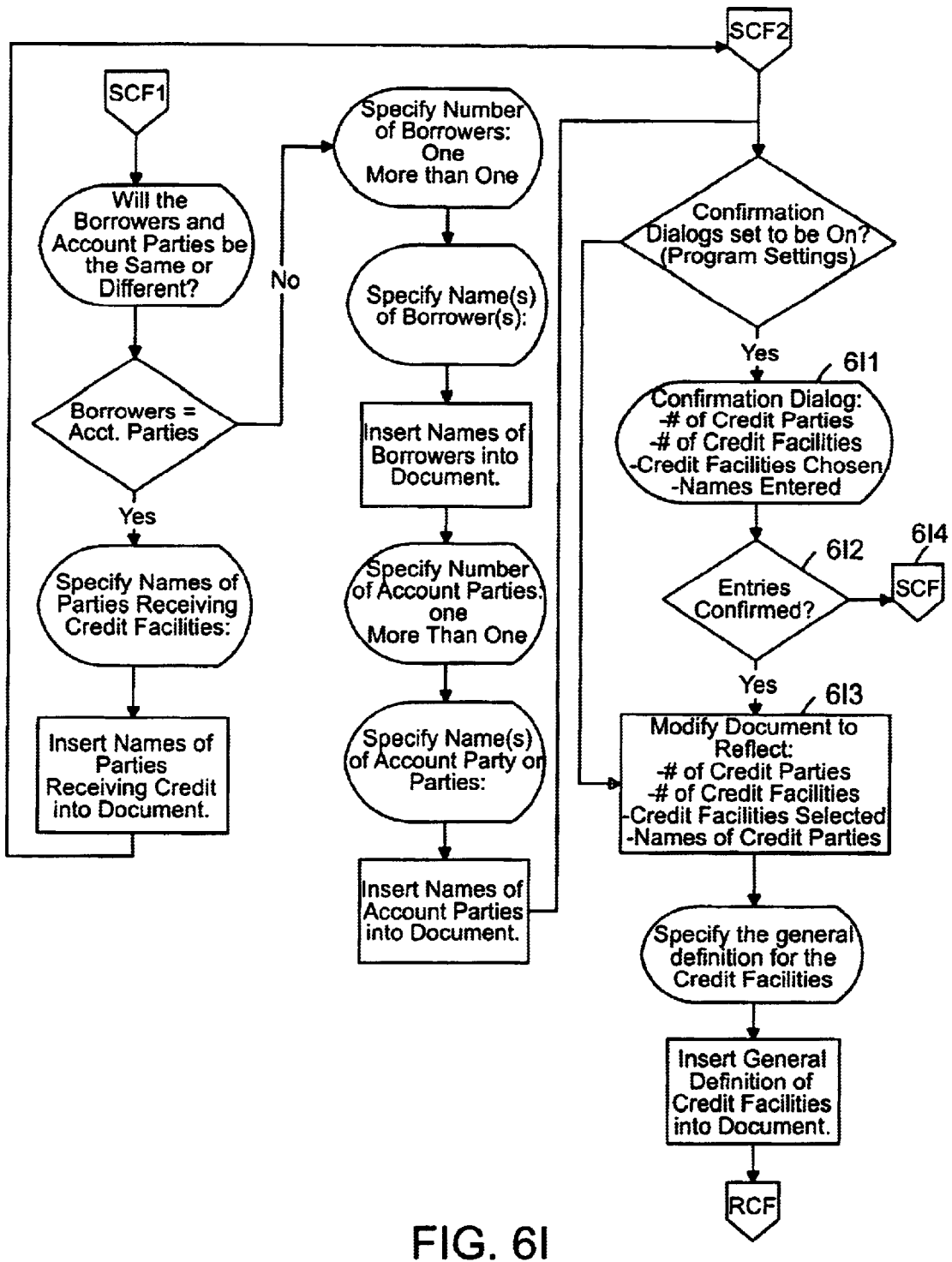
Figure 6J:
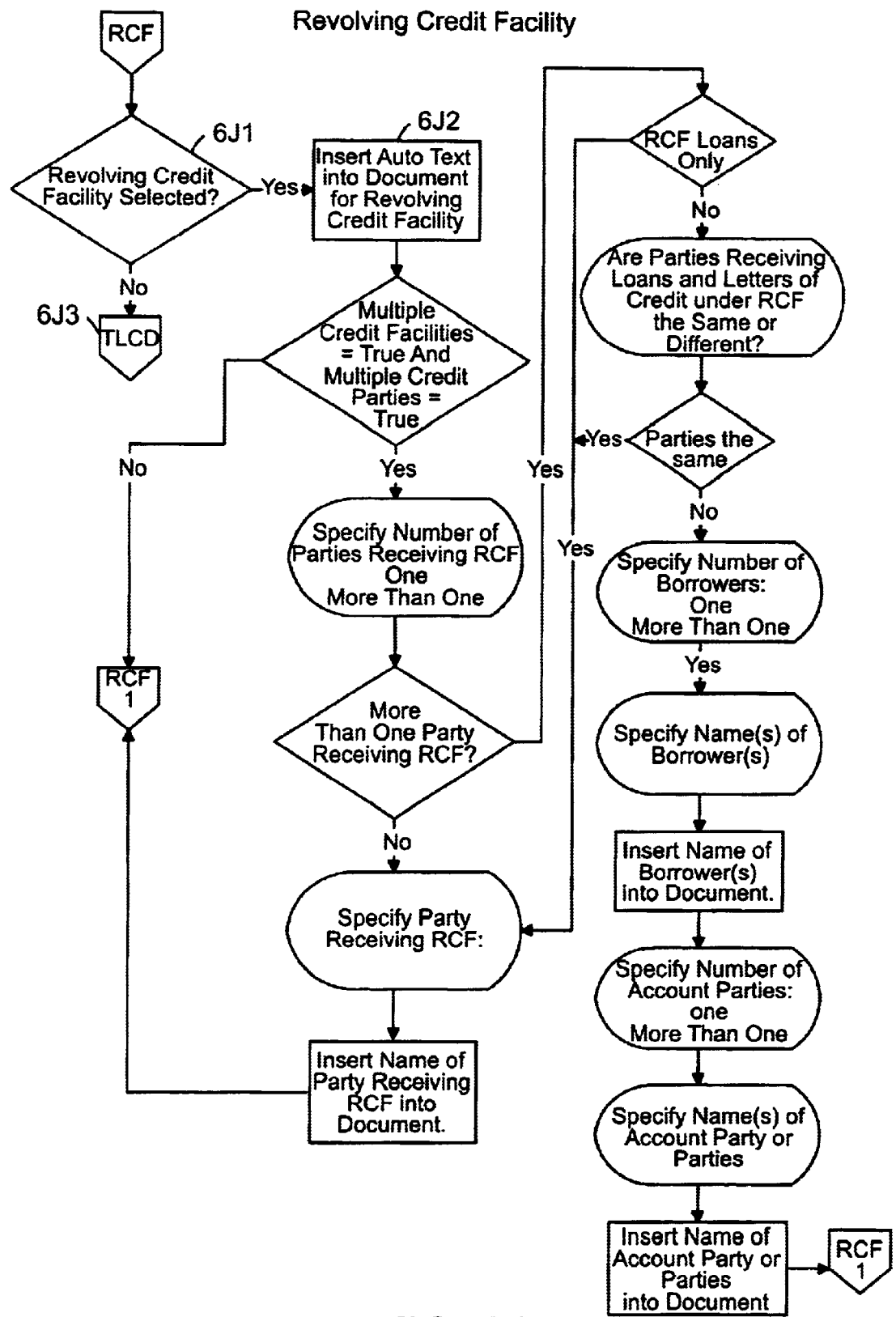
Figure 6K:
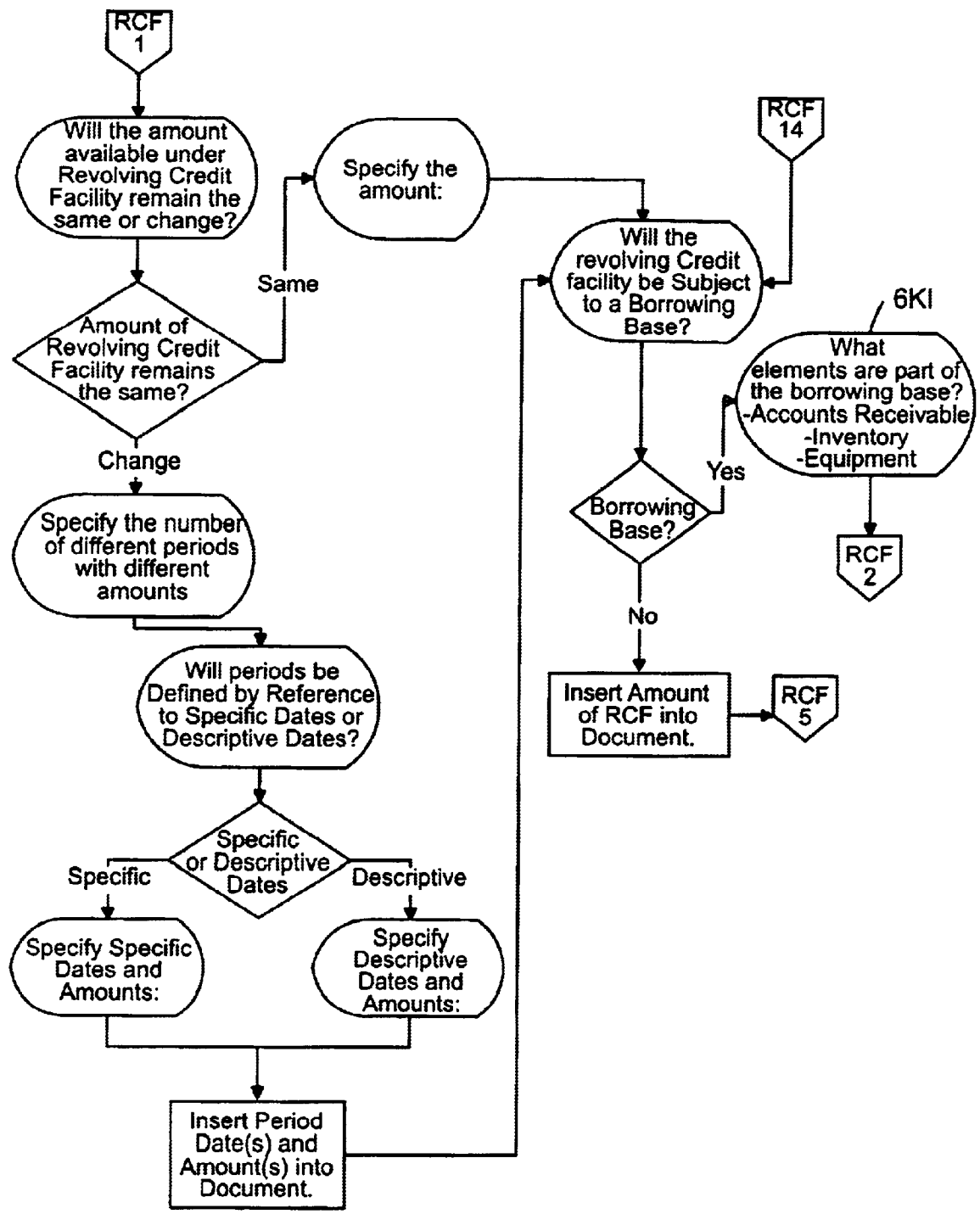
Figure 6L:
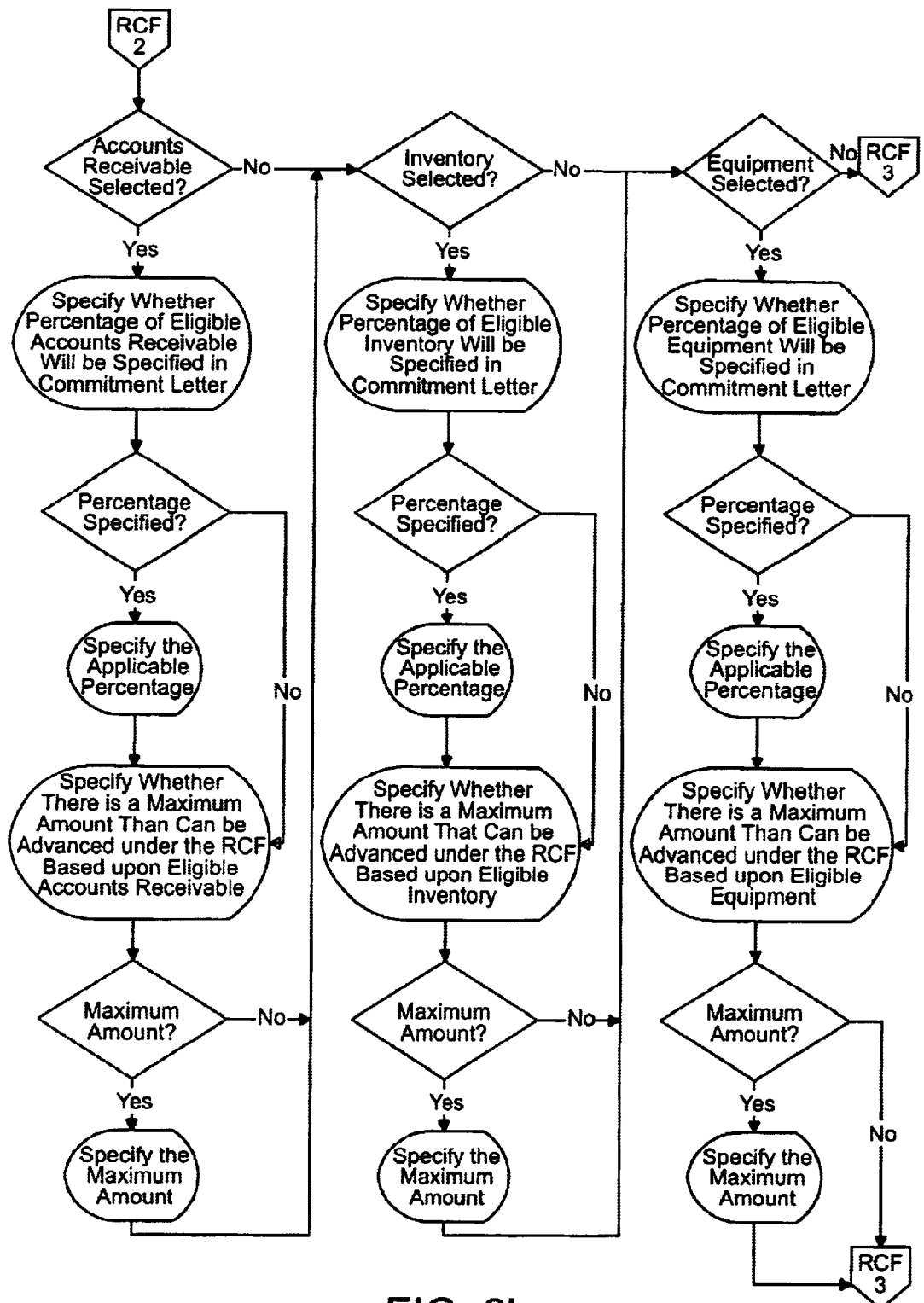
Figure 6M:
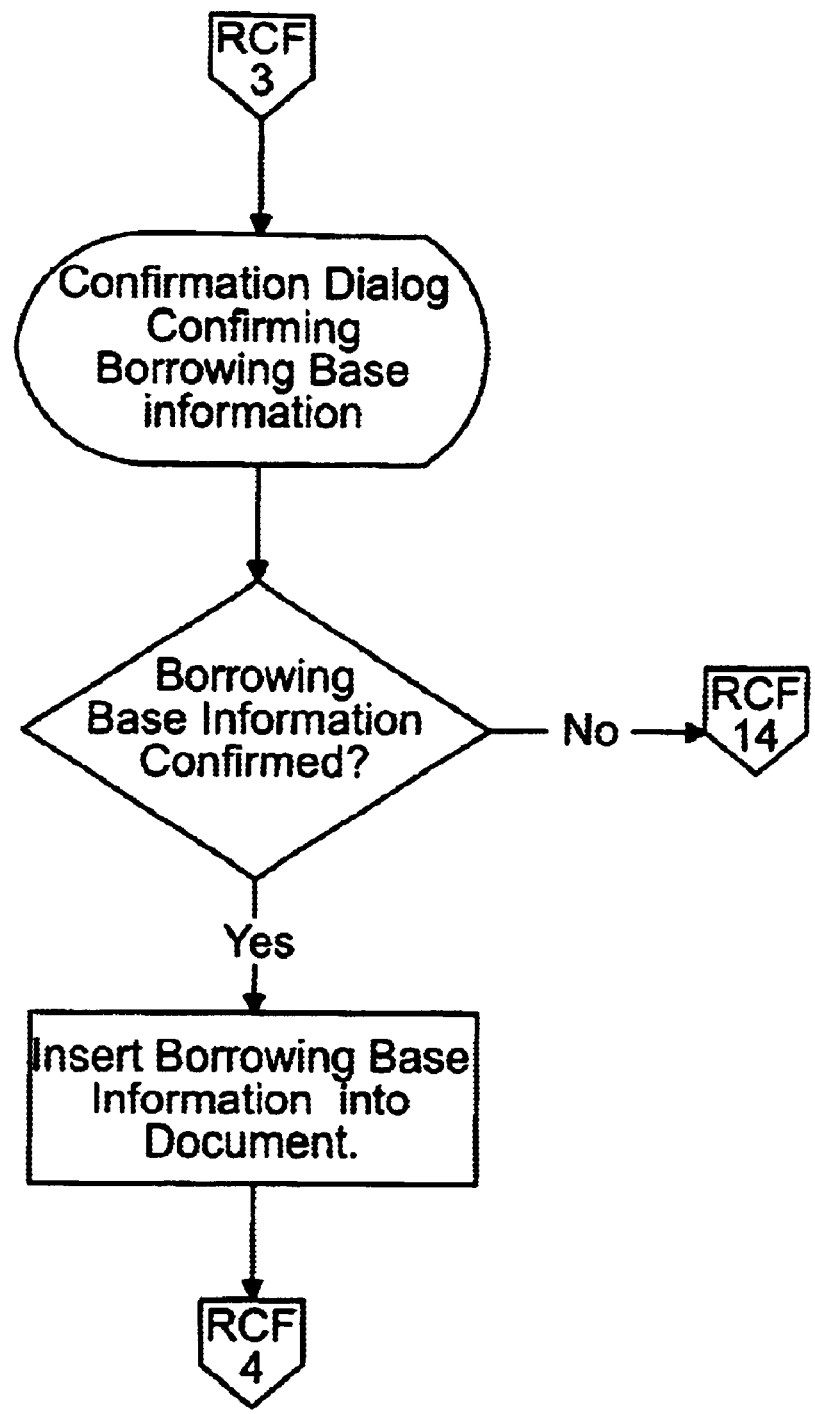
Figure 6N:
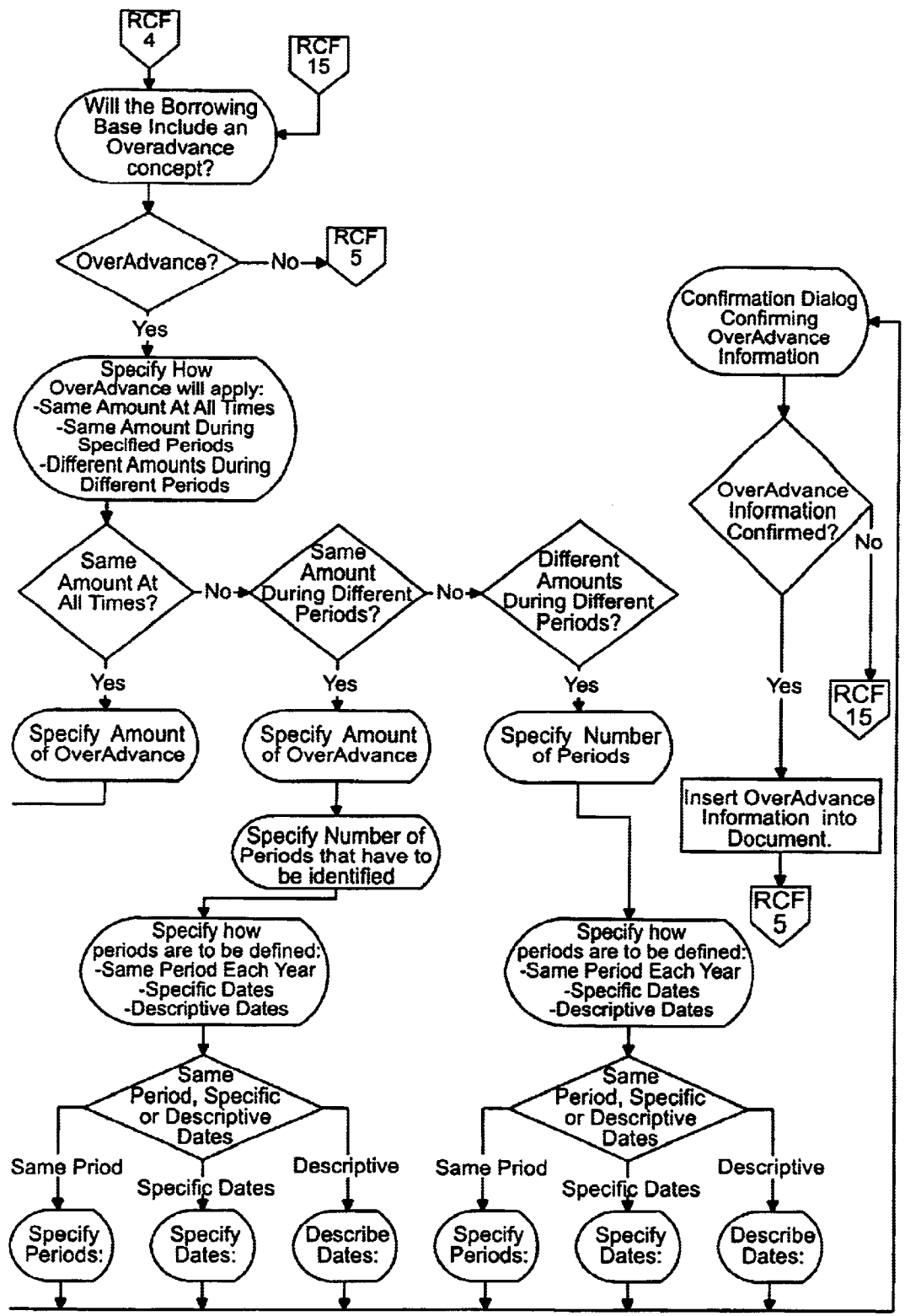
Figure 6O:
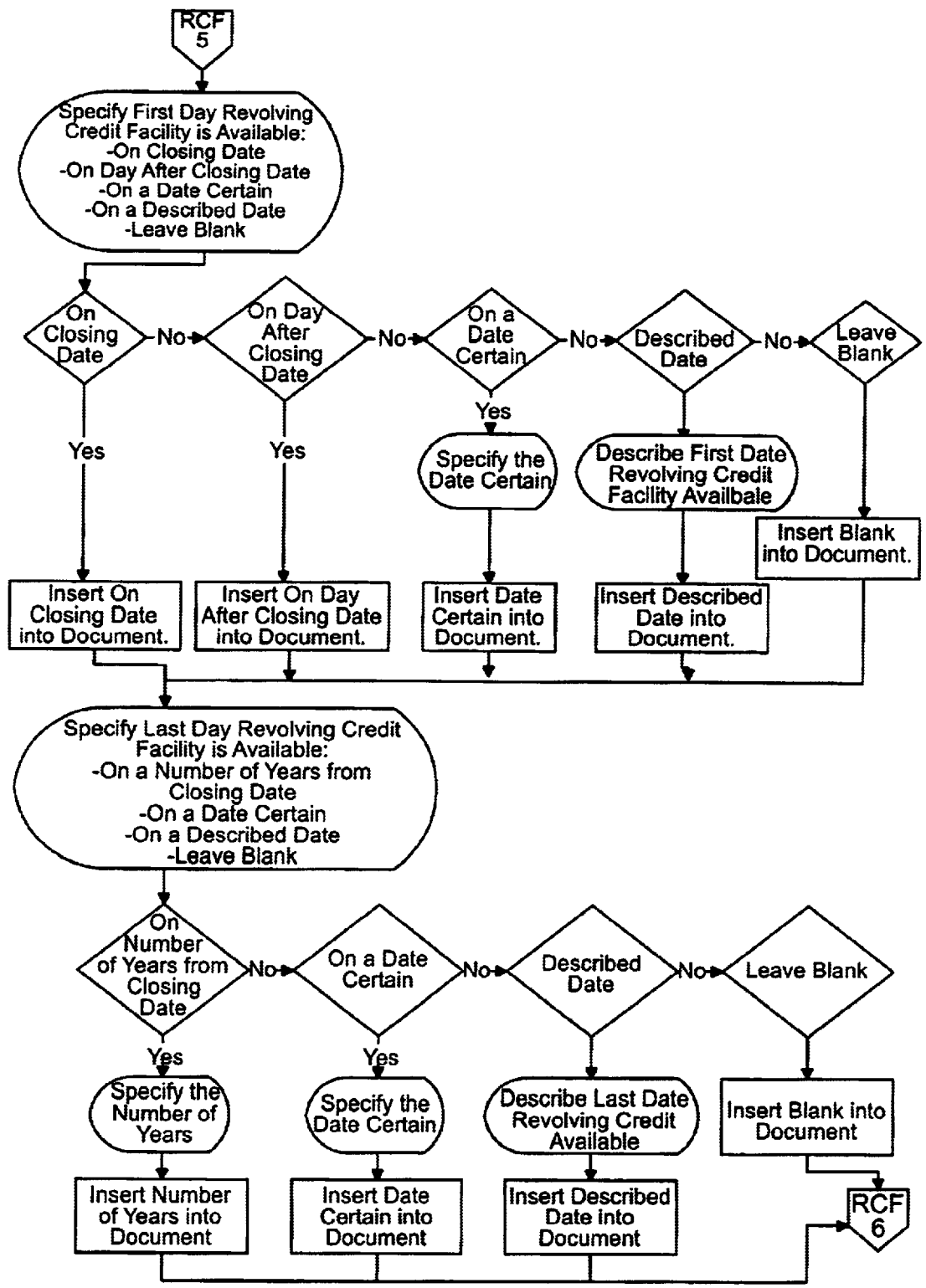
Figure 6P:
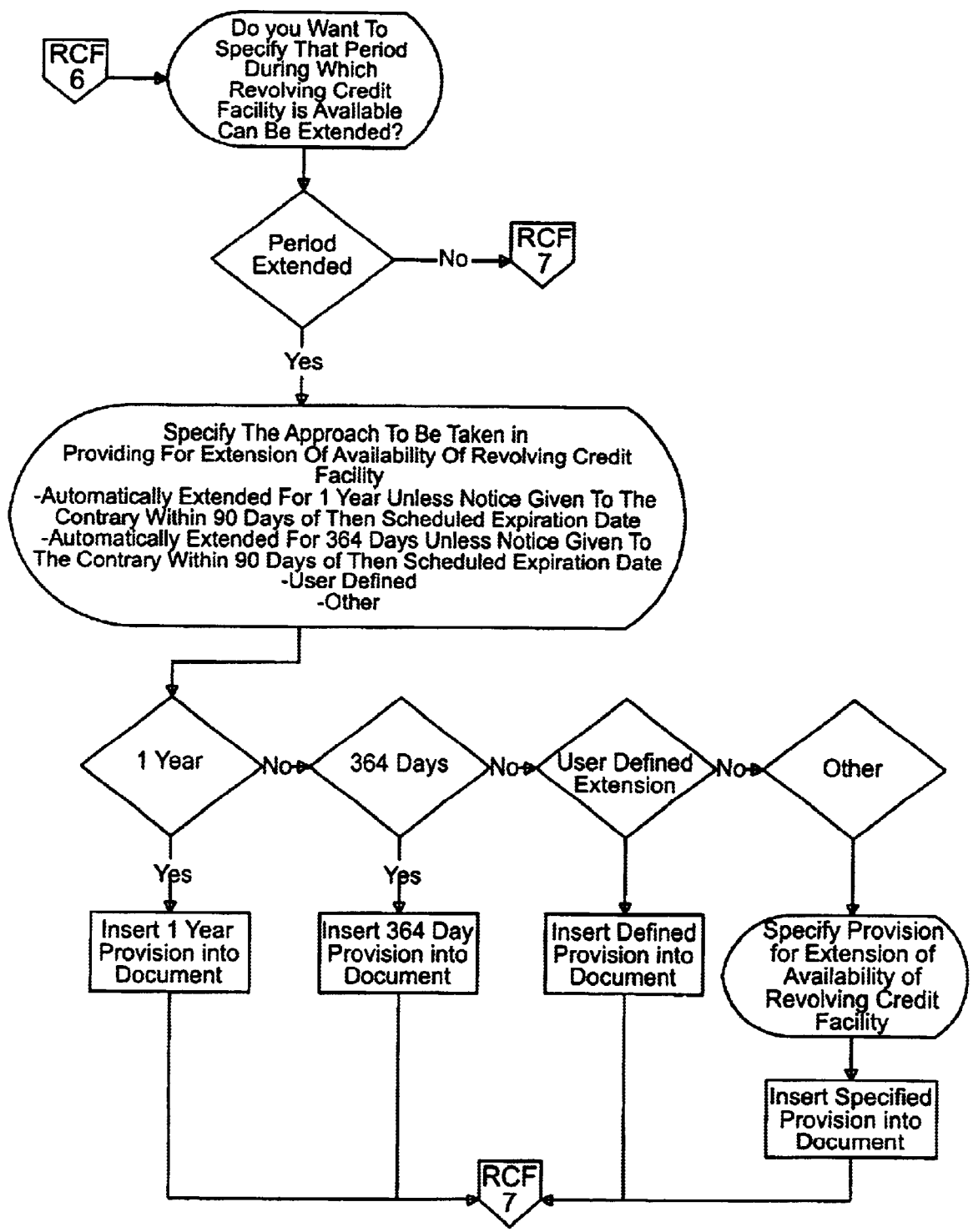
Figure 6Q:
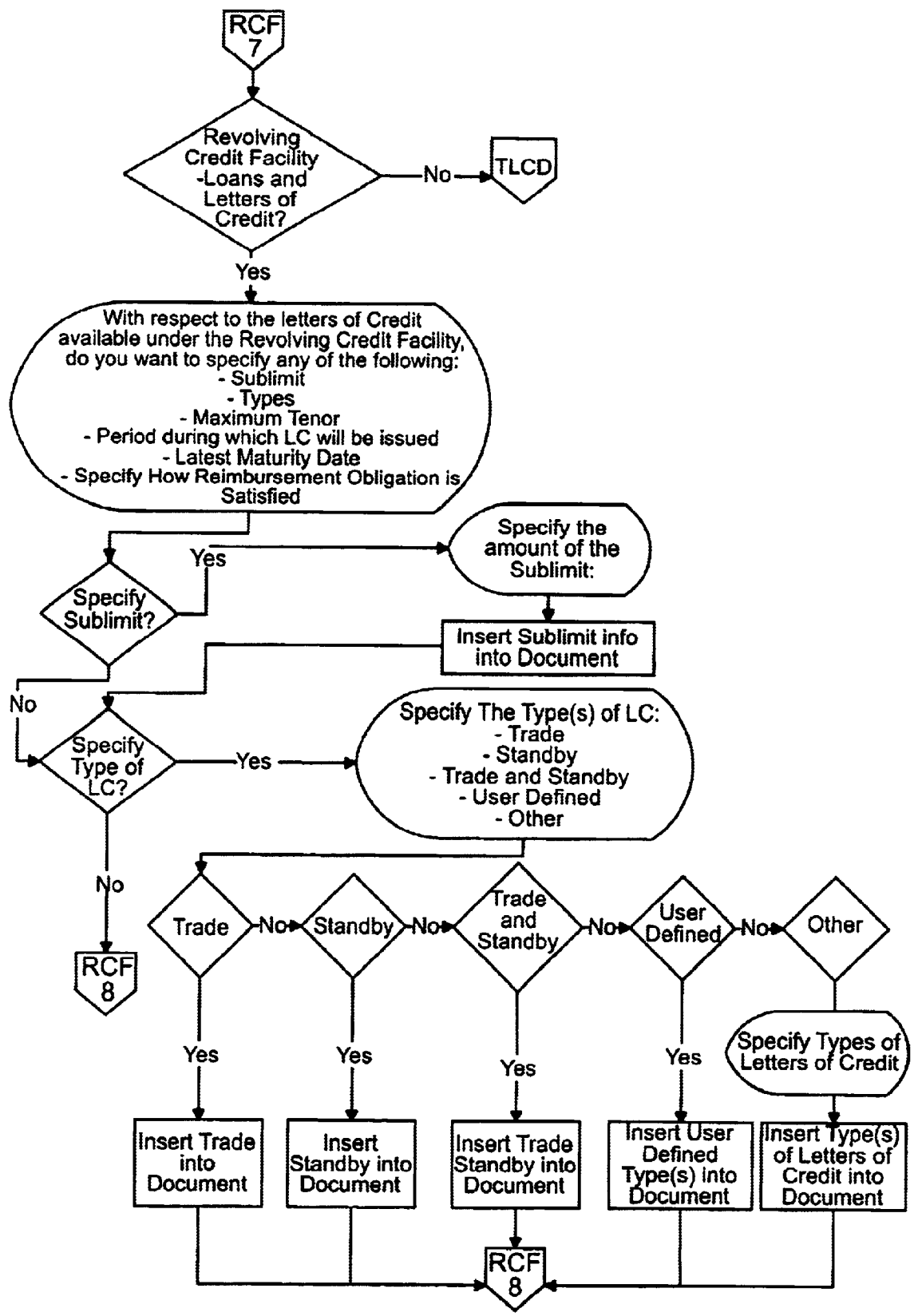
Figure 6R:
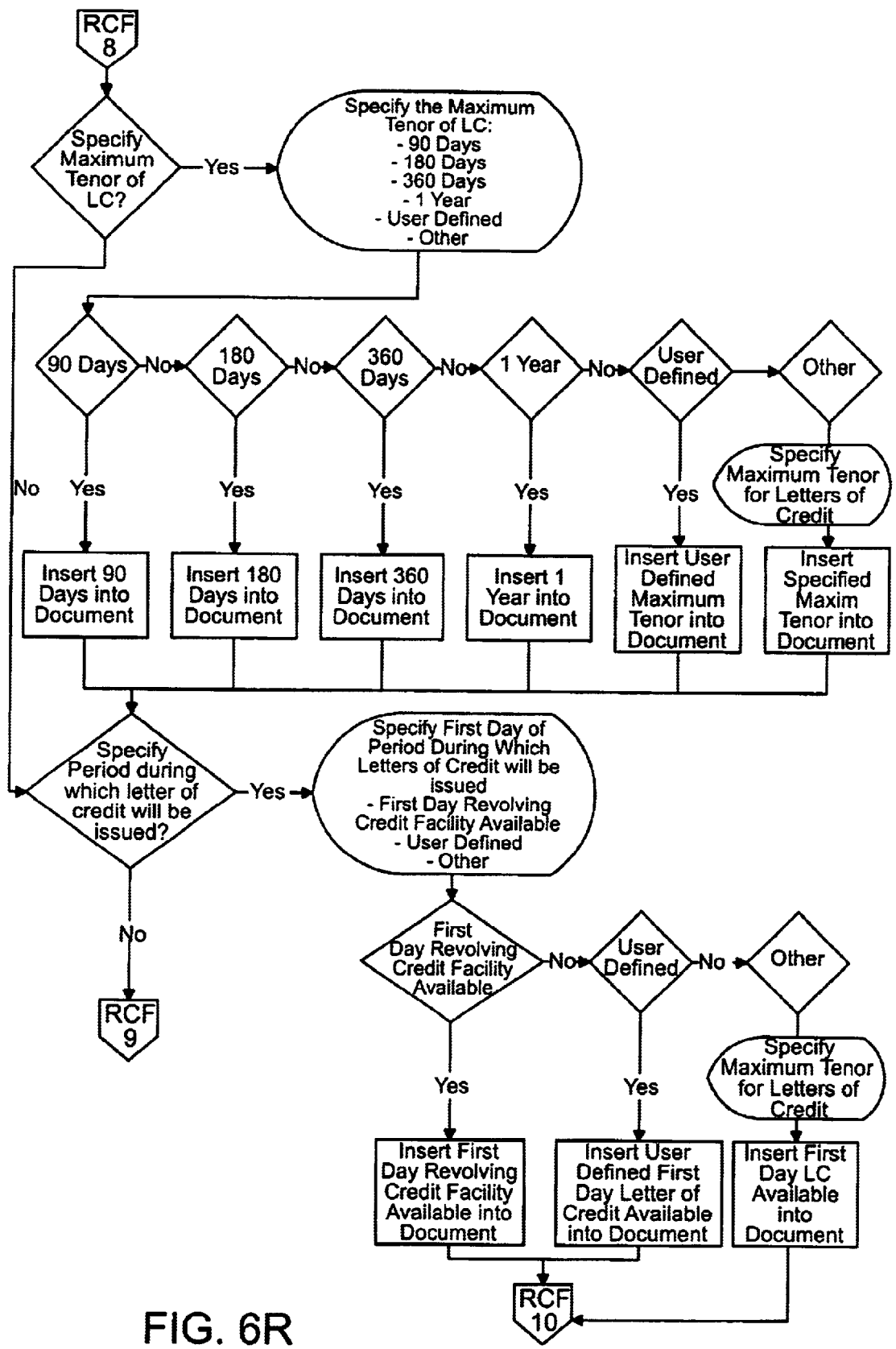
Figure 6S:
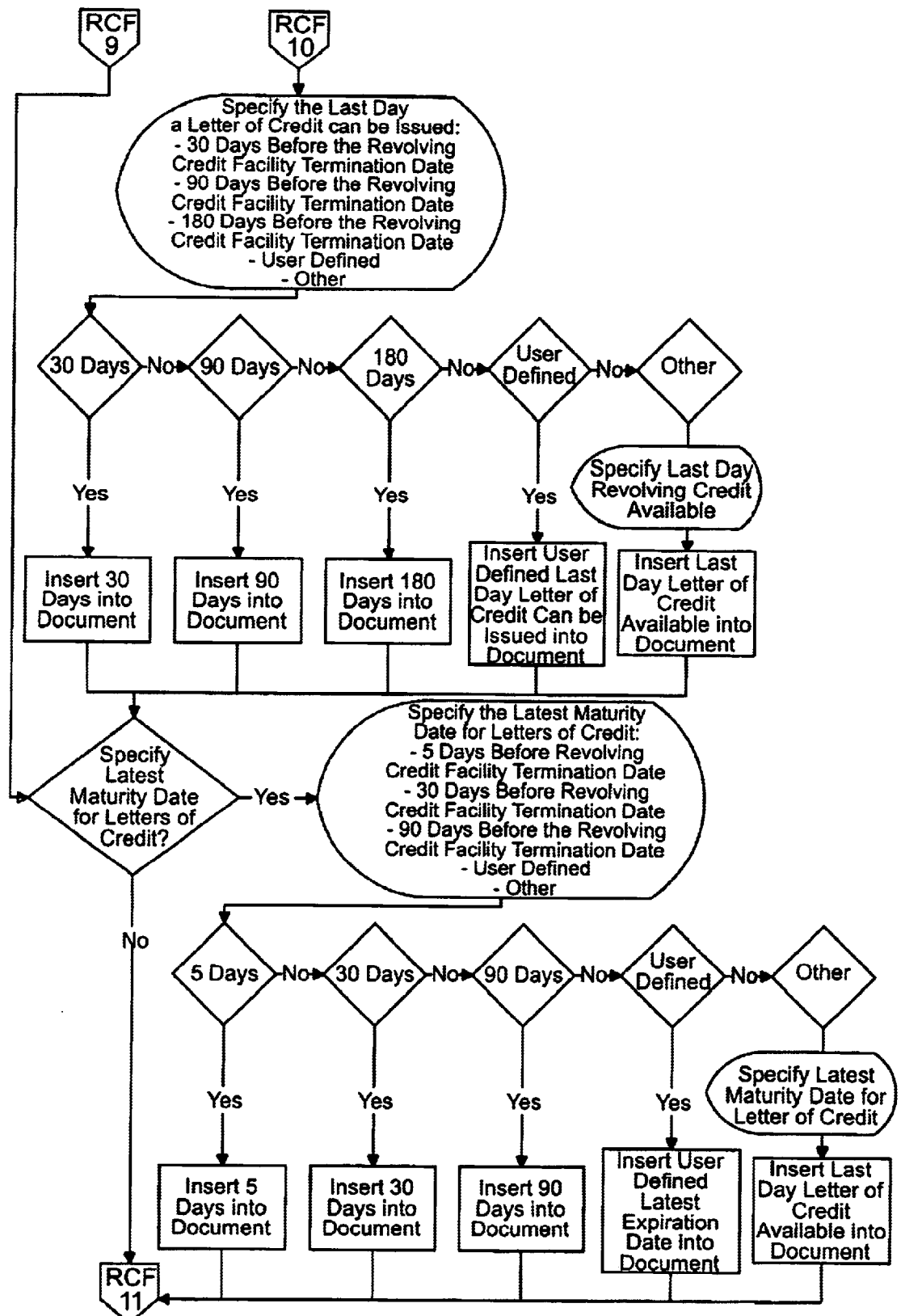
Figure 6T:
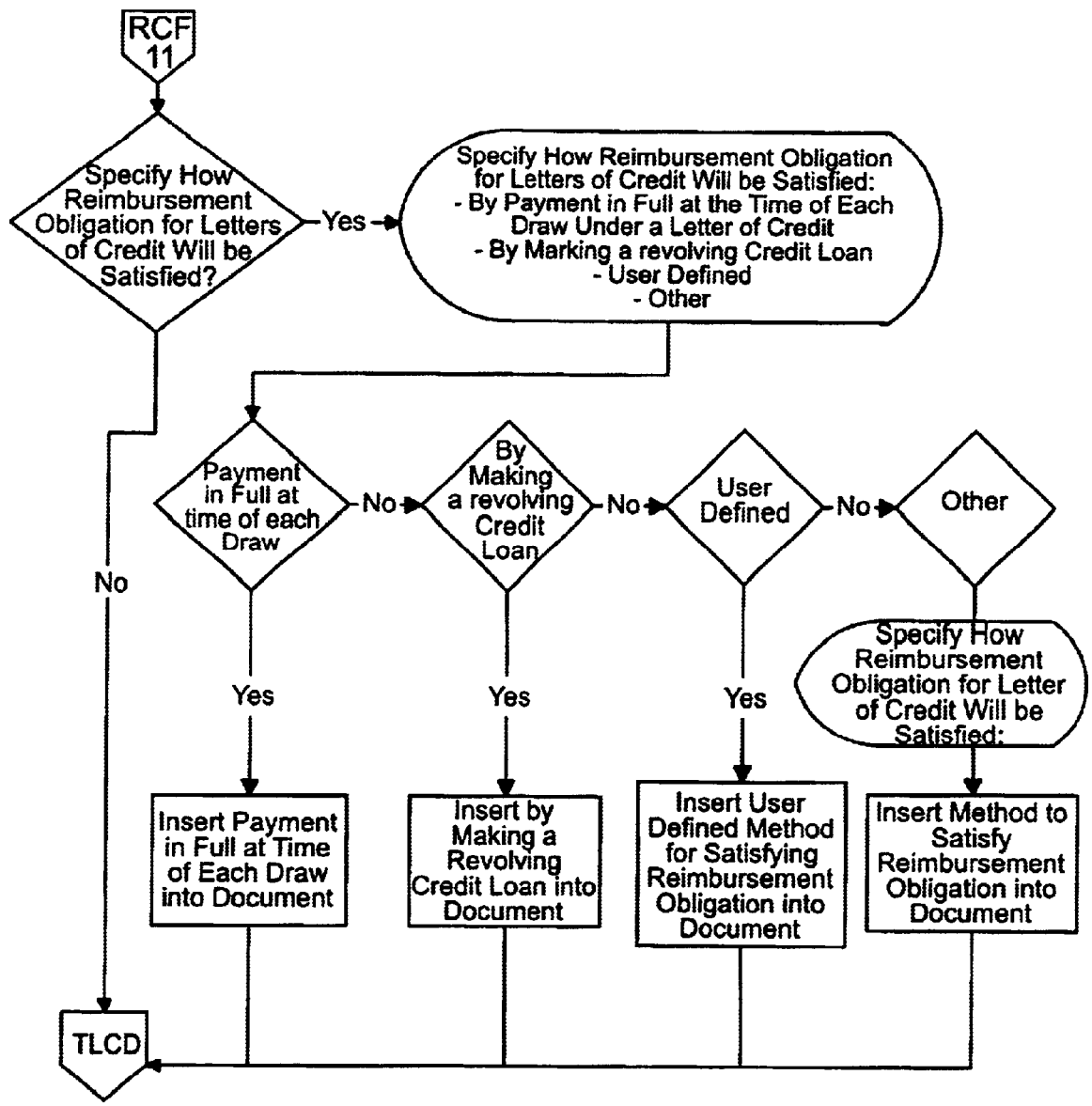
Figure 6U:
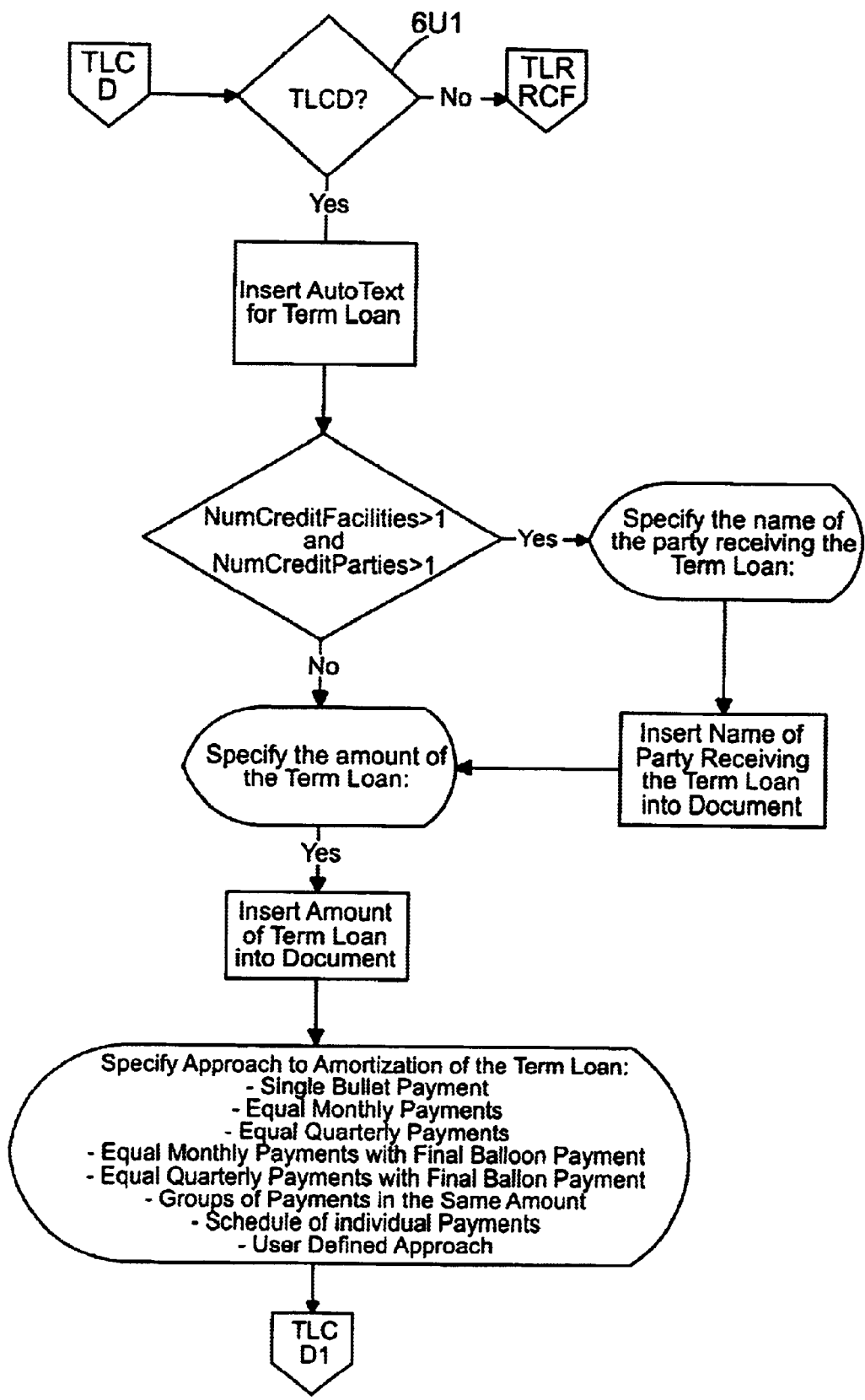
Figure 6V:
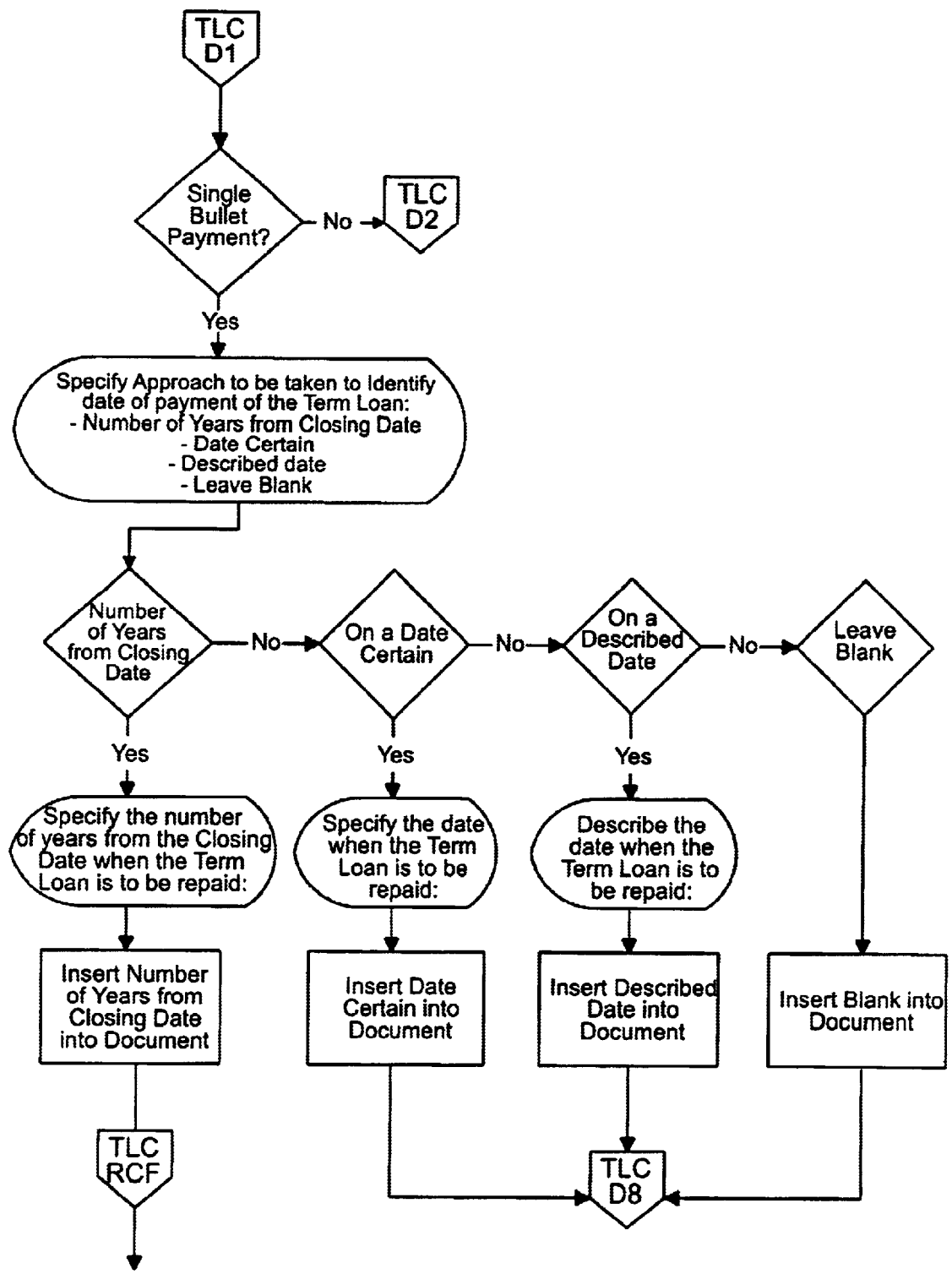
Figure 6W:
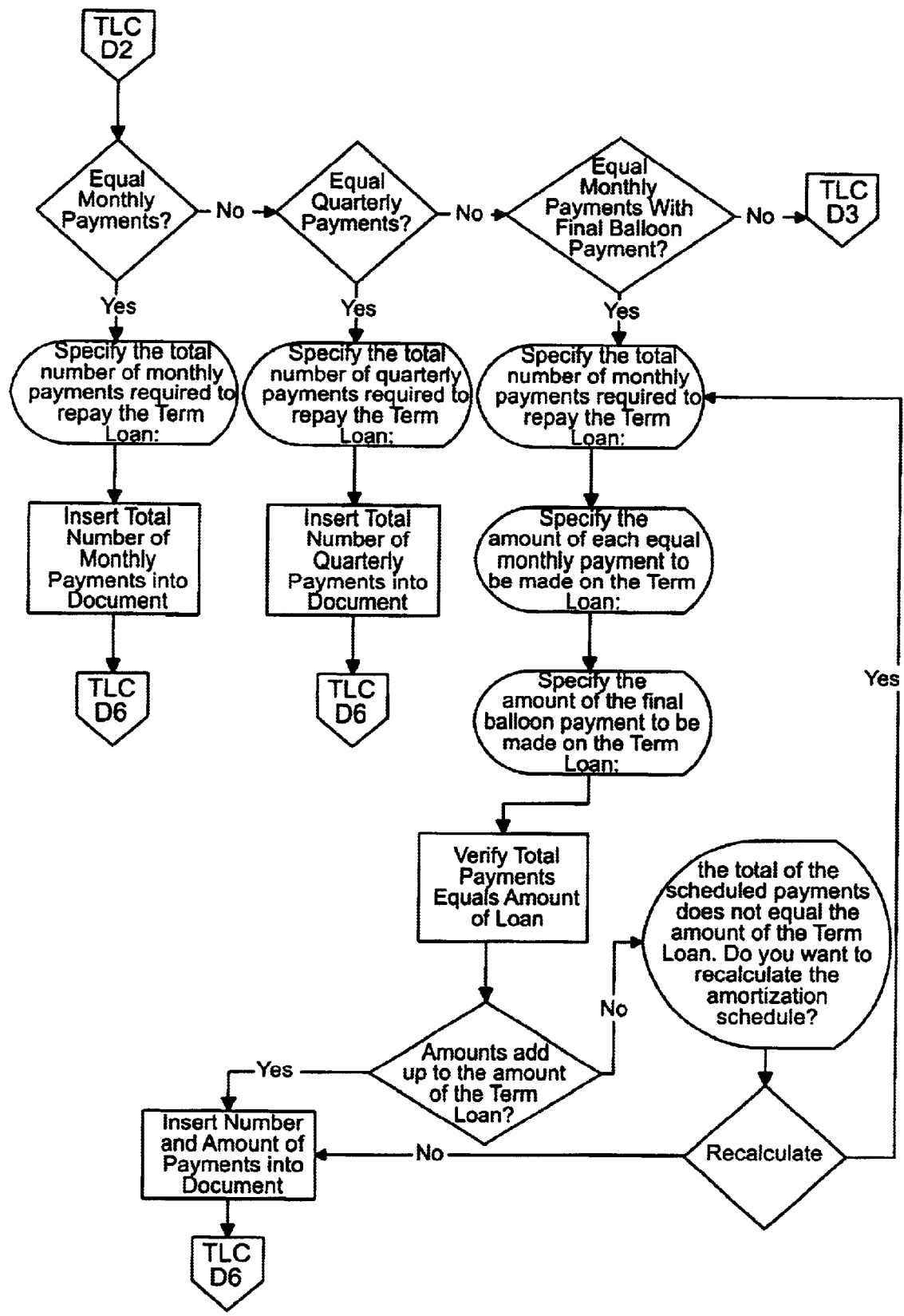
Figure 6X:
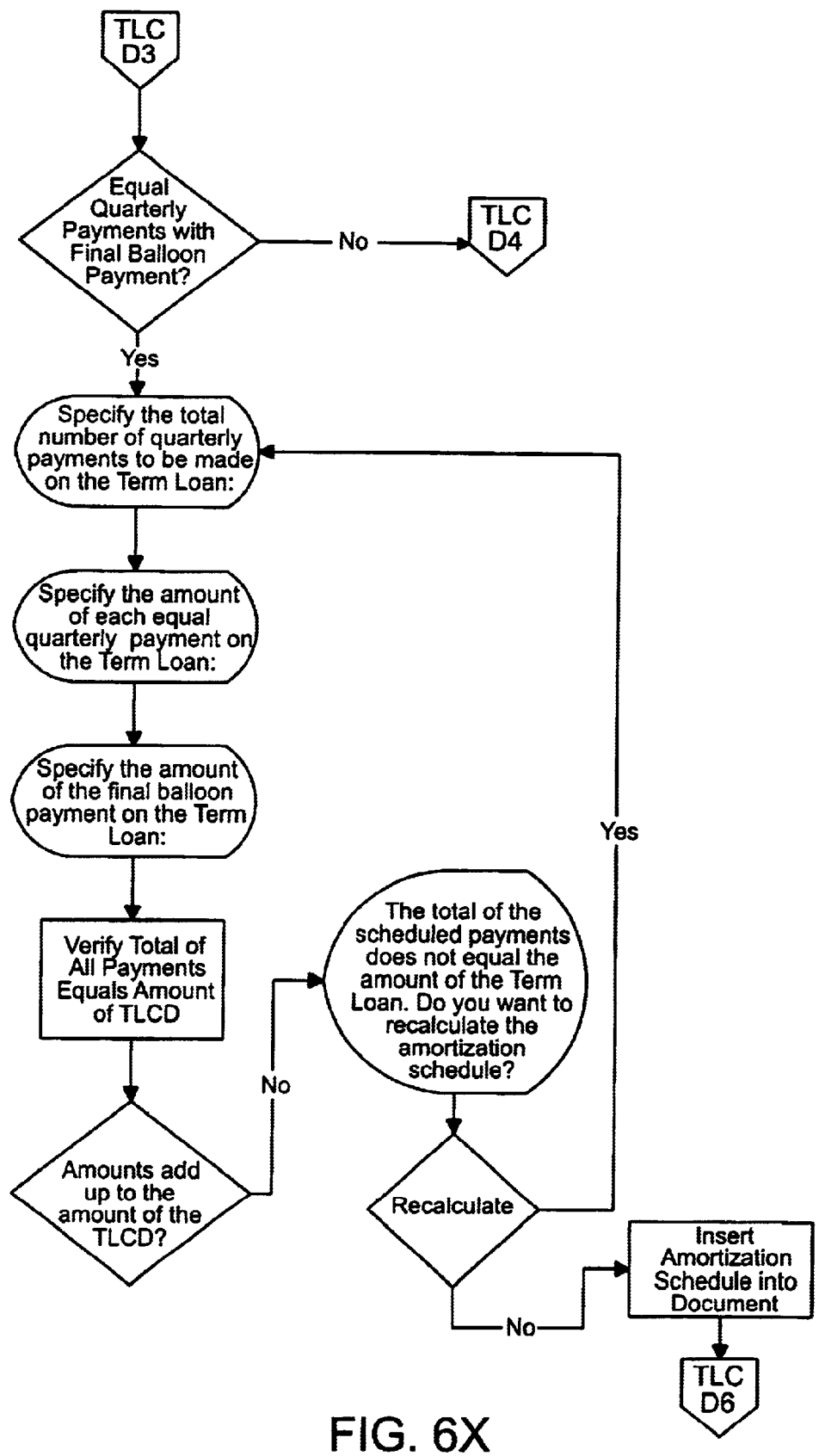
Figure 6Y:
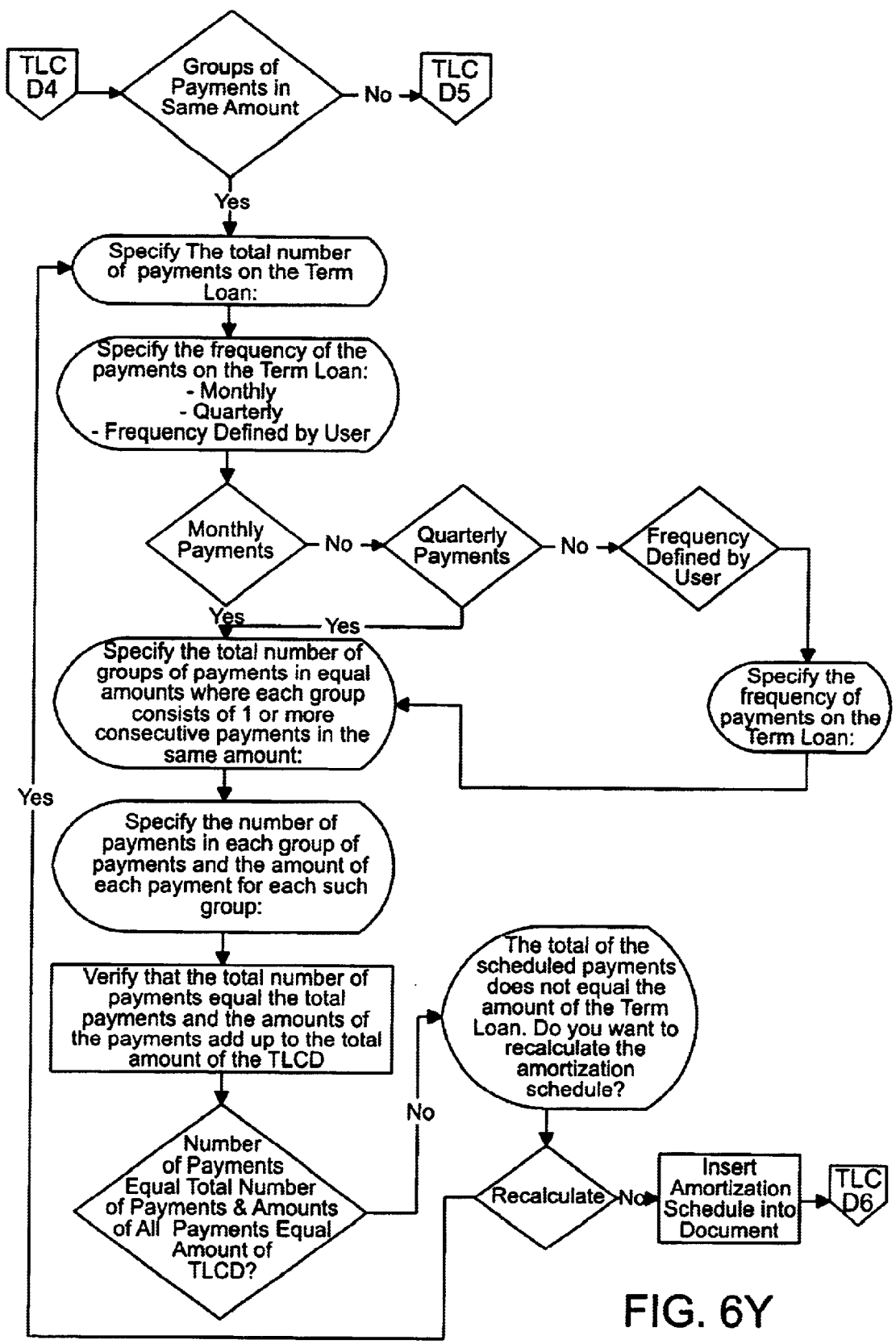
Figure 6Z:
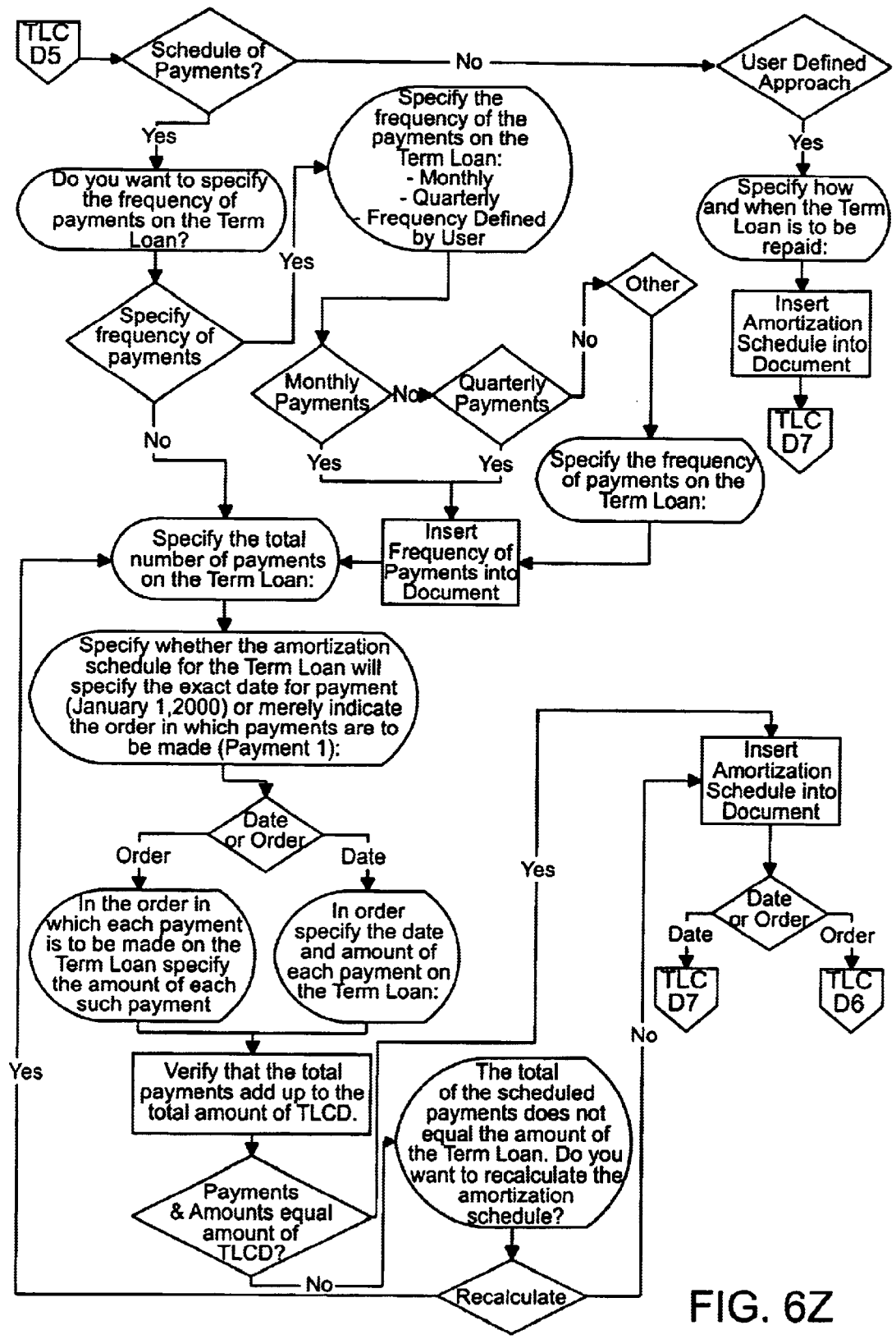
Figure 6A:
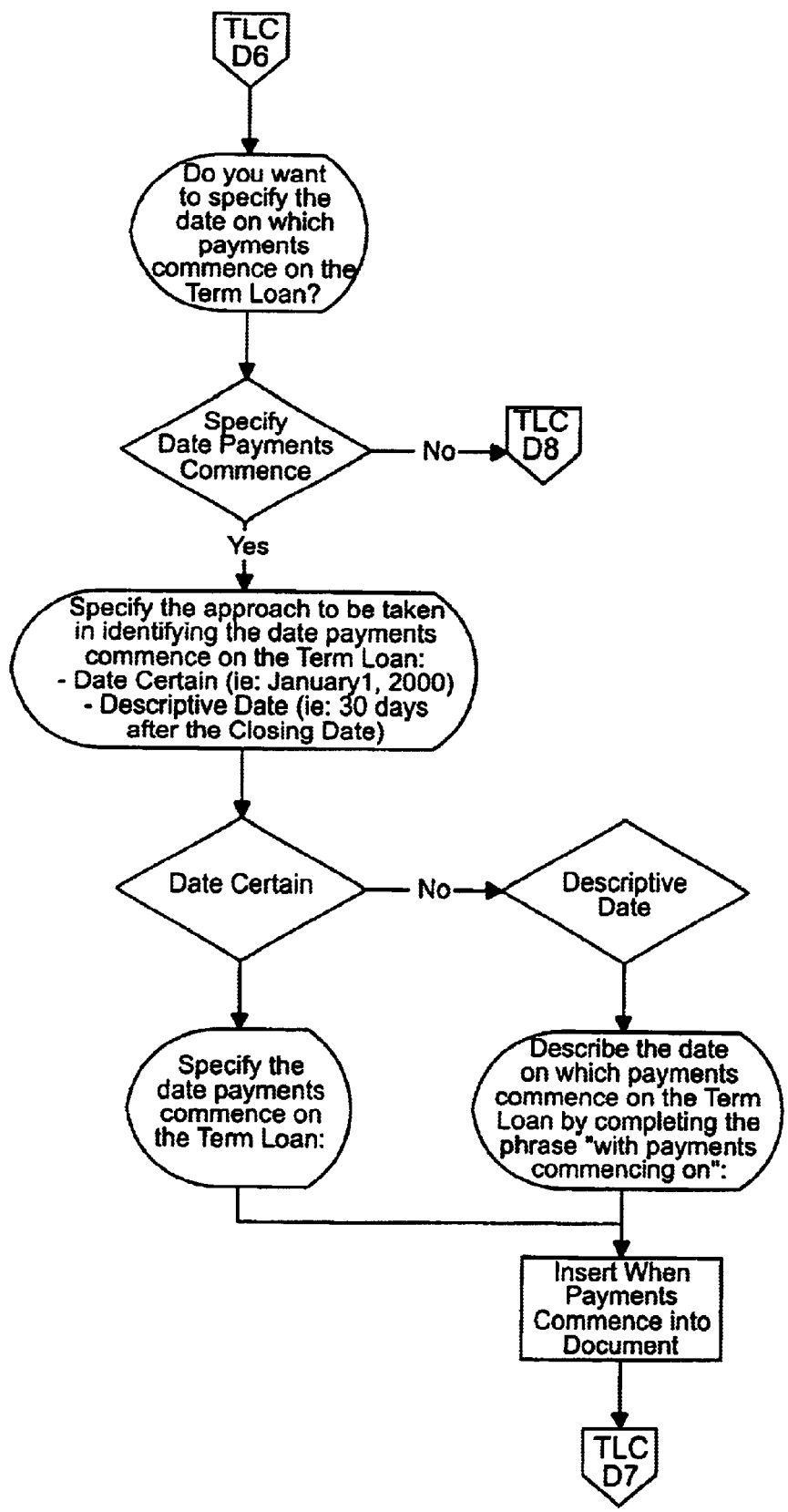
Figure 6B:
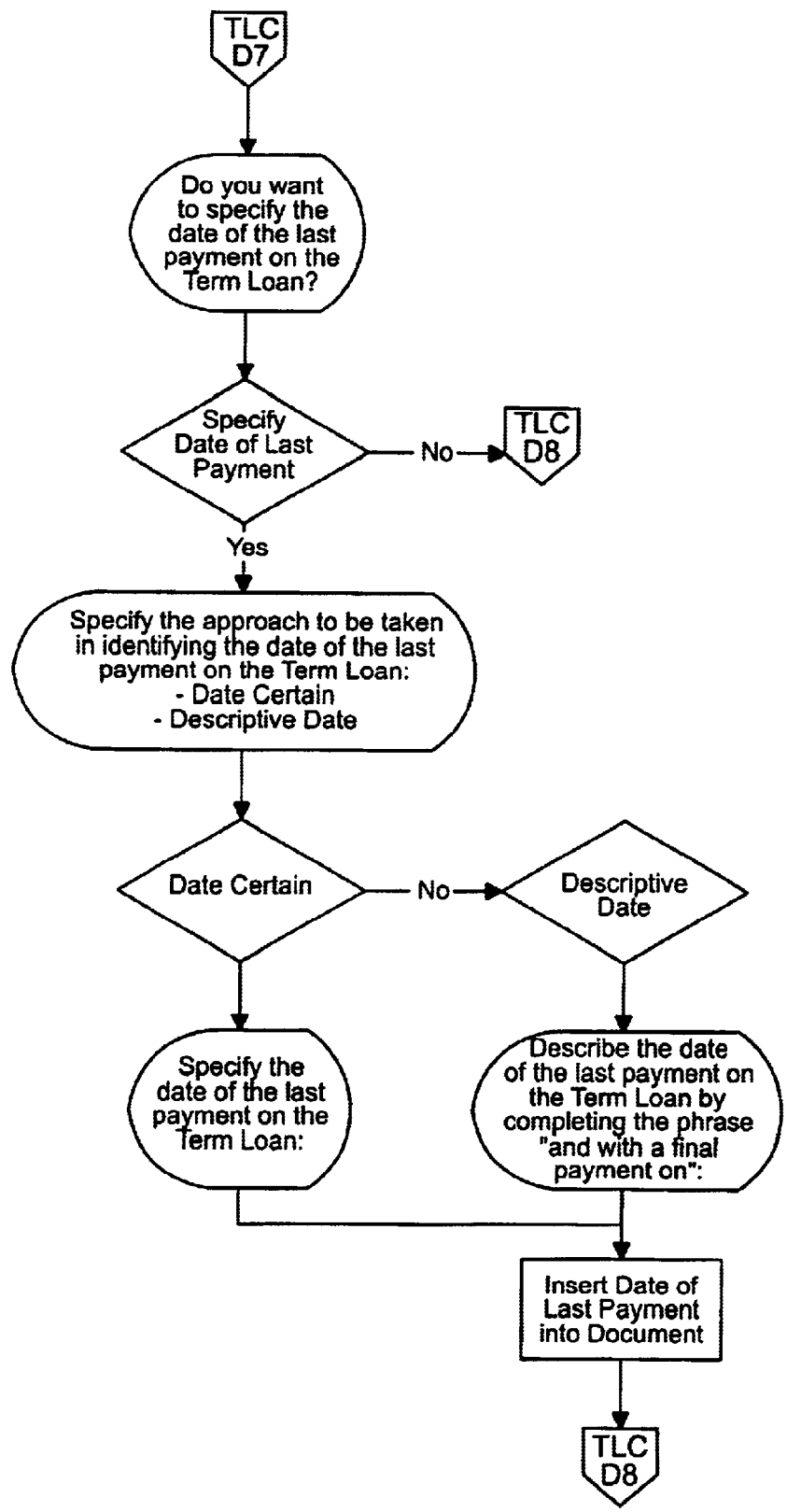
Figure 6C:
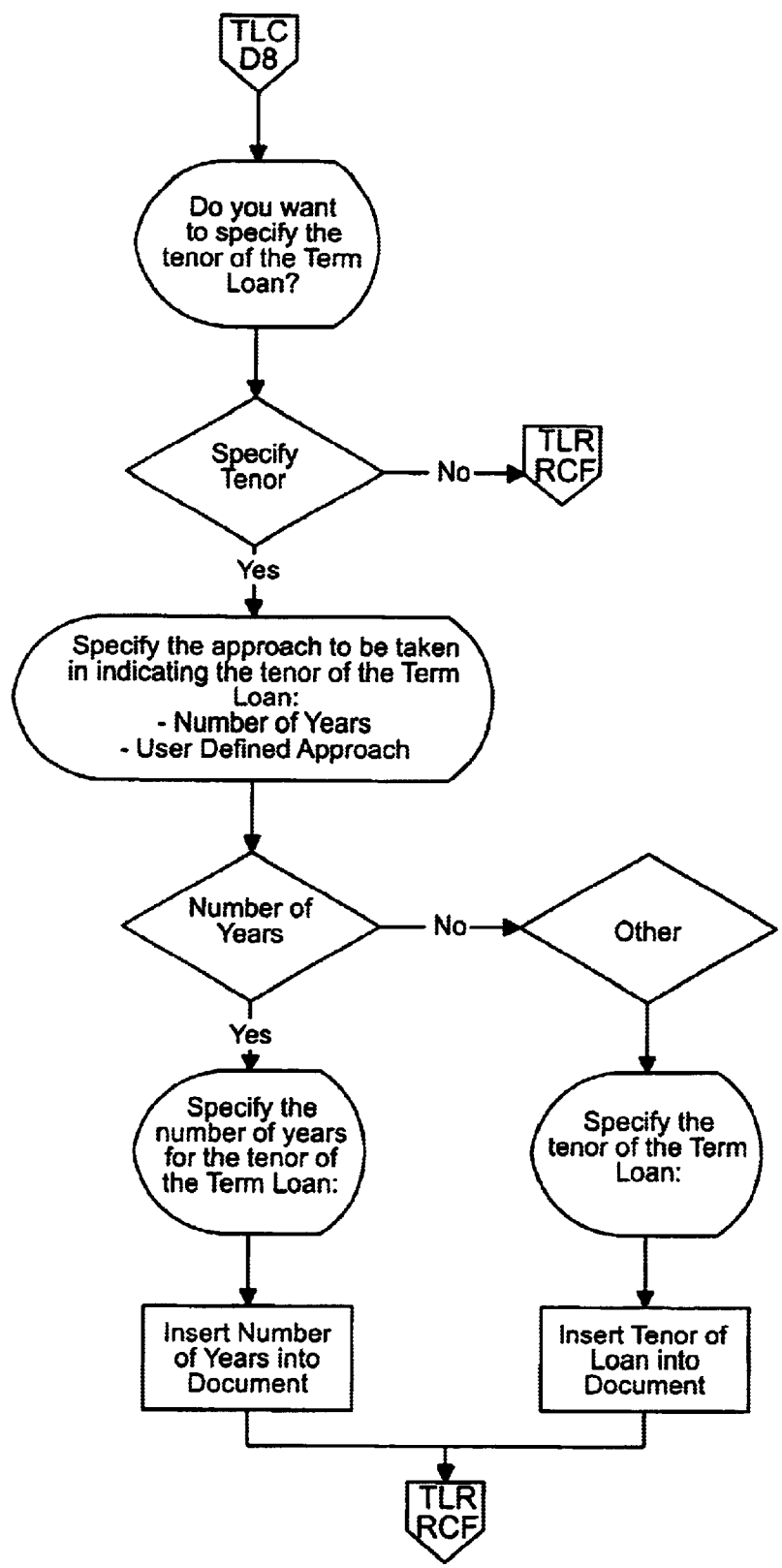
Figure 6D:
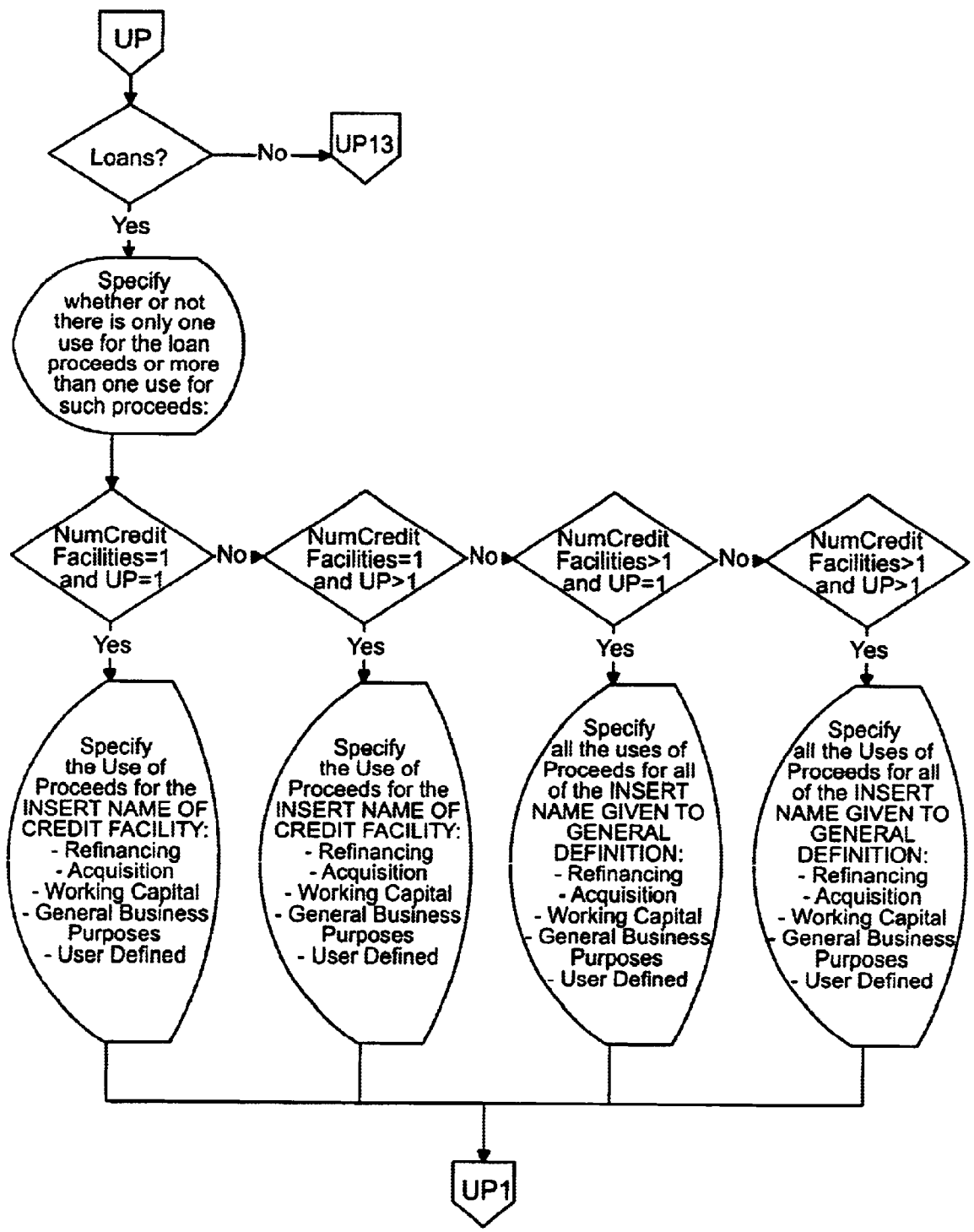
Figure 6E:
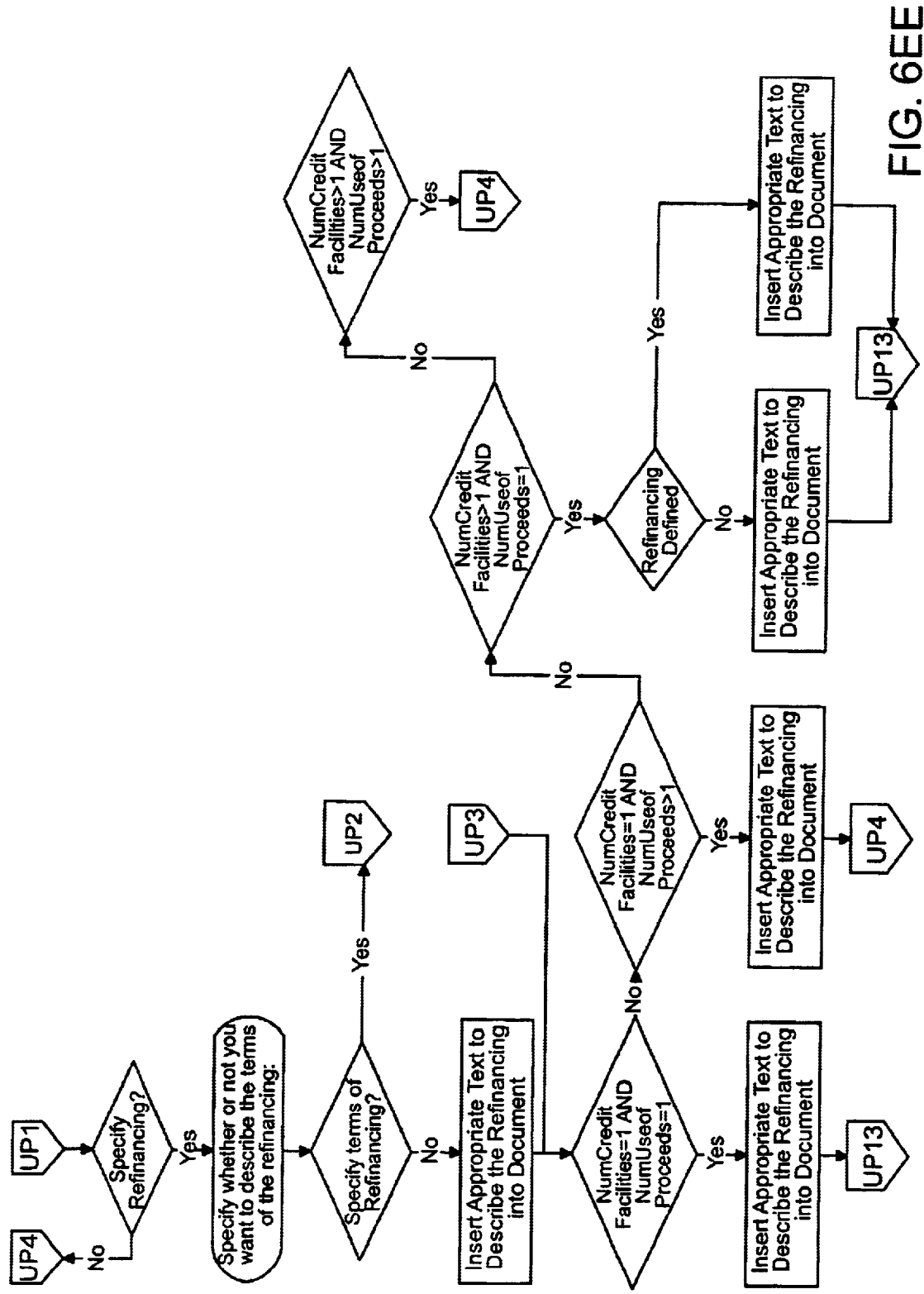
Figure 6F:
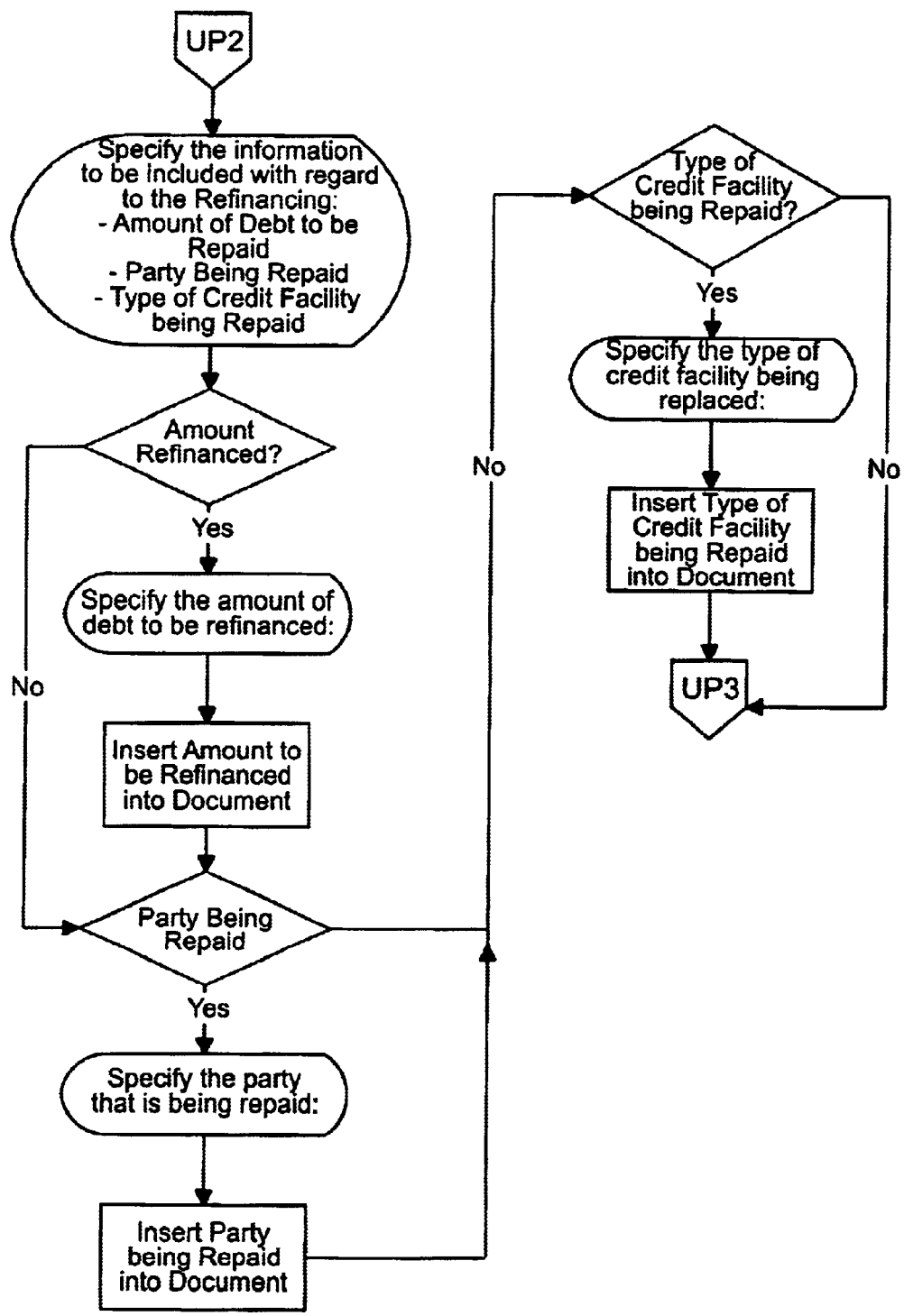
Figure 6G:
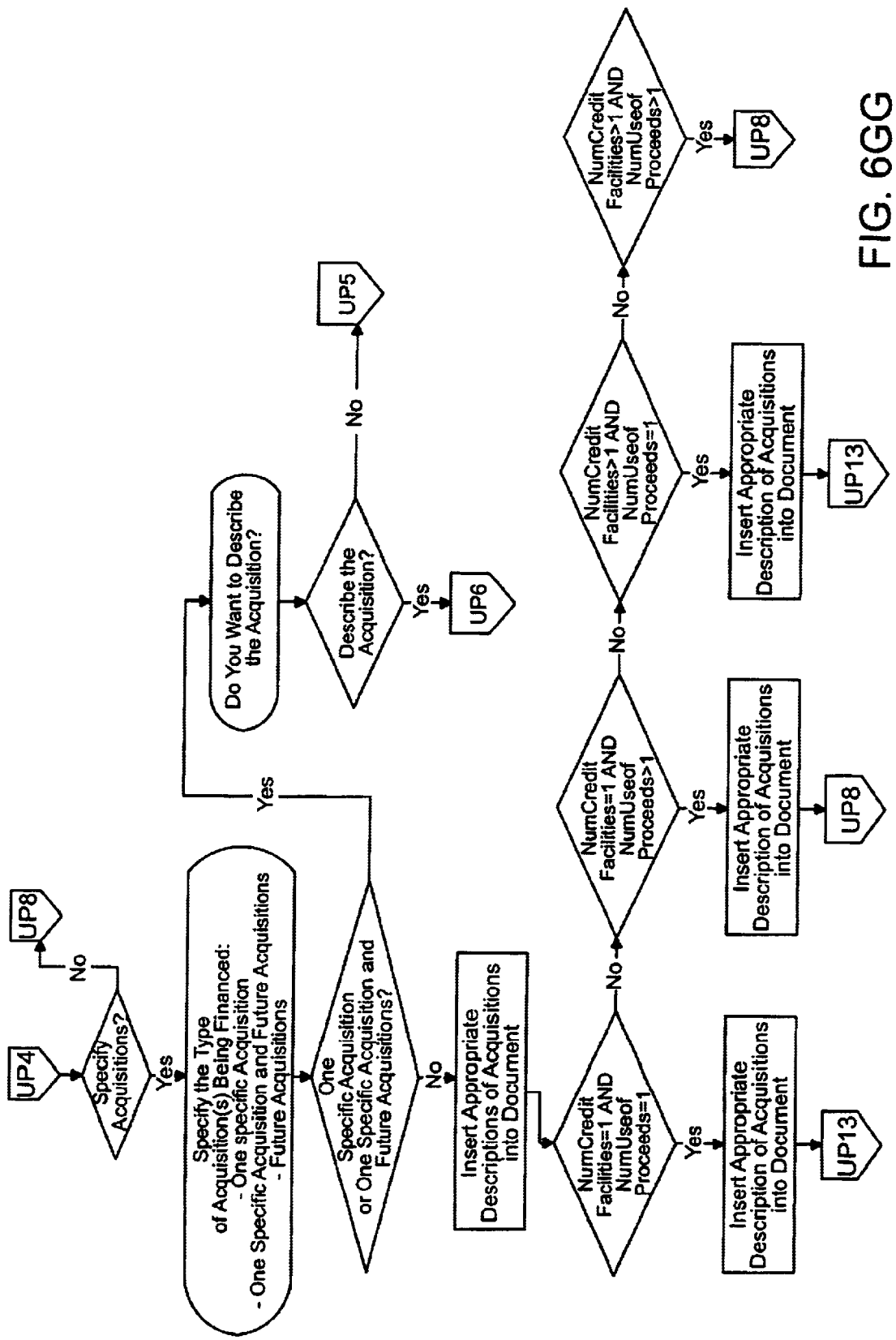
Figure 6H:
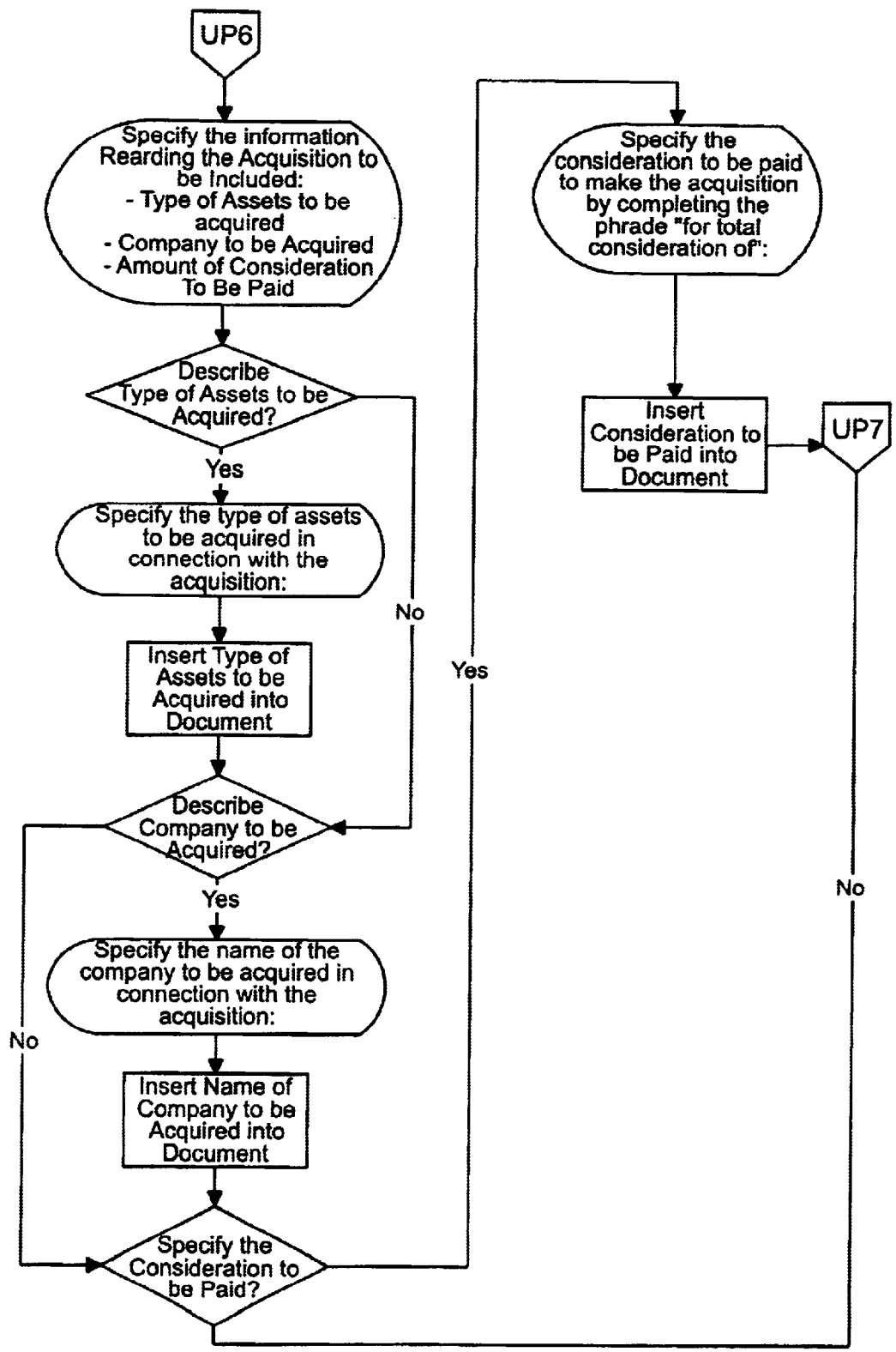
Figure 7:
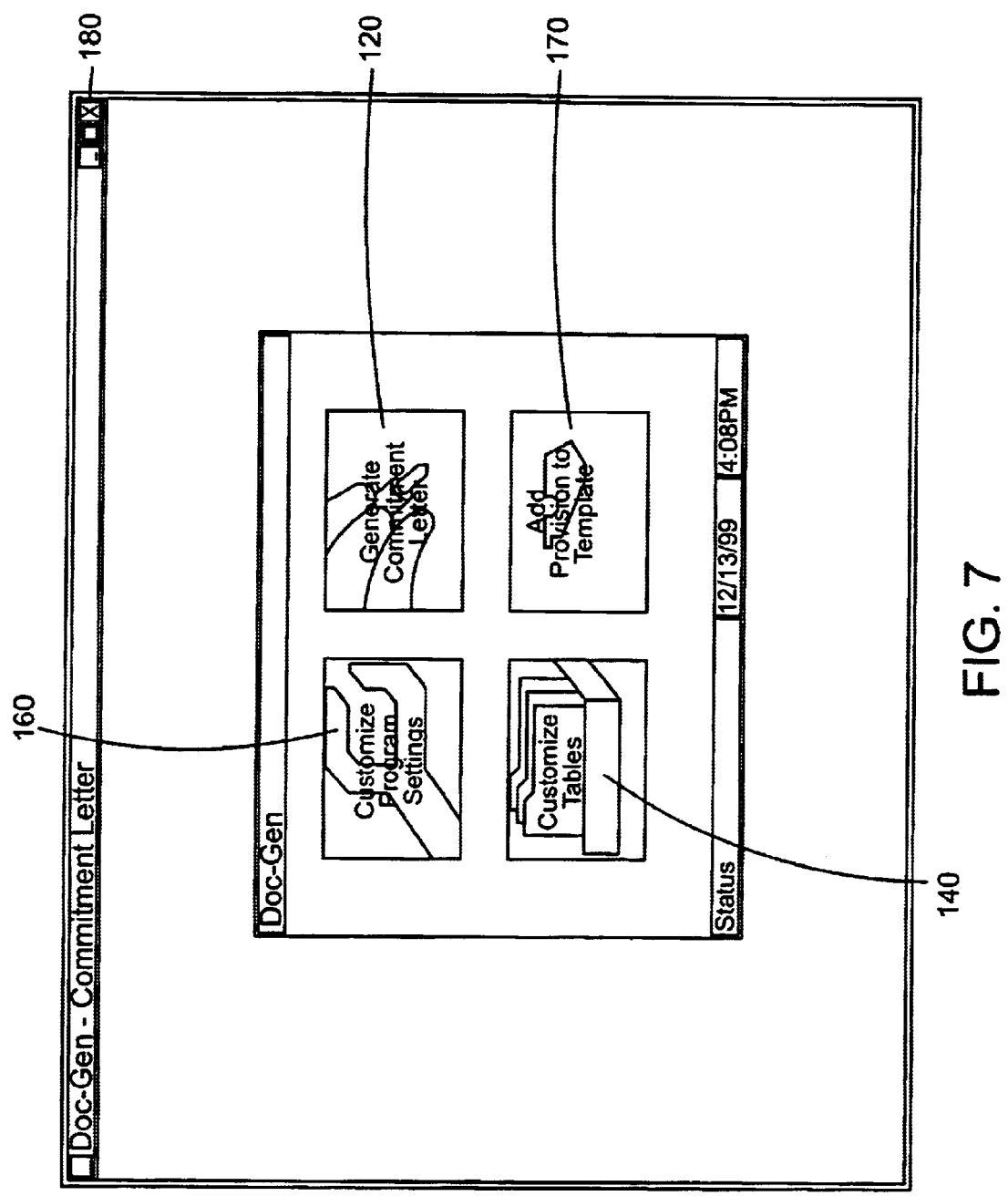
Figure 9:
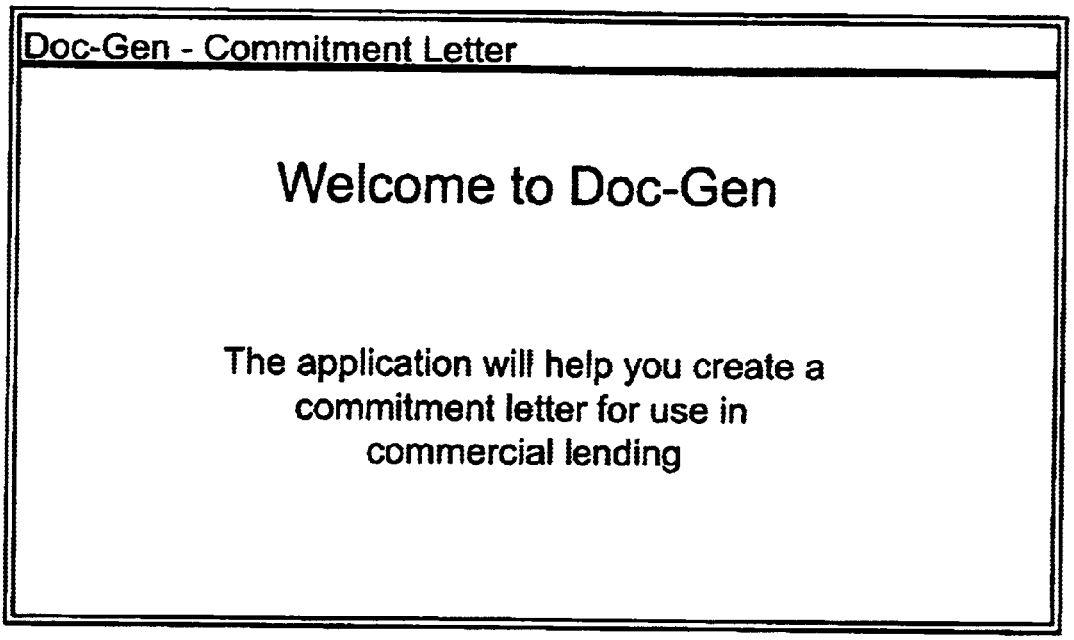
Figure 10:
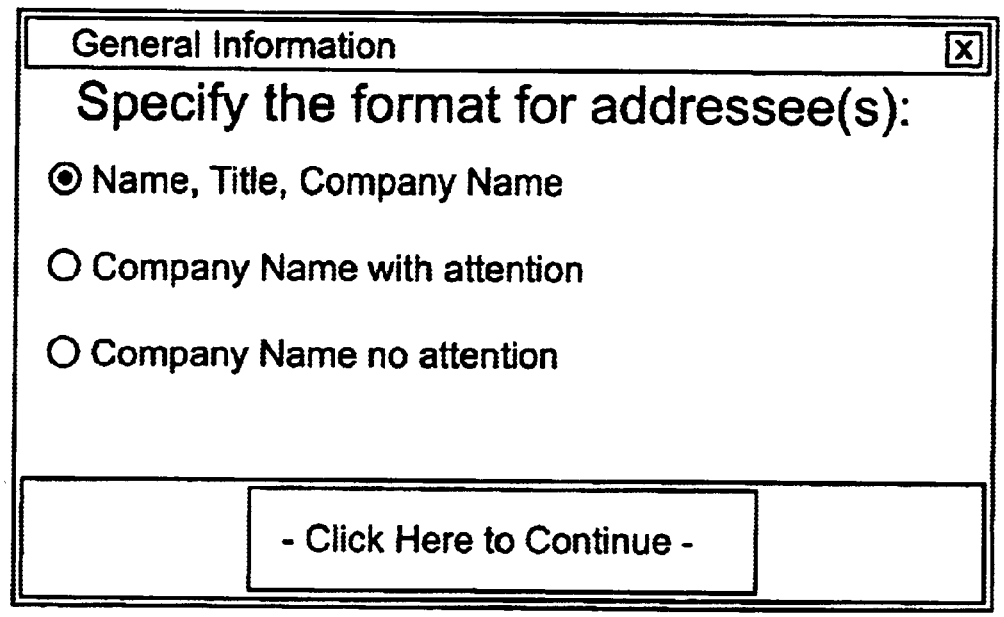
Figure 14:
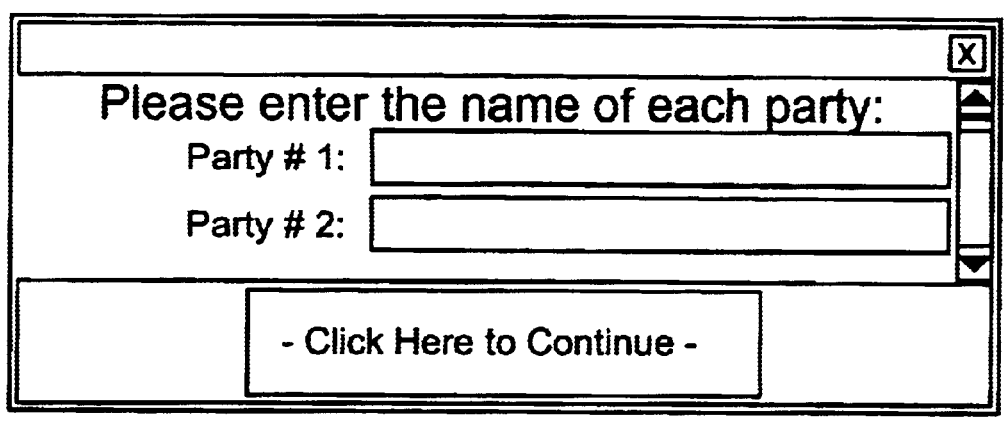
Figure 15:
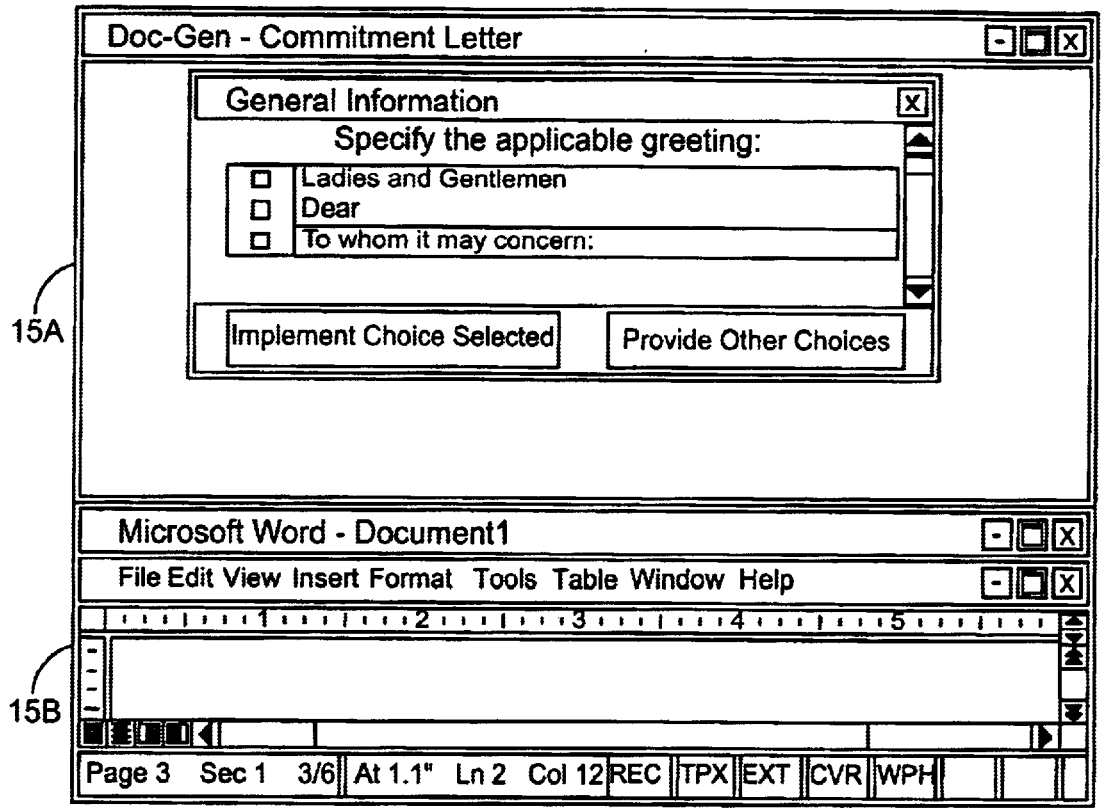
Figure 16:
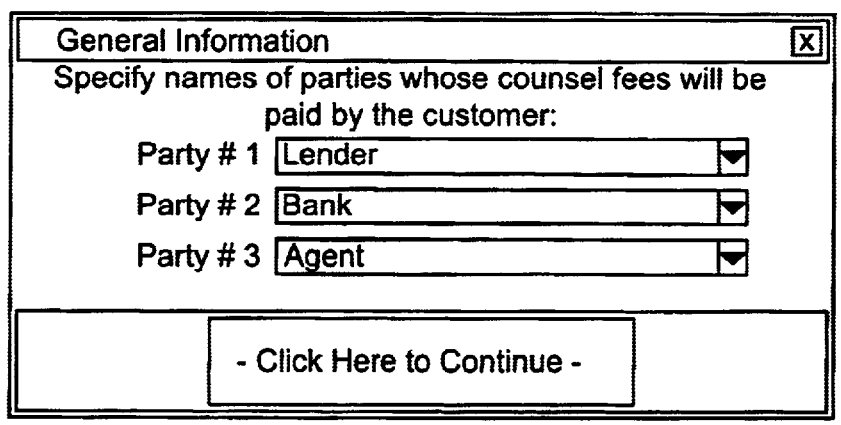
Figure 17:
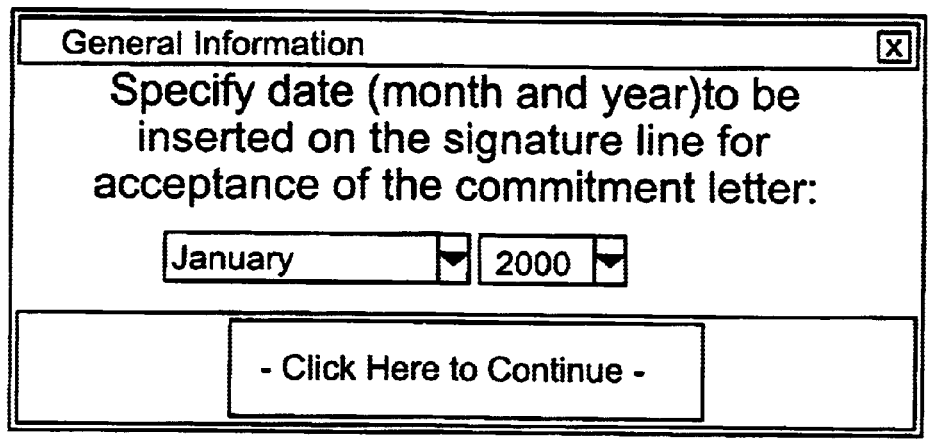
Figure 18:
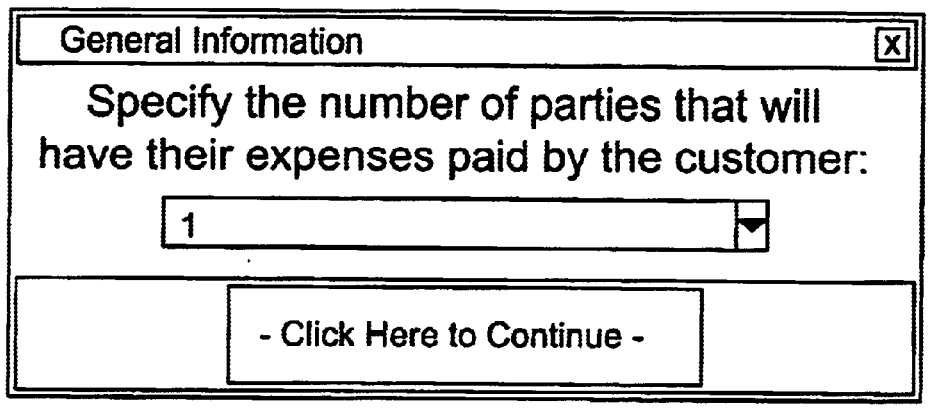
Figure 19:
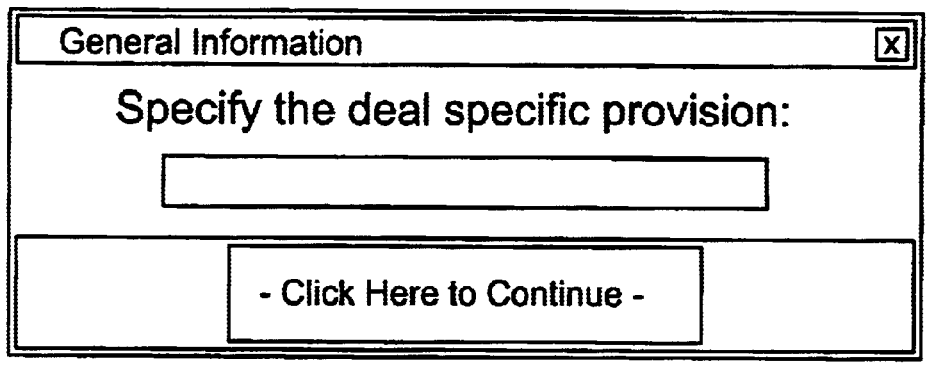
Figure 24:
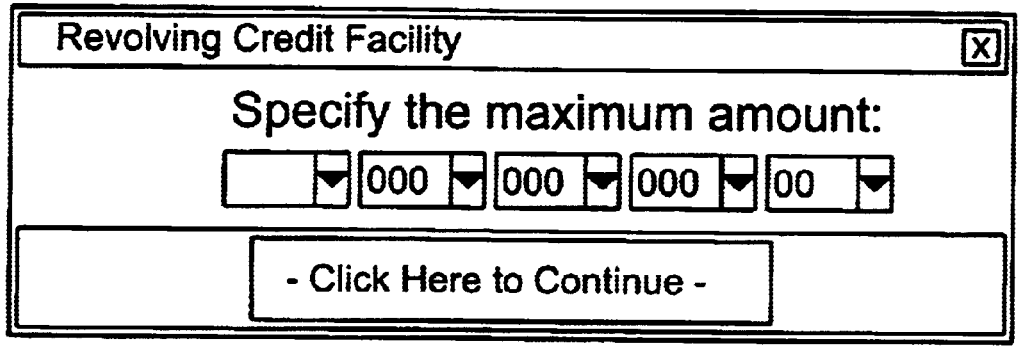
Figure 25:
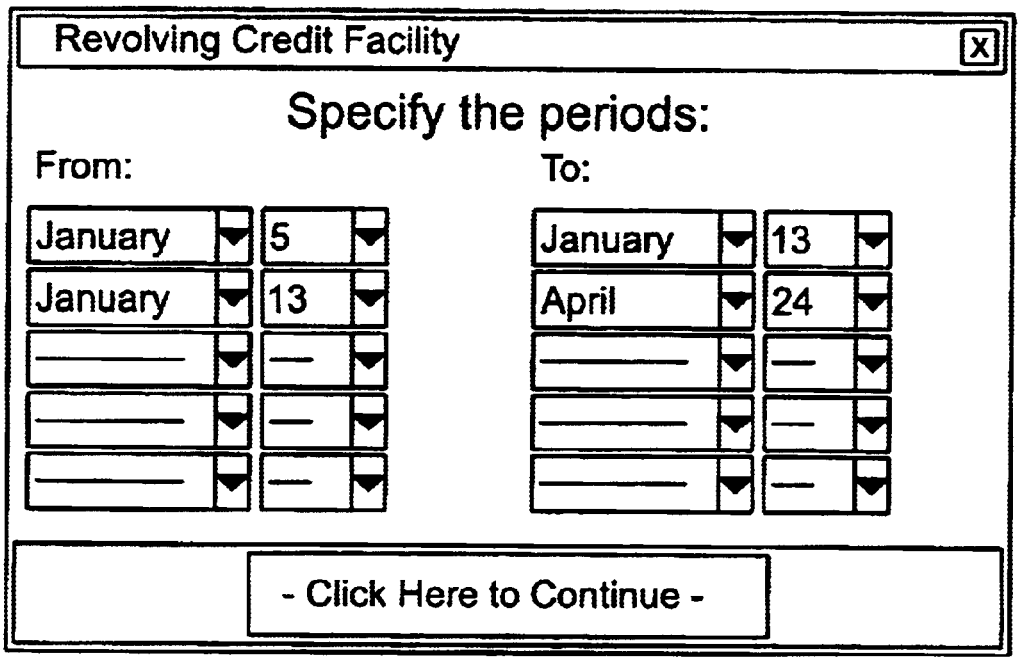
Figures 30, 31, 32:
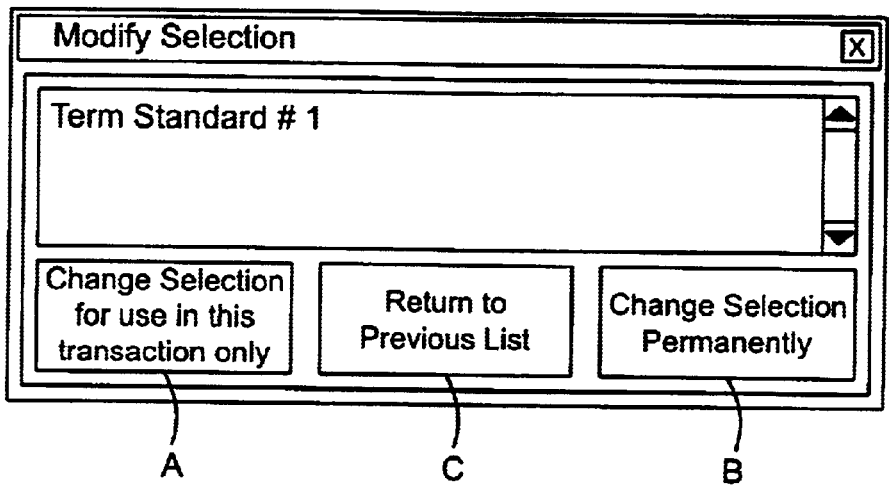

FIGS. 6A–6Z and 6AA–6QQ are detailed flowcharts of portions of the program implemented by the programming environment according to the present invention;

FIG. 7 is a main screen display form which is displayed upon startup and entry into the document generation system according to the present invention;

Figure 8E:
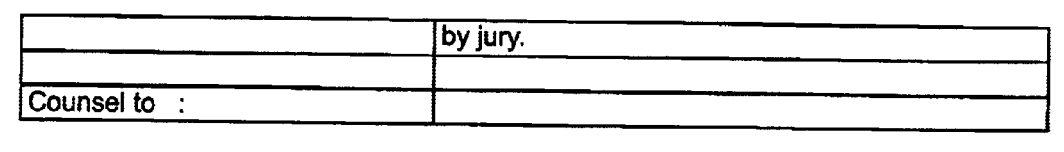

FIGS. 8A–8E are one example of a word processing template used in creating a document according to the system of the present invention;

FIG. 9 shows an entry form screen display according to the present invention;

FIG. 10 shows a form formatted for specifying addressees;

FIG. 11 shows one example of a form formatted for specifying Boolean inputs, i.e., yes or no, true or false, for the system of the present invention;

FIG. 12 shows a form, in this case, a "combo" form, formatted for specifying date information;

FIG. 13 is an example of a form formatted for specifying text, either from a drop-down menu or for directly entry;

FIG. 14 shows an example of a form formatted for entering text into multiple text boxes;

FIG. 15 shows an example of a form formatted for selecting either one or multiple items from a list and further showing how the document being generated is displayed while the user is responding to questions;

FIG. 16 shows an example of a form formatted for selecting from multiple drop-down menus or which allows the user to enter text directly;

FIG. 17 shows an example of a form formatted for the entry of dates;

FIG. 18 shows an example of a form formatted for entering numbers;

FIG. 19 shows an example of a form formatted for entering text;

FIG. 20 shows a customized form, in this case, for entering addressee information;

FIG. 21 shows an example of a customized form for entering party information;

FIG. 22 shows an example of a form formatted for confirming previous answers;

FIG. 23 shows an example of a form formatted for selecting multiple items from a list using a check box routine;

FIG. 24 shows an example of a form formatted for entering dollar amounts;

FIG. 25 shows an example of a form formatted for specifying periods of time;

FIG. 26 shows an example of another form formatted for specifying periods of time in a descriptive way;

FIG. 27 shows an example of a form formatted for defining an amortization schedule;

FIG. 28 shows an example of a form formatted for entering starting and ending dates as well as dollar amounts for certain periods;

FIG. 29 shows an example of a form formatted so as to allow the user to prepare provisions that the user wants in the document that is being generated;

FIG. 30 shows an example of a form formatted for editing a record;

FIG. 31 shows an example of a form formatted for editing records in the data base; and FIG. 32 show an example of a form formatted so that selections of tables in the data base to be edited can be made.

DETAILED DESCRIPTION OF EMBODIMENTS OF THE INVENTION

Figure 1:
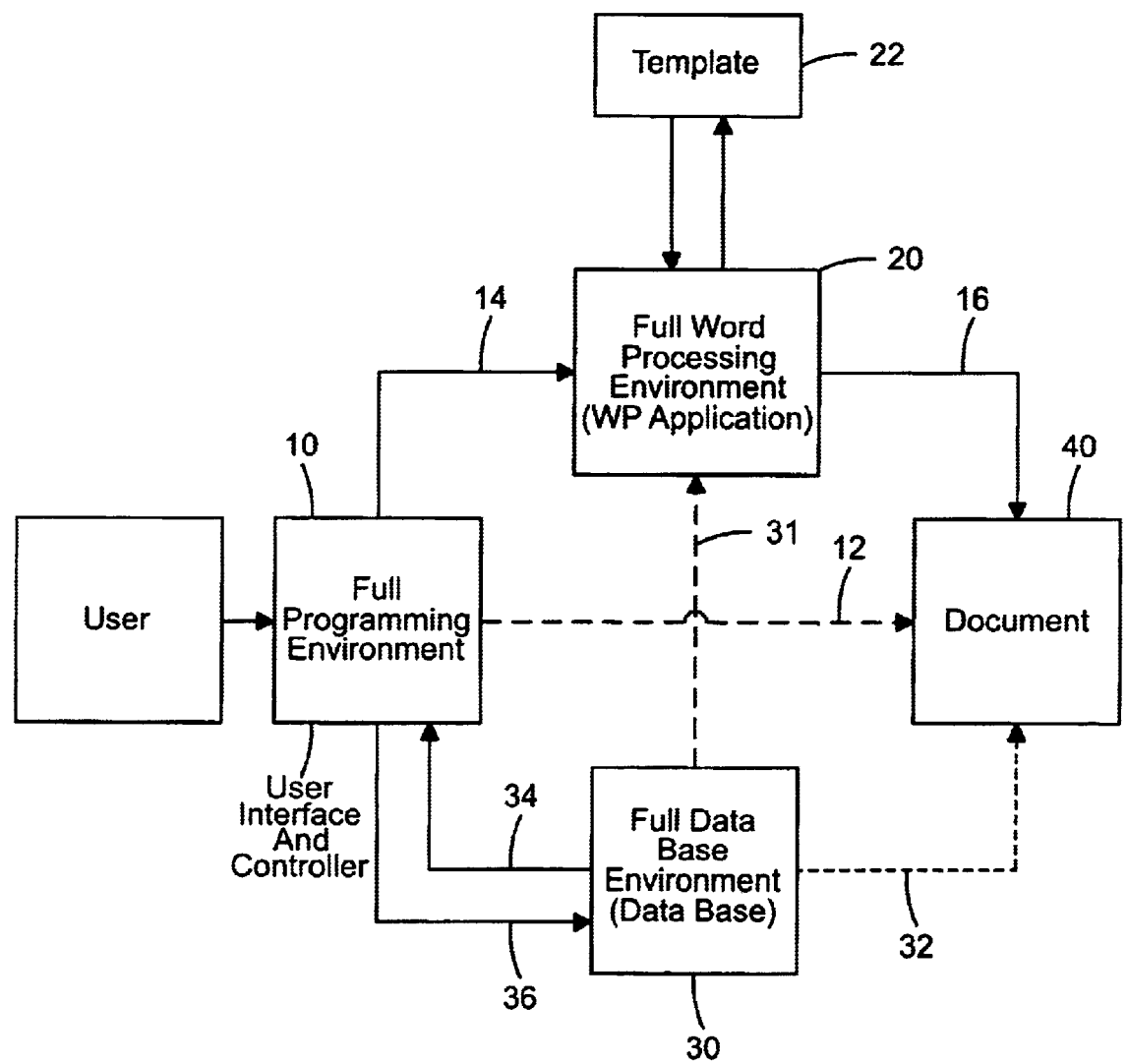
FIG. 1 shows a general overview of the system according to the present invention as installed on a general purpose computer, such as a personal computer (PC)

With reference now to the drawings, FIG. 1 presents a general overview of the operation of the system according to the present invention. A user interfaces with a program embodying the present invention operating on a general purpose computer, e.g., a P.C. The program of the system of the invention could be provided to the user in the form of a magnetic disk, CD-ROM or by any other means, e.g., downloaded from the Internet.

Figure 1A:
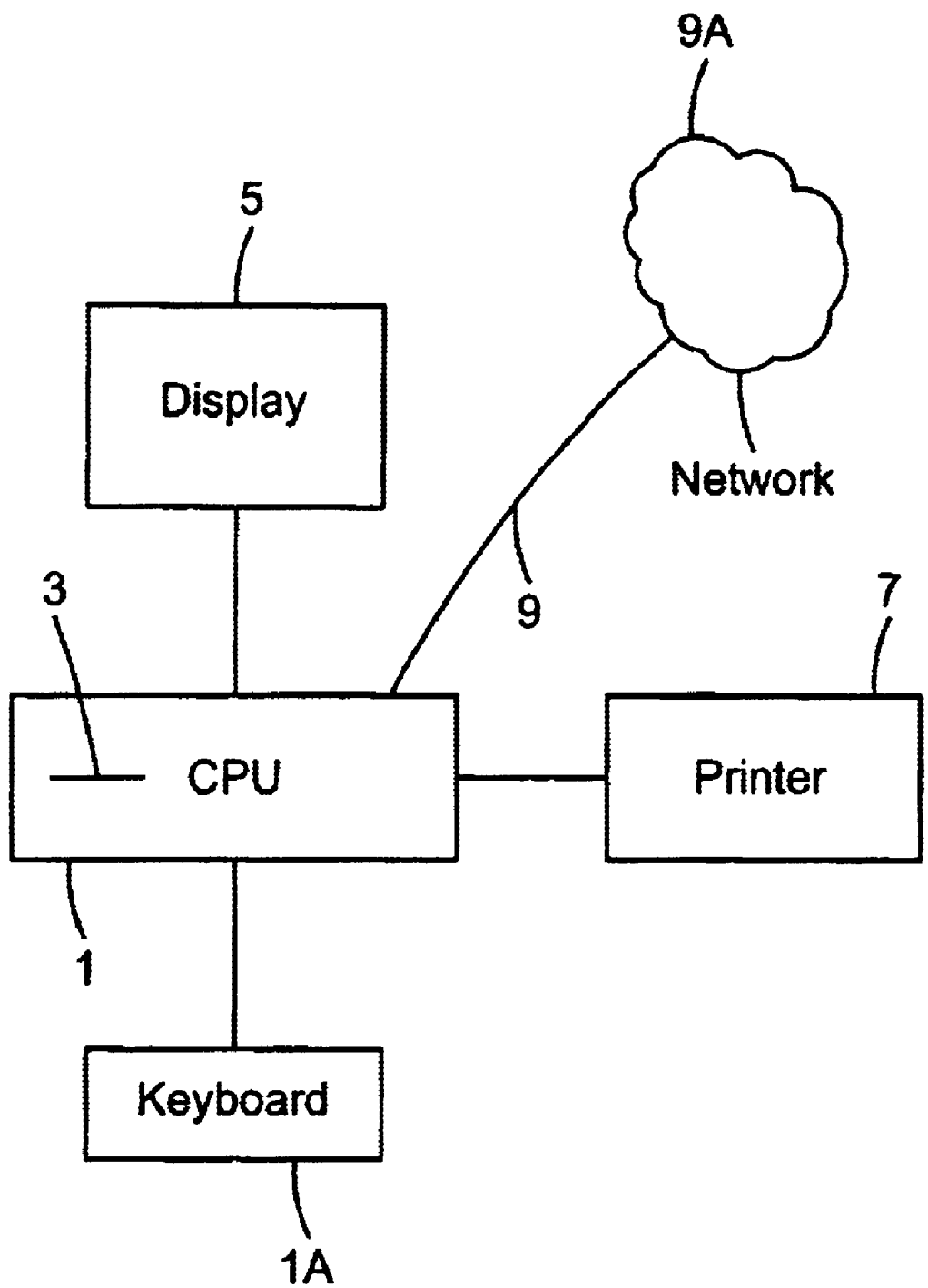
FIG. 1A shows an example of hardware on which the system of the invention can be installed.

FIG. 1A shows an example of the hardware on which the system of the invention can be operated. The hardware comprises, e.g., an IBM compatible PC 1 and keyboard 1A having a media drive such as a magnetic disk drive or CD ROM drive 3, a display device 5 such as a CRT or flat panel display and a printer 7 for printing out the generated document. Optionally, the system includes a communication link 9 so that the program of the system can be downloaded from a network, e.g., the Internet 9A. Although an example is shown of an IBM compatible PC, the system could also operate on any general purpose computer, on an Apple compatible computer or on a special purpose computer.

According to the preferred embodiment, the computer 1 has installed therein a suitable operating system such as Microsoft Windows 95, the word processing application Microsoft Word (Version 8.0) and the data base application Microsoft Access. Although the invention preferably operates with Microsoft Word and Access, other word processing programs and data base control programs could be used, in which case the program of the programming environment with which the user interfaces would be appropriately modified, based on the principles disclosed herein.

The hardware and software requirements are preferably as follows:

PC: Intel Pentium 133 MHZ or higher;
MS Windows 95 or higher;
Operating System:
RAM: 24 MB or larger.

Referring to FIG. 1, the overall system preferably comprises a user interface and controller comprising a full programming environment 10 comprising the program to be discussed herein and having full programming functionalities capable of being accessed by the program, a full word processing environment 20 comprising a word processing application having full word processing functionalities capable of being accessed by the program, and a full data base environment 30 comprising a database having full data base functionalities. The system creates a document 40 which is initially derived from a stored template 22, to be described below. The full programming environment 10 may be an application created through the use of the programming language Visual Basic, Version 6.0 and includes all functionalities provided in that programming language, as known to those of skill in the art. Full programming environment 10 provides instructions to the full word processing environment 20 which may be Microsoft Word, as explained above, installed on the computer 1. The full programming environment 10 sends instructions and data to the full data base environment 30 which may comprise Microsoft Access also installed on computer 1. Both of these applications are available from Microsoft and are well known.

Microsoft Word includes a plurality of well known word processing functionalities, and Microsoft Access includes a plurality of well known data base control functionalities.

Examples of programming environment functionalities include, without limitation, mathematical functions, verifying matches, graphical user interfaces (GUIs), and logical functions such as SELECT CASE, IF THEN, loops etc., or combinations of these. These are all functions well known to those of skill in the art. Examples of word processing environment functionalities include AUTOTEXT, bookmarks, fields, tables etc., also well known to those of skill in the art.

The full data base environment 30 provides responsive data from the data base to the full programming environment 10. This data comprises two types of data. A first type is used to populate screen display forms so that appropriate questions are presented to the user to solicit information for the document. The second type comprises data displayed in the forms for insertion in the document, e.g., alternate provisions for insertion in the document.

The full programming environment 10 comprises both a user interface (by presenting questions to the user soliciting information for the document) and a controller controlling the operation of the word processing environment 20 and the database 30. Full programming environment 10 provides instructions (14) to the full word processing environment 20 which operates (16) on the document 40. Optionally, programming environment 10 may operate directly on the document to be produced 40, as shown by line 12, in the event a word processing functionality is programmed in the programming environment 10 which is not present in the word processing environment 20. Such a functionality would then be provided by the programming environment 10.

In addition, the full data base environment 30 may optionally provide data directly (32) to the document 40 which is inserted into the document 40 under programming environment 10 control. Generally, full data base environment 30 supplies data (34) to the full programming environment 10 in response to instructions (36) from the full programming environment 10. Optionally, full data base environment 30 supplies data (31) to the full word processing environment 20 in response to instructions from the full programming environment 10. The data base environment 30 comprises a program, well known to those of skill in the art, which manipulates a number of user defined data and tables, e.g., tables including alternative provisions for the document, lists of names, titles, cities, greetings, etc.

In the present invention, unlike other document generation systems, the user interfaces with a full programming environment 10 programmed in a language such as Visual Basic to prepare a document which is generated by the full word processing environment 20 responding to instructions from the full programming environment 10 and data from data base environment 30. This provides significant advantages over prior art systems, in particular, this allows use of any and all logical functions, either alone, or in combination, and access to all the needed functionalities of the full word processing environment 20 while at the same time allowing access to all the needed functionalities of the full programming environment 10 to generate the document. This allows the system to dynamically structure the way in which information is obtained for preparing the document.

Figure 2:
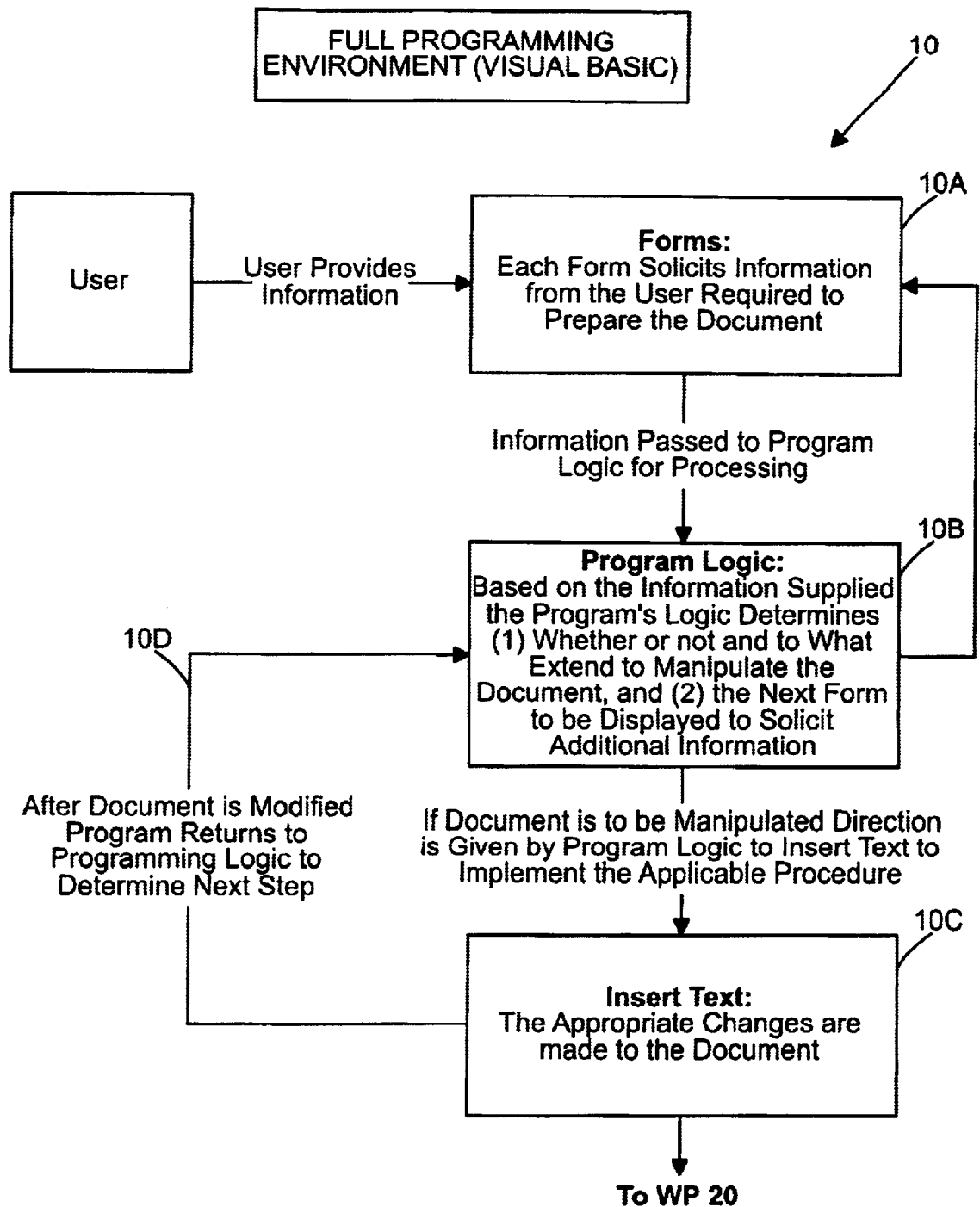
FIG. 2 is an overview of the flow of the full programming environment portion of the system according to the present invention.

FIG. 2 shows the basic subparts of the full programming environment 10. The full programming environment 10 comprises a program including three basic subparts, Forms 10A, Program Logic 10B and Insert Text function 10C. Program Logic 10B drives the other two functions, i.e., it defines the basic operation of the system for generating a document.

Forms 10A is a user interface that generates screen displays called forms which solicit information from the user required to prepare the document. The content of these forms is dynamically alterable in response to the user provided information so that a basic form format can present different content to the user requesting different information depending on the information already provided by the user. The information for populating the forms is stored in database 30. A limited number of forms are used. The format of a form is defined. The content of the form, i.e., the information presented and questions asked, is dynamically alterable. In this say, the same form can be used for soliciting different information. Generally, however, if two different pieces of information are obtained by presenting similar type questions, the same form will be used for soliciting both pieces of information. For example, if both questions require a Yes or No answer, the same form is used, although the questions in each screen display generated by the form are different.

The information solicited by Forms 10A is passed to the Program Logic 10B which is the basic logic flow which determines, based upon the information supplied by the user from Forms 10A, whether and to what extent to manipulate the document and the next form to be displayed to solicit additional information. The Program Logic 10B calls up the appropriate one of the forms of Forms 10A to populate the form with data, e.g., the relevant questions to ask the user based on the particular provision/s of the document then being processed. The Program Logic 10B together with its interface with Forms 10A and the insert text function 10C, is shown in more detail in FIG. 5 and in even greater detail in FIG. 6 herein. The Program Logic, at various points in the logic flow, provides directions to the insert text function 10C to manipulate the document to Insert Text. The Insert Text function 10C makes the appropriate changes to the document. Once the document is modified, the Insert Text function 10C returns to the Program Logic 10B to determine the next step, as shown schematically by line 10D. Although the program is discussed herein as having three parts, Program Logic, Insert Text and Forms, there need not be any sharp demarcation between the parts, i.e., the three parts can comprise a single integral program performing all three functions. For ease of presentation and understanding, they are discussed separately herein.

Figure 3:
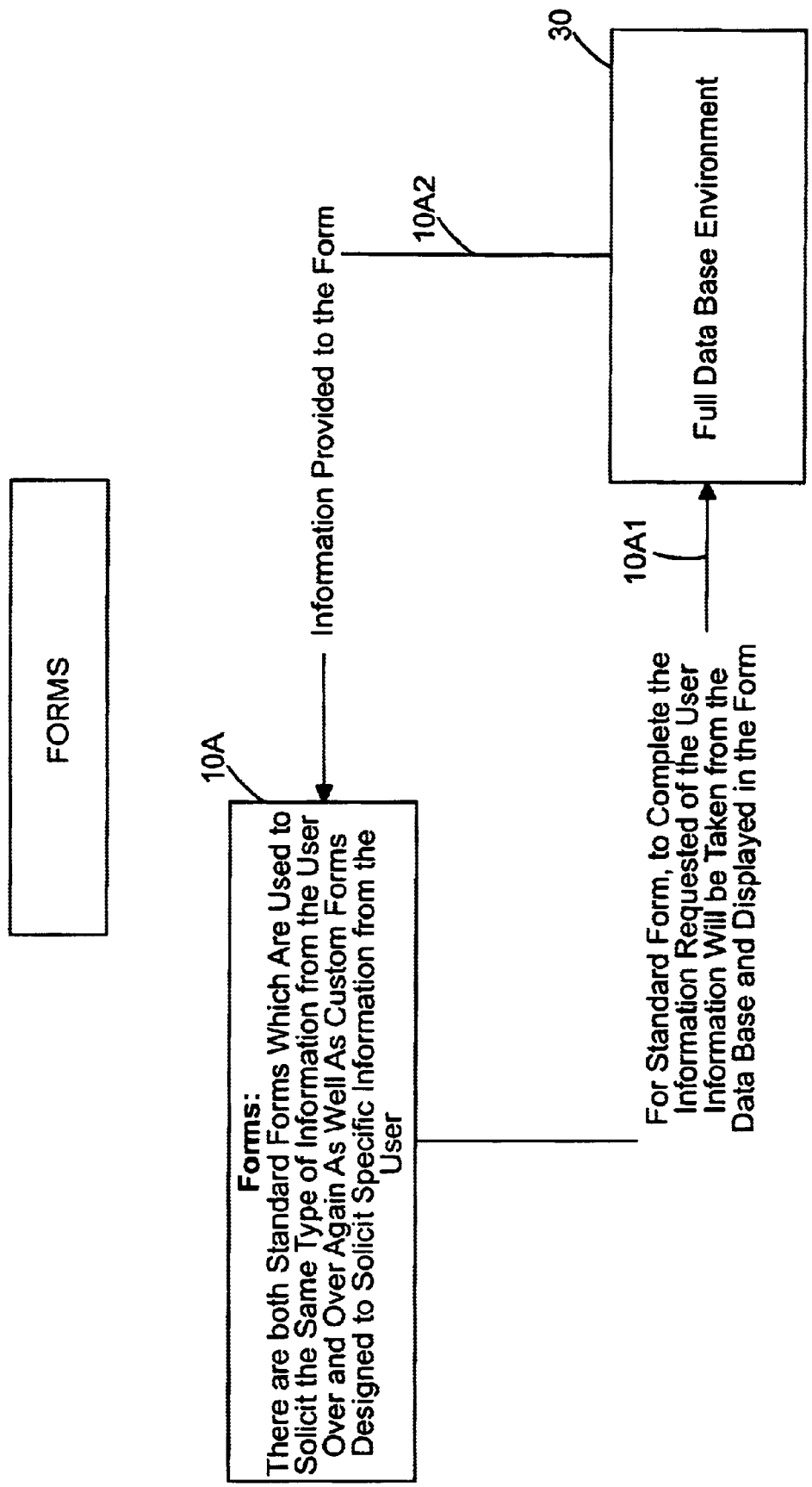
FIG. 3 is an overview of the flow of the Forms function of the full programming environment.

FIG. 3 shows the functionality of Forms 10A. Forms 10A include both standard forms which are used to solicit the same type of information (although often with different questions) from the user repeatedly as well as custom forms designed to solicit specific information from the user. For standard forms, in order to complete the information requested from the user, information will be taken from the full data base environment 30 to populate the form which will then be displayed to the user. The communication between Forms 10A and data base environment 30 is shown by the line 10A1 where information is requested from the full data base environment 30 by Forms 10A and the line 10A2 whereby information is provided into a form by the full data base environment 30. These correspond to line 36 and 34 of FIG. 1, respectively.

The Program Logic 10B, which will be described in greater detail below with reference to FIGS. 5 and 6, comprises the fundamental logical flow that drives the automated document generation system. Preferably, the Program Logic 10B is written using the Select Case logical function of Visual Basic, well known to those of skill in the art of computer programming. Within each case, any and all programming logical functions and combinations of these may be used to determine whether the Insert Text function is to be activated and the path to be taken by the system. Although the SELECT CASE function is preferred, other logical functions could be employed, such as IF-THEN statements. However, SELECT CASE provides efficiencies not obtainable using IF-THEN statements. Further, a review of FIG. 6, which shows the program flow of the invention in detail for determining the questions to ask (i.e., Program Logic), for soliciting information from a user (i.e., generating and displaying forms) and for modifying the document (i.e., Insert Test), will reveal to one of skill in the art, that it is best programmed using the SELECT CASE function primarily, with other logical functions used as necessary.

Figure 4:
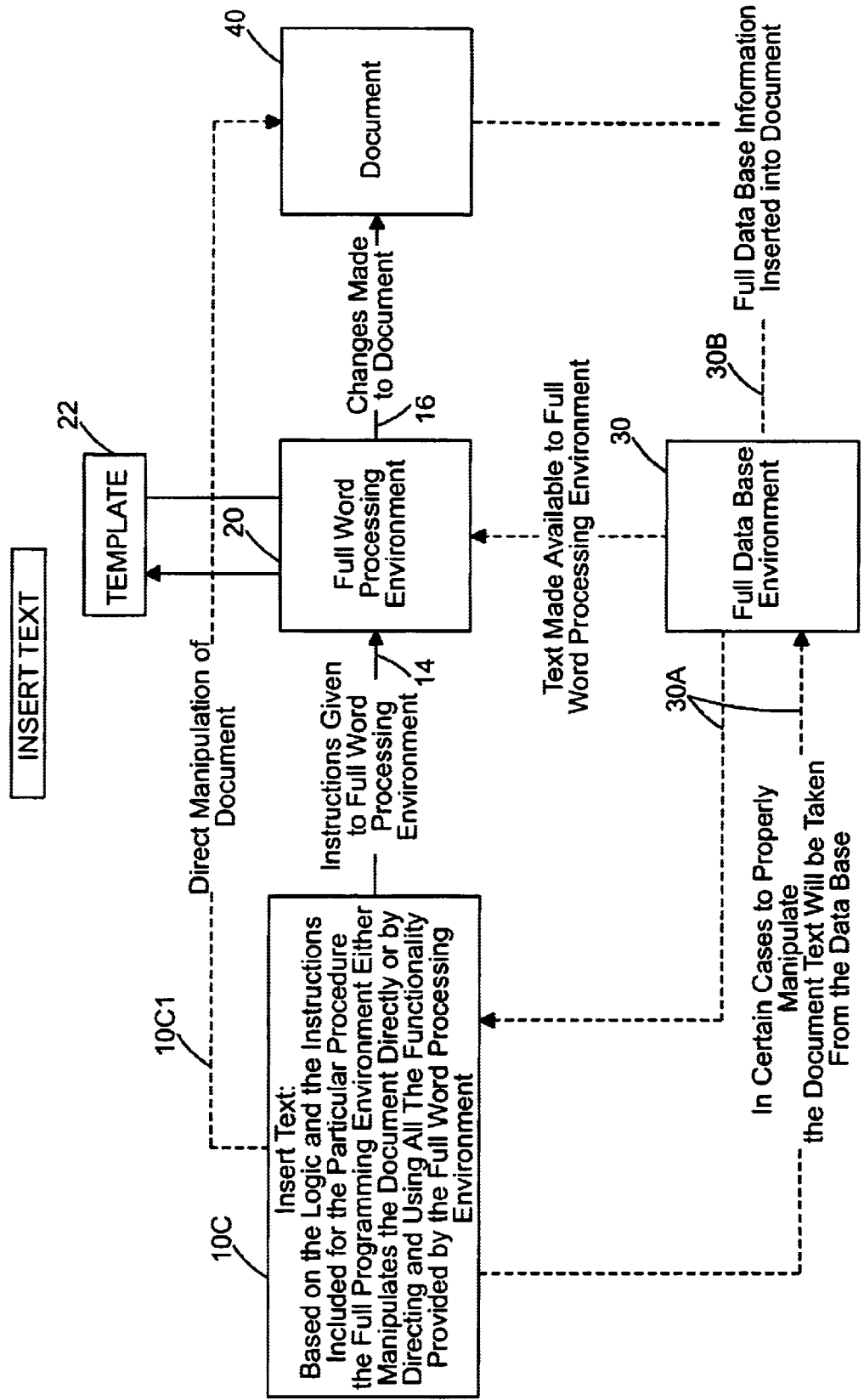
FIG. 4 is an overview of the Insert Text function.

FIG. 4 shows generally the Insert Text function. The Insert Text function calls up the word processing environment 20 to manipulate the document. The Insert Text function 10C is entered into from the Program Logic 10B whenever a modification of the document 40 is to be made. Based on the Program Logic 10B, which contains the instructions included for a particular procedure, the full programing environment 10 directs the functionality provided by the full word processing environment 20, as shown by line 14. Instructions are given to the full word processing environment 20 from the Program Logic 10B, and in particular, via the Insert Text function 10C. The full word processing environment 20 then makes changes to the document 40 by accessing the needed functionalities of the full word processing environment, for example, Microsoft Word, as shown by line 16. The Insert Text function also may perform logical functions, e.g., using SELECT CASE, etc. (or combinations of logical functions) to insert text in the document.

Dashed lines 30A shows that the data base environment 30 can optionally provide data, upon instruction from the full programming environment, to the Insert Text function to be provided into the document 40. However, more typically, this will not be done because the data base 30 will provide data to populate the forms or for inclusion in the document 40 prior to entering into the Insert Text function. Further, line 30B shows that the data base 30 may, on instruction by the Insert Text function, provide data directly into document 40, although typically, this will not be done. Optionally, the Insert Text function 10C of the programming environment 10 may directly manipulate the document 40 as shown by line 10C1. This might be done if a desired word processing functionality is not available and is instead programmed directly in the programming environment. More typically, the Insert Text function 10C will control word processing environment 20 (line 14) thereby using the functionalities of the word processing application to generate document 40 (line 16).

The full word processing environment 20 provides all or a selected portion of the inherent functionality of the base word processing environment 10 to be used by the system to prepare the document.

The full data base environment 30 provides all or a selected portion of the inherent functionality of the data base environment to be used by the system in preparing the document. Both the full data base environment 30 and the full word processing environment 20 will not be described in detail herein because they are well known to those of skill in the art. As explained, the full word processing environment 20 may be Microsoft Word, well known to those of skill in the art, and the full data base environment 30 may be Microsoft Access, also well known to those of skill in the art.

Figure 5:
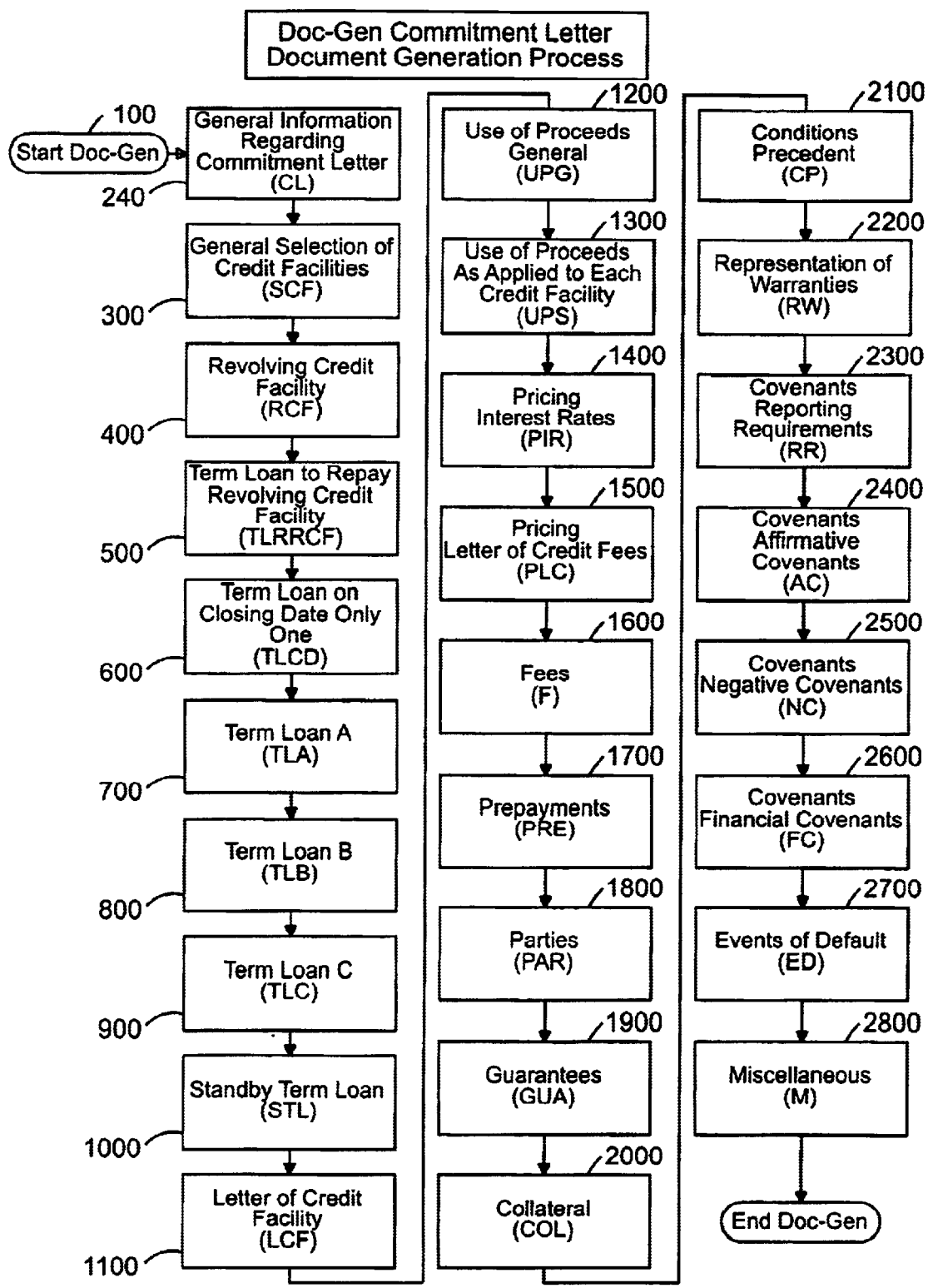
FIG. 5 is an overview of the program flow implemented by the full programming environment.

FIG. 5 is an overview of the program flow implemented in the full programming environment 10, preferably programed in Visual Basic. The basic flow involves a number of sub-routines 100, 240, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700 and 2800, which comprise individual sub-routines of the program (including Forms 10A, Program Logic 10B and Insert Text function 10C) implemented by the programming environment 10 which allow the system to manipulate the document via the word processing environment 20.

FIG. 6, comprising FIGS. 6A–6Z and 6AA–6QQ, is a detailed flow diagram of portions of the program comprising the Program Logic 10B and its interface with the Insert Text function 10C and Forms 10A, shown in general form in FIG. 5. Certain portions of the program shown generally in FIG. 5 are not shown in detail in FIG. 6, but the same principles employed in the detailed portions shown in FIG. 6 and described herein would be employed in those portions not shown in detail. A person of skill in the art, based upon what is shown in FIG. 6, having knowledge of the contents of the document desired to be generated, will be able to design a suitable program flow for the omitted portions.

FIG. 5 shows the general flow of the program for the system according to the present invention. The user starts the document generation program at step 100. In step 100, a main form screen is presented to the user as shown in FIG. 7. This form is used as the startup form to allow the user to select what the user would initially like to do. As shown in FIG. 7, the user is presented with the option to generate a commitment letter at 120, customize tables 140, customize program settings 160 or customize template 170. The user is also presented with the option to exit 180.

As shown in FIG. 6A, the program screen shown in FIG. 7 presents the user with the option of customizing tables (140), customizing programming settings (160) or customizing the template (170), a template being shown in detail in FIGS. 8A–E. The template shown in FIG. 8 is an example of a word processing template 22 of a type of document which can be generated by the system according to the present invention. In particular, FIG. 8 shows a template 22 for a loan commitment letter which will be used as an example to illustrate the operation of the invention. FIG. 8 shows a template of a word processing document in MS Word. The template includes language in the final document which will not be changed as well as bookmarks 8A indicating places where text will be inserted. The text indicated by the bookmarks 8A may be AUTOTEXT stored in Microsoft Word. In addition, there are certain fields 8B, for example, the date field, the text of which is inserted by the system according to the present invention to customize the document. Further, there are other fields 8C which may be inserted, as shown by the fields DOCVARIABLE . . . Bookmarks and fields are not ordinarily visible in the template. Essentially, the template is a Word document on which the word processing program 20 operates as controlled by the program flow of the full programming environment 10.

Returning to FIGS. 5 and 6A, at step 100, before entering into the document generation program, the user is given the choice to customize the tables, customize the program settings or customize the template. If the user chooses to customize the database 30 tables, the user is led through steps 140A through 140D which enable the user to customize the tables. The tables comprises listings in the database of the database environment 30. The user can select a table to customize, for example, a table of names, a table of alternative textual provisions, etc. This customization of the database can also be performed directly by the user while the program is not running, e.g., to perform maintenance of the data base tables.

Steps 160A–160C allow the user to customize program settings and steps 170A–170D allow the user to customize the template, i.e., the template of FIG. 8. Accordingly the template shown in FIG. 8 can be customized by the user, for example, to add text to the template or to adjust the existing text or syntax of the template. The user can also customize the program settings (steps 150A to 150C). For example, the user can set default values, whether confirmation dialogues are on or off, etc.

The major functional areas according to the invention are shown by the screen of FIG. 7. FIG. 7 is the main interface which comprises a single form called a menu screen, presenting the user with four choices, 1) create document, 2) customize tables 3) customize template and 4) customize programming settings.

1) Choice 1) relates to the primary function of the invention, which is to create a document, such as a commitment letter, automatically. Although the invention is applicable to documents of various types, herein it is described with reference to a loan commitment letter for purpose of illustration. The invention may be used to create documents other than loan commitment letters. The same principles apply to the generation of other type documents. The system asks the user pertinent questions and based upon the user responses, will create a tailored document for that user in response to a dynamically altered series of questions.

2) Choice 2) relates to accessing the database 30. Through the use of the data base program 30, for example, Microsoft Access, the system allows the user to expand and maintain lists used by the system and add alternative provisions to those lists to supplement those included. To illustrate, the user can add "manager" to the titles list, and once added, it will be an available alternative in all subsequent operations. Also, the user is able to add to the alternative provisions provided by the system, for example, the definition of the prime rate. Further, in the case where the user selects a number of items from a list, such as a listing of representations to be included in the document, the user is able to categorize these lists so that when a selection from that list is required, the user can select the predefined list.

3) Choice 3) relates to customization of the template. The invention utilizes a template of the document in the word processing environment 20 in order to create the final document. The template can be customized by the user to modify the underlying template used by the system in preparing the document so that the template and final document includes provisions that are unique to that user. The user is able to modify the template in two ways. First, the user is able to add additional provisions to the template. Second, the provisions included in the template can be modified by the user.

Thus, the system provides the user with the ability to make additions or modifications to the underlying template. The user can directly add to the underlying template, or change, any provisions that will always be included in the document.

4) Choice 4) relates to customizing the program settings. The system according to the invention gives the user the ability to customize or preset certain of the logical functions of the program as well as certain of the information to be supplied by the user. The user is able to set program settings that determine how the system operates, including default settings for each of the screen forms and whether confirmation dialogs are on or off. Confirmation dialogs allow the user to confirm the information that has been entered. In addition, the user is able to determine the information to be provided such as, e.g., names, titles and the contents of a list, such as a list of financial covenants. Further, the user has the ability to establish a number of different settings so that there are different defaults for different types of transactions or clients. Furthermore, at the end of preparing a document, the user is asked whether the user wants to save the choices made in preparing the document. Such saved choices can then be accessed to prepare modified versions of that document.

After the user has optionally customized the template, program settings or tables, the user enters a portion 240 of the document generation program that allows the user to enter general information regarding the document to be generated. A screen comprising a form 20 as shown in FIG. 9 is displayed to welcome the user to the document generation program.

As shown in FIG. 5, at step 240, the system requests general information regarding the document to be produced. In the illustrated embodiment of the system, the document is a commercial loan commitment letter. FIGS. 6B–6G show the detailed program flow for soliciting the necessary general information for a loan commitment letter. If another type of document is to be generated, persons of skill in the art will recognize that the program flow can be modified to reflect the different information required to be entered for that document. However, the same basic principles would apply. As shown, the controls of the Forms 10A(screen displays) are automatically and dynamically changed in response to user entered data. Accordingly, once certain data is entered, the series of following questions, and thus the contents of the forms presented to the user, are changed in response to the answers given to the previous questions. Further, once the necessary information has been entered to allow modifying the document 40 to reflect the entered data, the document 40 is modified to reflect all locations in the document where insertions/deletions can be made that are affected by the answers previously given. Accordingly, the program flow treats the document or series of related documents as a whole. The program makes all changes, at the appropriate time, required to a document or group of documents based on the answer or answers to a specific question or series of questions.

Further, when the user provides data in response to the requests presented by the forms, should a subsequent request be redundant, inconsistent or unnecessary in view of information previously provided, such subsequent request will not be presented. The program will jump to the next non-redundant request consistent with information already provided, as determined by the program shown in FIG. 6. For example, if the user is selecting credit facilities (step 300 in FIG. 5), if a revolving credit facility (RCF) is not selected, the program will skip steps 400 and 500, which relate to RCFs and term loans to repay RCFs. As a person of skill in the art can determined by reviewing the program flow of FIG. 6, a preferable way of implementing the program logic is to use the SELECT CASE function of Visual Basic.

General information solicited at step 240, in the illustrated embodiment, includes, for example, addressees, including name, title, company name, attention, etc. The user is presented with the opportunity to input the requested information by way of various form screens, one of which is shown in FIG. 10. The form screen of FIG. 10 is used to present the user with a request or in this case, choice, which allows the user to select a single item from the list of choices as a response. The screen shown in FIG. 10 is of the type commonly known as "radio buttons", since only one of the selections can be chosen. As shown in FIG. 10, the user is presented with the ability to specify the format for the addressees by name, title and company name or company name with attention or company name with no attention. Although the form of FIG. 10 shows a request for the format for addressees, the same "radio button" form is used for requesting other information in radio button format relevant to the preparation of the document. Thus, the same basic form can be used to request different information and is dynamically alterable by the Program Logic 10B. This is true of all standard forms. Accordingly, the format of the form would remain the same (i.e., radio button format) but the text of the form would be different. Further, the number of choices could also vary and be, e.g., less than or greater than the three choices shown in the form of FIG. 10.

Returning to FIG. 5, during the entry of general information regarding the commitment letter as shown at step 240, at appropriate points when enough data has been entered to allow modification of the document 40, the text is inserted into the document. For example, when enough information has been provided to select a greeting for the commitment letter, the greeting is inserted into the document at the appropriate location. See step 6C2, for example, of FIG. 6C. Step 6C1 of FIG. 6C invokes the presentation of a form to the user. The form generated is shown in FIG. 15. Similarly, for other data, if that data affects the document at various points, all those points in the document where an effect is caused would be modified appropriately. See, for example, steps 6B1, 6B2, 6B3 and 6B4 of FIG. 6B and steps 6D1, 6D2, 6D3 and 6D4 of FIG. 6D. Each of these steps invokes the Insert Text function. Wherever the program of FIG. 6 requests user input, e.g., steps 6B5, 6B6, 6B7, 6B8, 6B9 and 6B10 of FIG. 6B, an appropriate form soliciting the necessary information will be generated and displayed.

The flowcharts of FIG. 6 are self explanatory and will not be described in detail herein. There are many other locations in the program flow where forms are presented and text is inserted into the document 40, as shown, and which will not be specifically referred to herein.

For the exemplary commitment letter being generated, other forms will be presented to the user to request information which will be used to prepare the document. For example, FIG. 11 shows a form which is a Boolean form that allows the user to respond to a specific question regarding termination of the commitment. Although the form shown in FIG. 11 is specific to the issue of termination, the same form (with changed content) is used for other questions requiring a yes or no or true or false (Boolean) answer. The text of the form is dynamically changed by the system according to the present invention depending upon the information solicited and the previous responses.

FIG. 12 shows another form which is used to enter general information regarding the commitment letter to be generated. This form allows the entry of a date and includes drop down lists allowing the user to select month, day and year and increment buttons to allow the particular date to be incremented/decremented. The user can also directly enter the text.

Furthermore, with respect to the date entry form, according to the invention, the date entry form has been specifically designed for inputting dates so that dates can be input using Smart Combo boxes for input of month, day and year. See for example, FIG. 12.

FIG. 13 shows the form format which presents the user with a question which allows a user to select an item from a "combo box" as the answer. The drop-down list in the combo box is populated from the database. The user can also type in an entry into the list and if the item is not in the list, it will then ask the user if the item should be used permanently. If added permanently, the item will be added to the appropriate table stored in the database. See, e.g., steps 6B8 and 6B9 of FIG. 6B.

FIG. 14 shows the format of the form which allows the user to type in text into a plurality of text boxes. As shown in FIG. 14, the form is being used to request the names of each party to the loan transaction.

FIG. 15 shows the format of a form which can be used to select either one or multiple items from a list, in the case shown, an applicable greeting for the commitment letter. This form provides the ability to add an item to the table permanently or for only one transaction. This form allows the user to double click, which will "drill down"on a row/column to invoke a form known as "edit record" (FIG. 30), which allows the user to change the selection either permanently or temporarily.

FIG. 15 also shows the split nature of the screen displays presented to the user. This is true of all screen displays and forms. As shown, in one portion 15A of the screen, say ⅔of the screen, the then applicable for is presented to the user. In a portion 15B, the then existing text of the document under generation is shown. The user thus can see the document being generated "on the fly". Optionally, the user can set the program settings so that the document under generation is not displayed, or not being processed. In the latter case, the document is generated afer all information is obtained from the user.

FIG. 16 shows a smart combo form which can allow the user to select, from multiple drop down lists, text to be identified with parties to the transaction. The user can also type in an entry into the list and if the item is not in the list, it will ask the user if the item should be added permanently. If it is added permanently, the item will be added to the appropriate table in the database.

FIG. 17 shows an example of the format of a form for specifying a date by month and year. The form allows the user to specify the month and the year using familiar drop down lists.

FIG. 18 shows an example of a smart combo form which allows the user to select a number from a drop down list. The user can only enter numbers into this form. If the user enters anything else, no data entry will be accepted. The user can also type in an entry and if the number is not in the drop-down list it will ask if the user wants to add this number as a permanent number in the list. The user will be asked if the user wants to enter nothing should the user not enter a value.

FIG. 19 is an example of the format of a form for entering text of a specific provision which is provided by the user.

FIG. 20 is an example of a custom form which is used to solicit addressee information from the user for the commitment letter. This form is used only to obtain the information as shown, i.e., the text of the form itself is not altered. This form is loaded multiple times depending on how many addressees are specified. All data manipulation for information entered in this form must be done prior to unloading the form. Each drop down list will accept user keyboard entry and if the value entered by the user is not in the drop down list, the user will be asked whether or not to add the value to the list. Depending on the format of the addressee, the user selects all the values which will be set when the user selects either a last name or a company name. If the user makes a change to any field, the user will be asked if the user wants to make the change permanent. A new addressee record will be added to the database 30 if there are no current records with the same last name, first name and company name. This form adds records to the appropriate table in the database 30 and in the case shown, the letter addressees for the transaction.

FIG. 21 shows an example of a form which is used to solicit issuer information from the user for the commitment letter. This form is loaded multiple times depending on how many issuers are specified. All data manipulation for information entered in this form should be done prior to unloading the form.

Each drop down list will accept user keyboard entry and if the value entered by the user is not in the list, the user will be asked whether or not to add the value to the list. All the values will be set when the user selects an officer name. If the user makes a change to any field, the user will be asked if the user wants to make the change permanent. A new issuer record will be added if there are no current records with the same officer name. This form adds records to tables in the data base 30, in this case, the letter issuer and officer, for each issuer in the transaction.

Once all the general information regarding the commitment letter has been entered (FIGS. 6B–6G), and at the appropriate points in the program, the information entered has been used to modify the document, the program then moves to step 300 in which, in the illustrated embodiment, selection is made of the desired credit facilities. In this portion of the program flow, the user specifies such items as the number of parties receiving credit facilities, the number of credit facilities, the number of credit parties, the specific type of credit facility to be provided, etc., as known to those of skill in the art of structuring commercial loan documents. See FIGS. 6H–6I. Further, such items as whether the borrowers and the account parties will be the same or different, the name of the parties receiving credit facilities, the number of borrowers, the number of account parties, the names of the borrowers, and the names of the account parties are also entered at this stage in the program flow. See FIGS. 6H–6I.

Figure 6I:
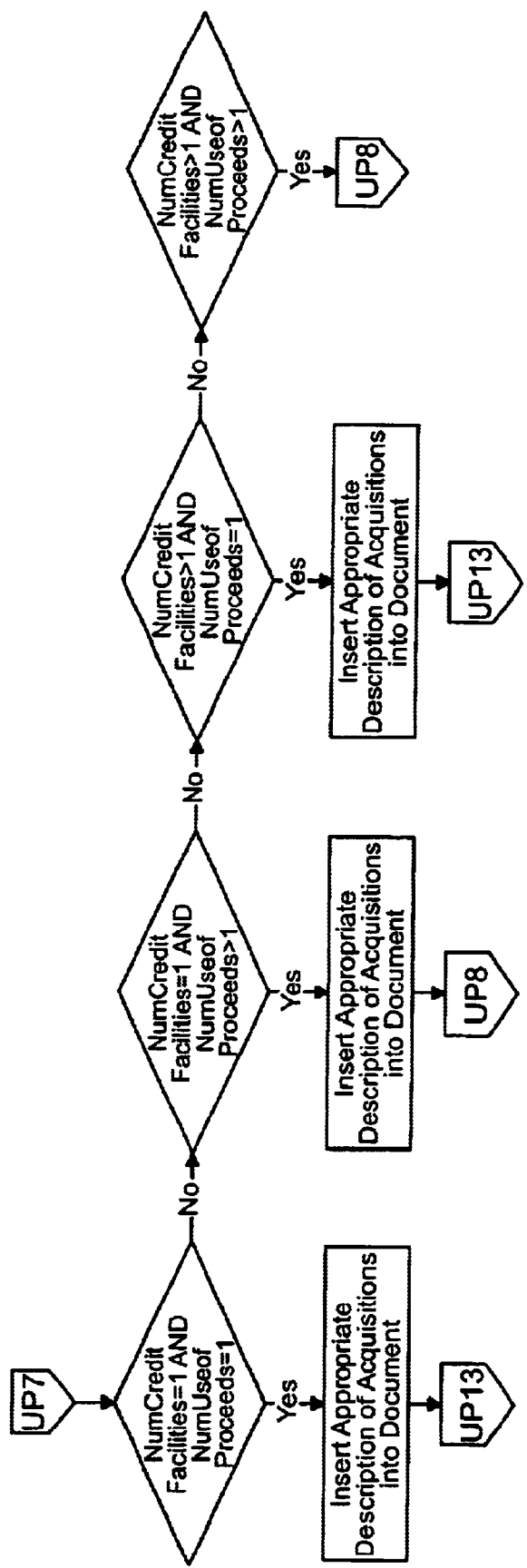
Figure 6J:
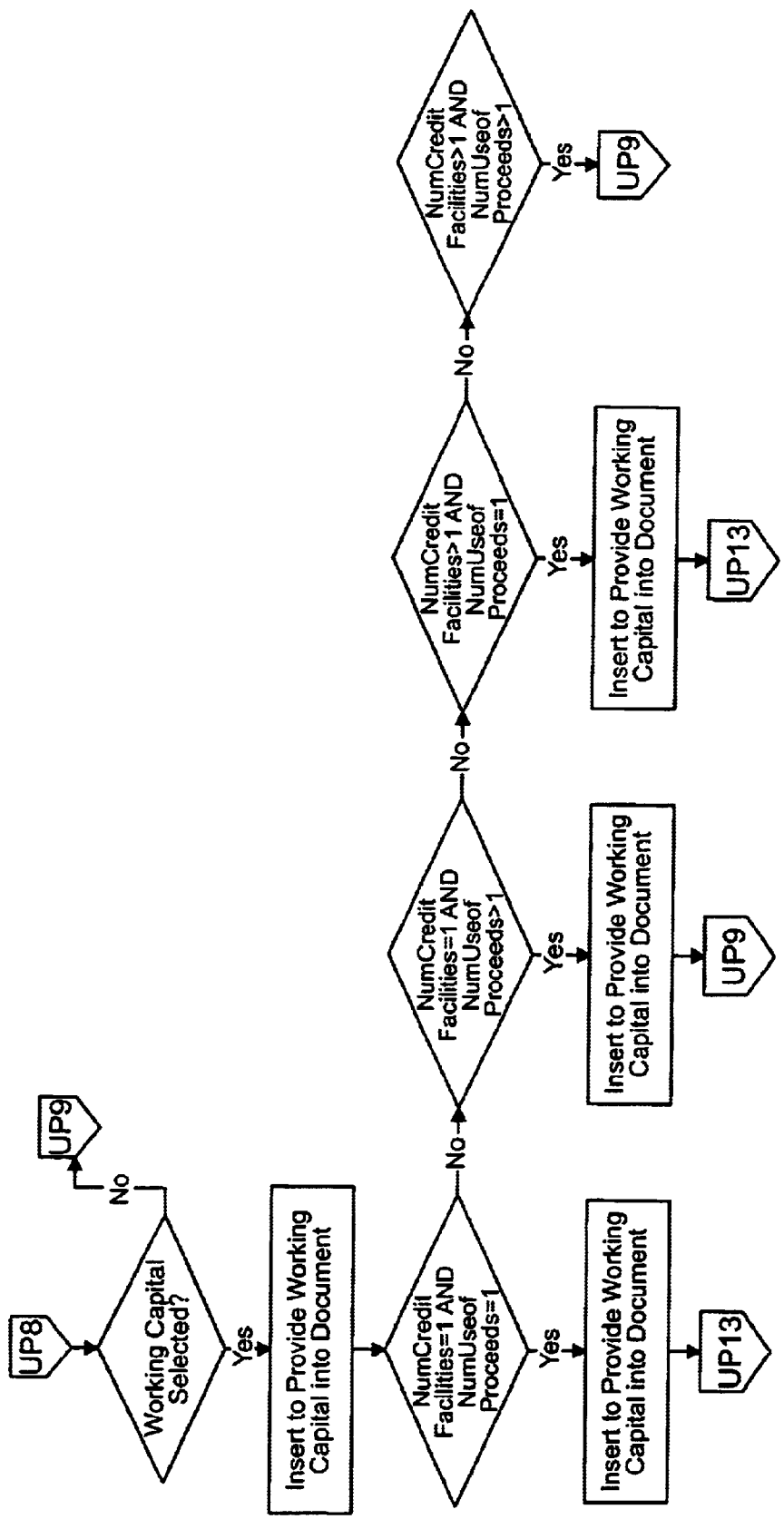
Figure 6K:
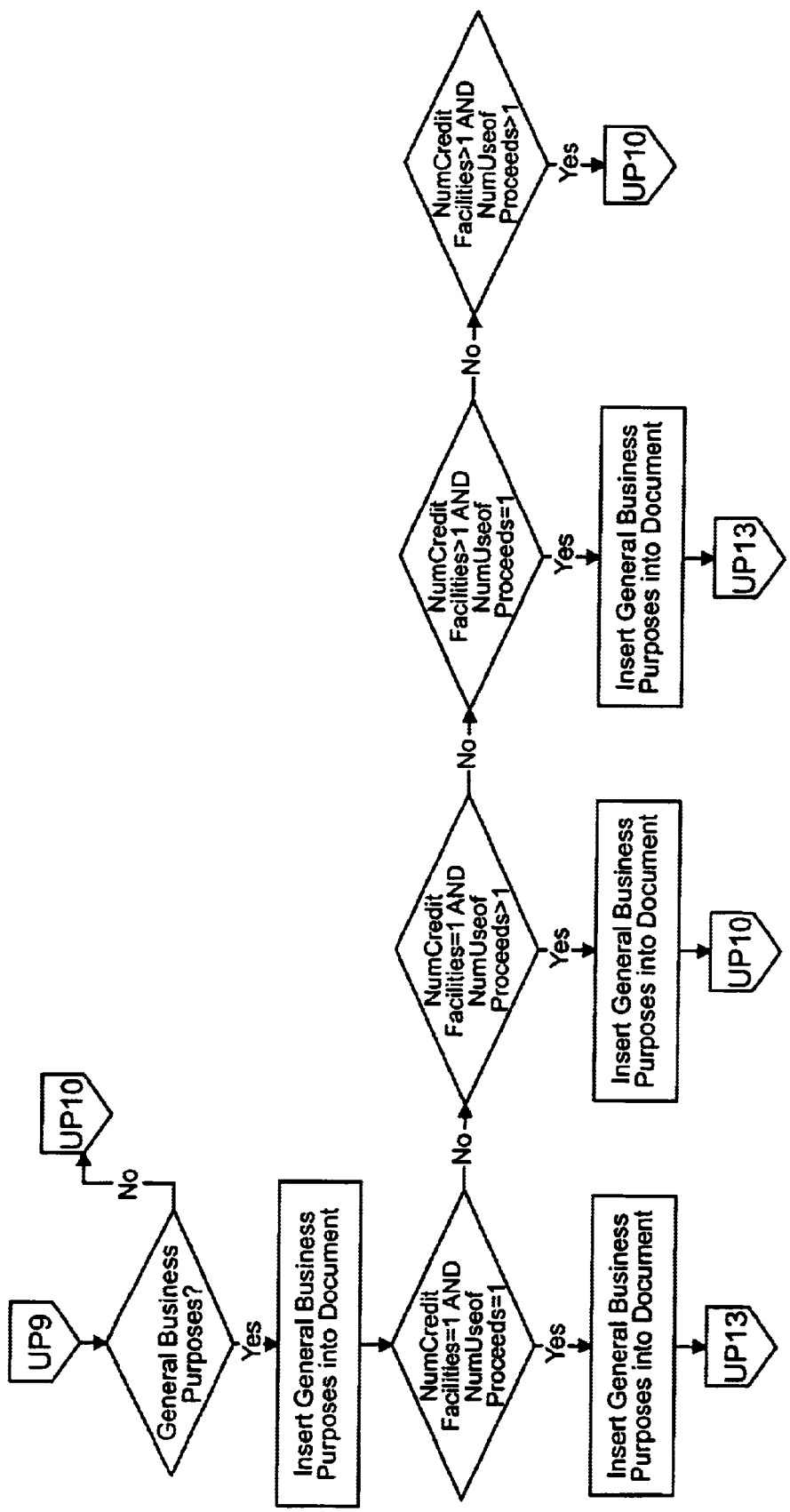
Figure 6L:
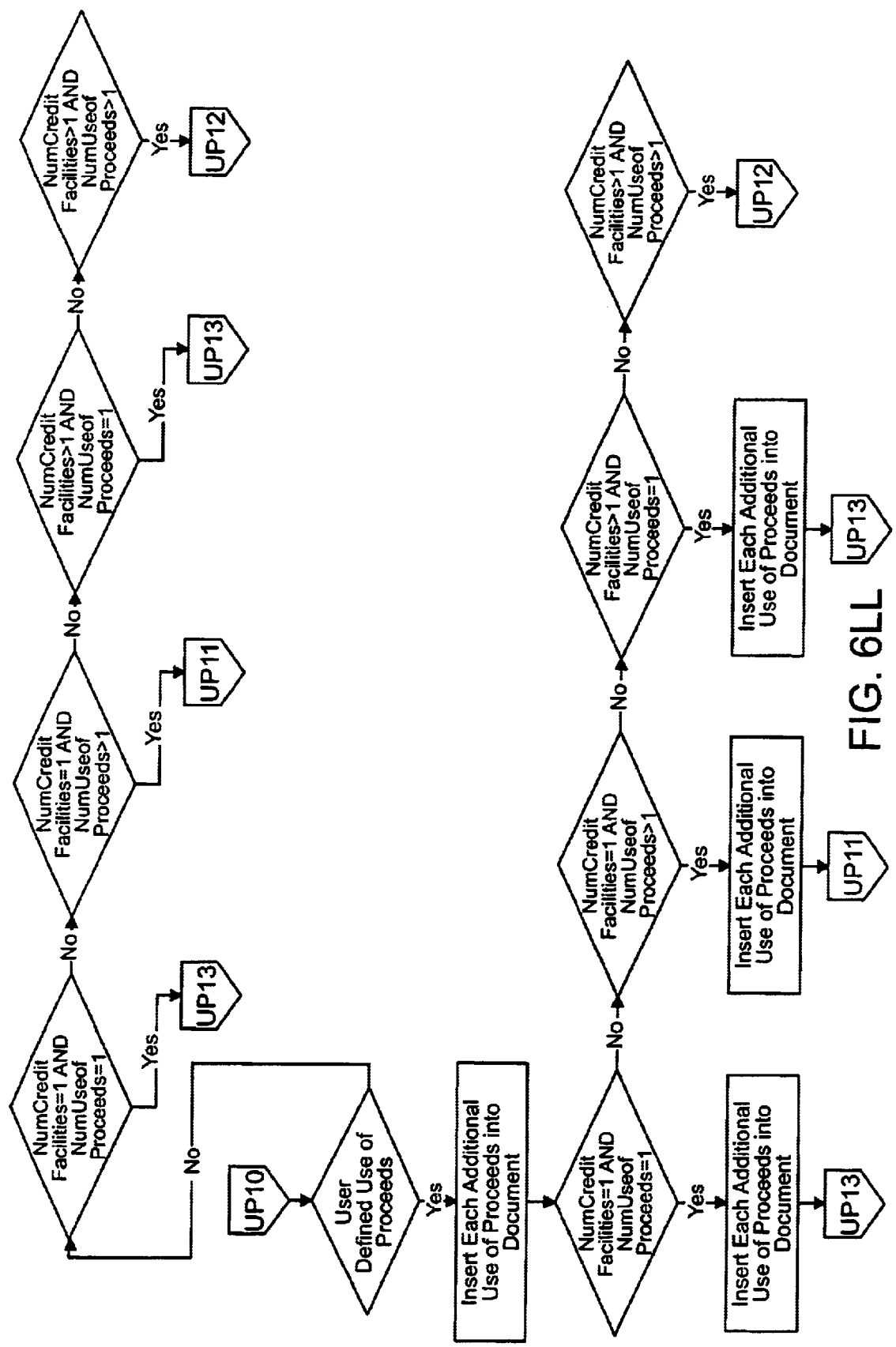
Figure 6M:
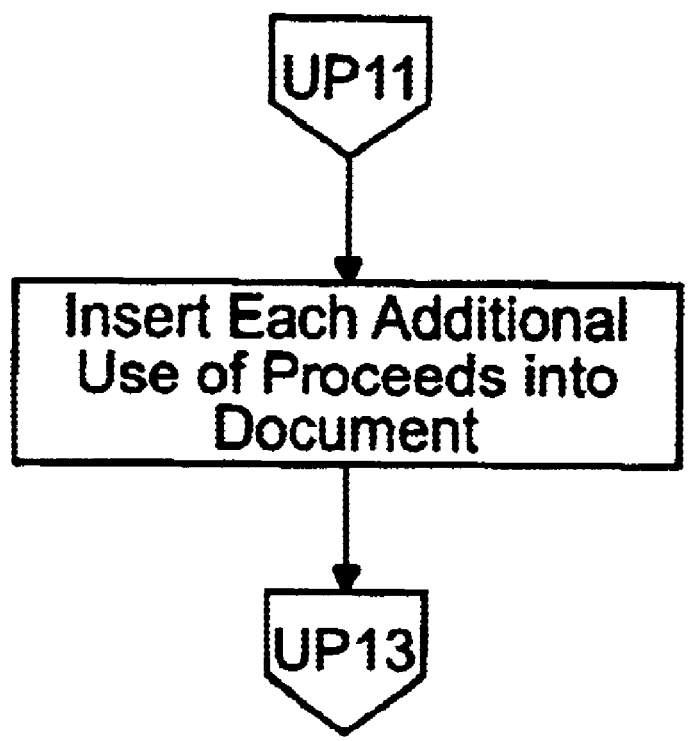
Figure 6N:
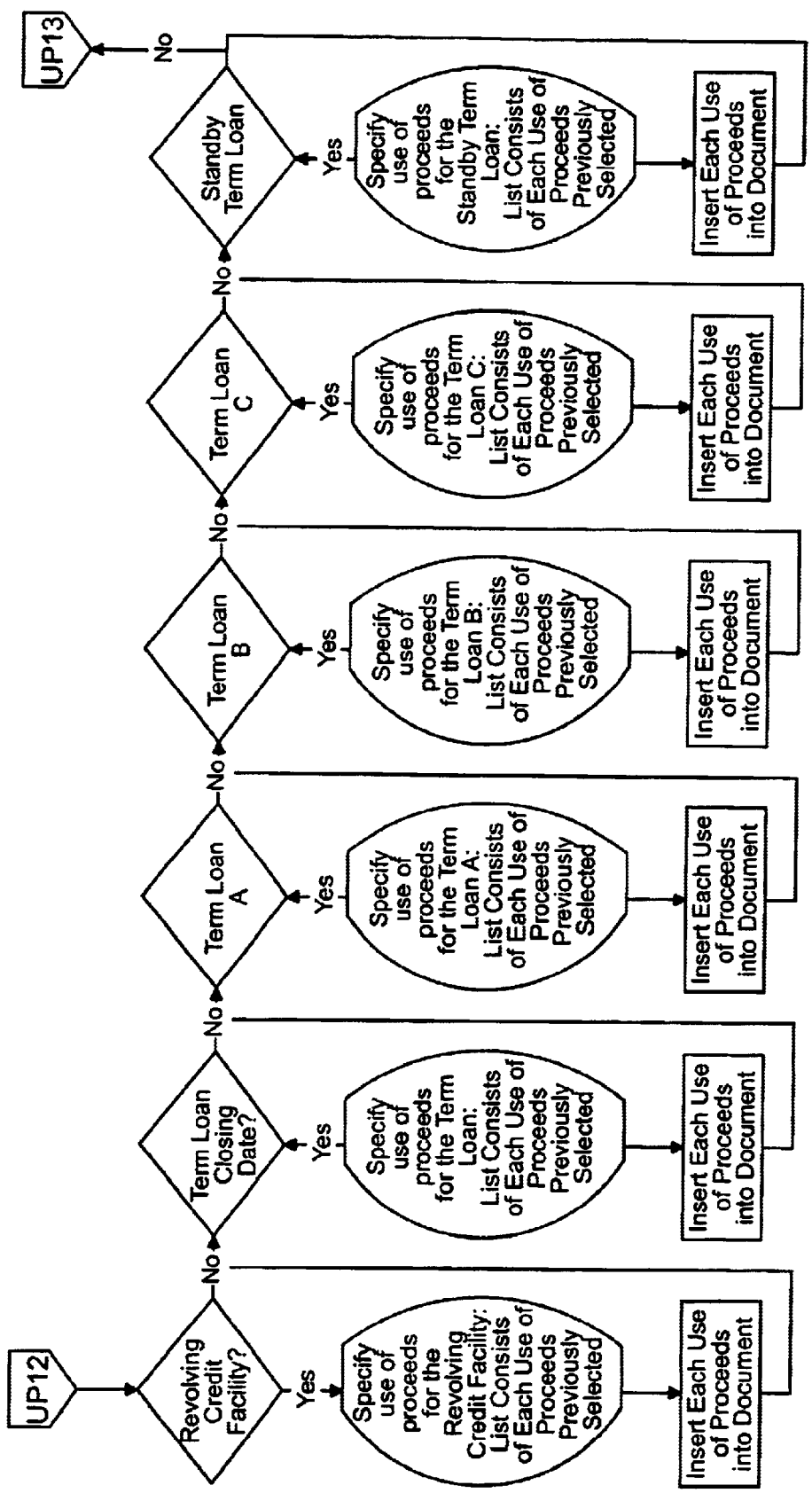
Figure 6O:
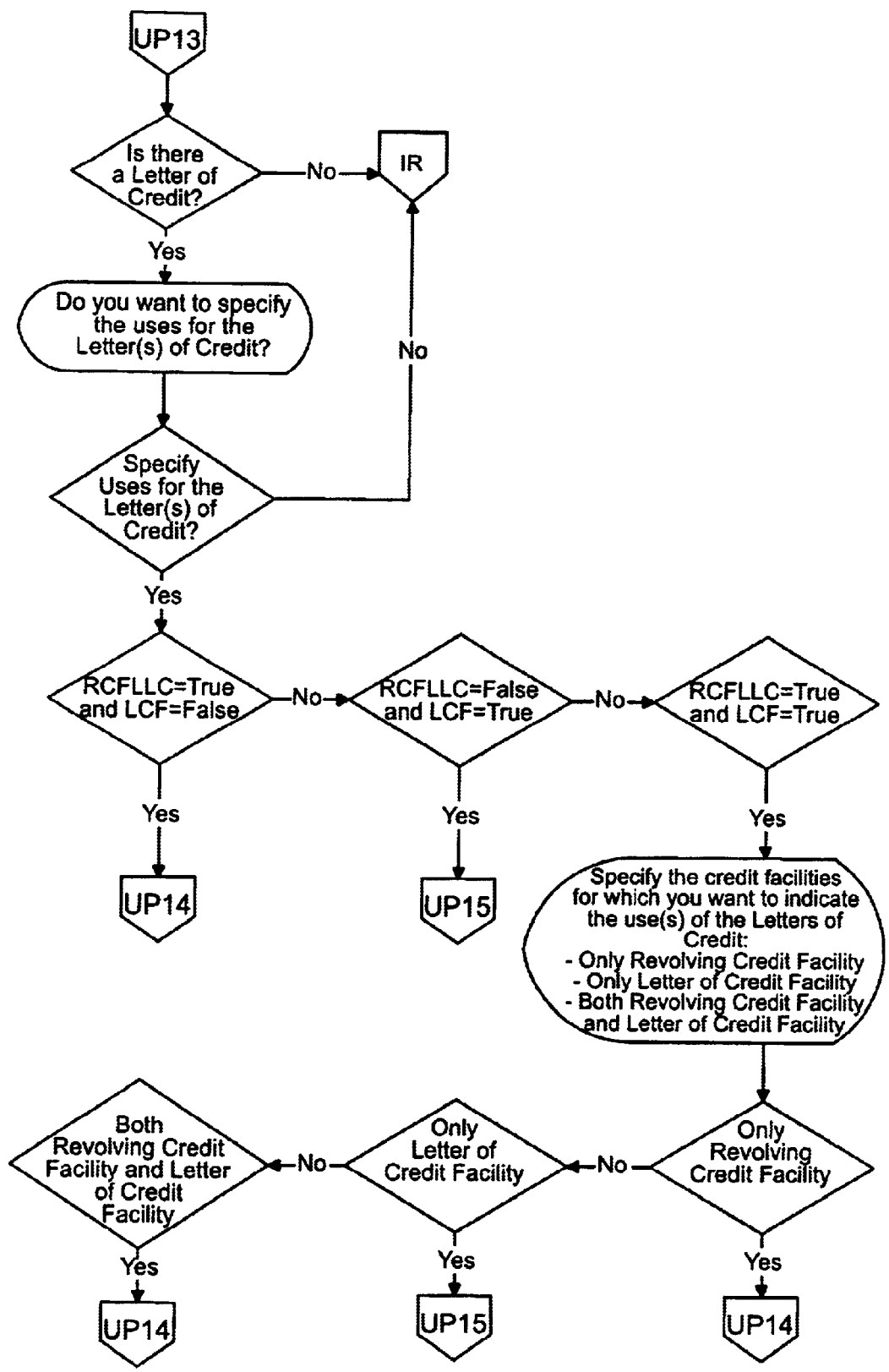
Figure 6P:
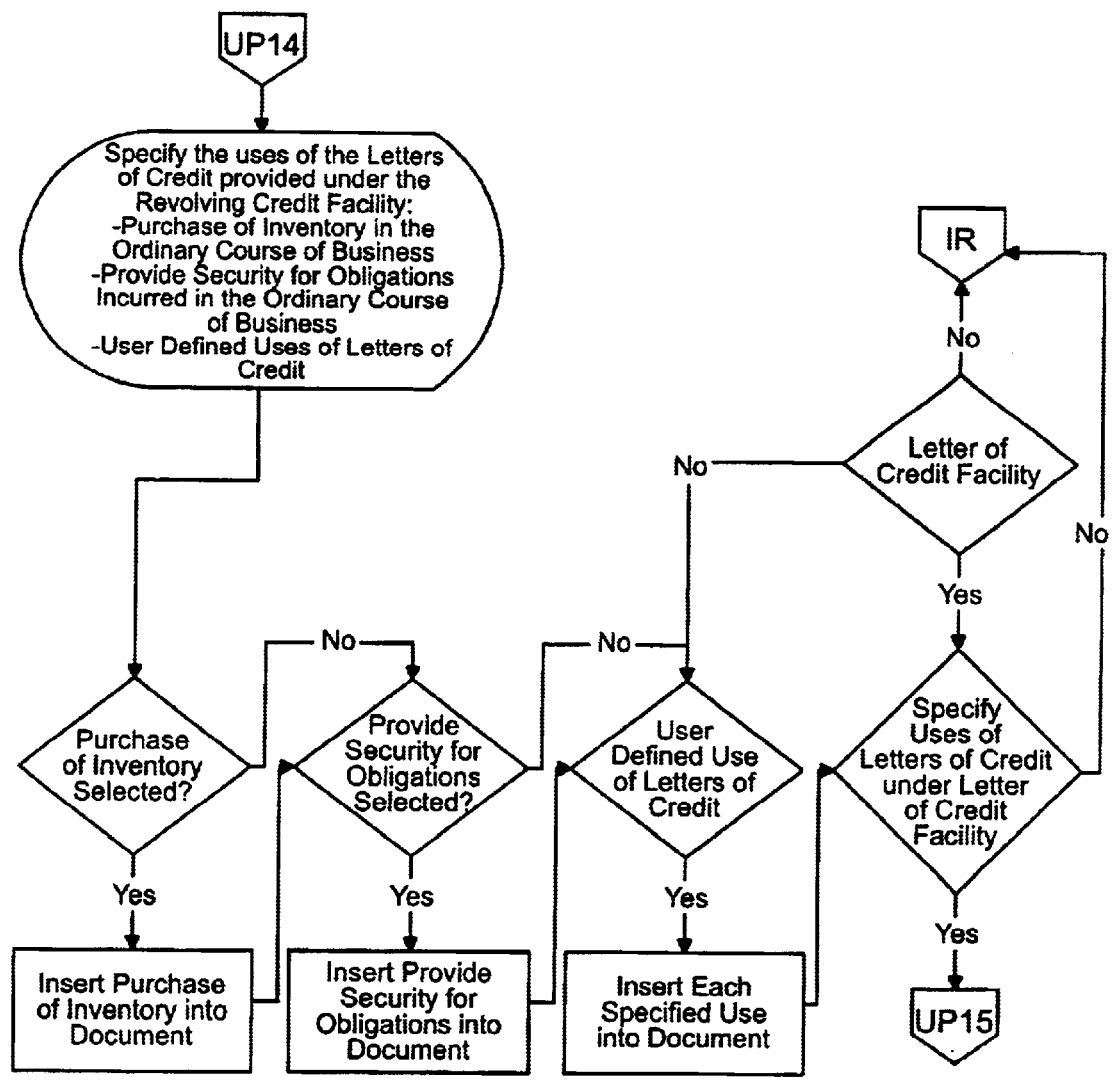
Figure 6Q:
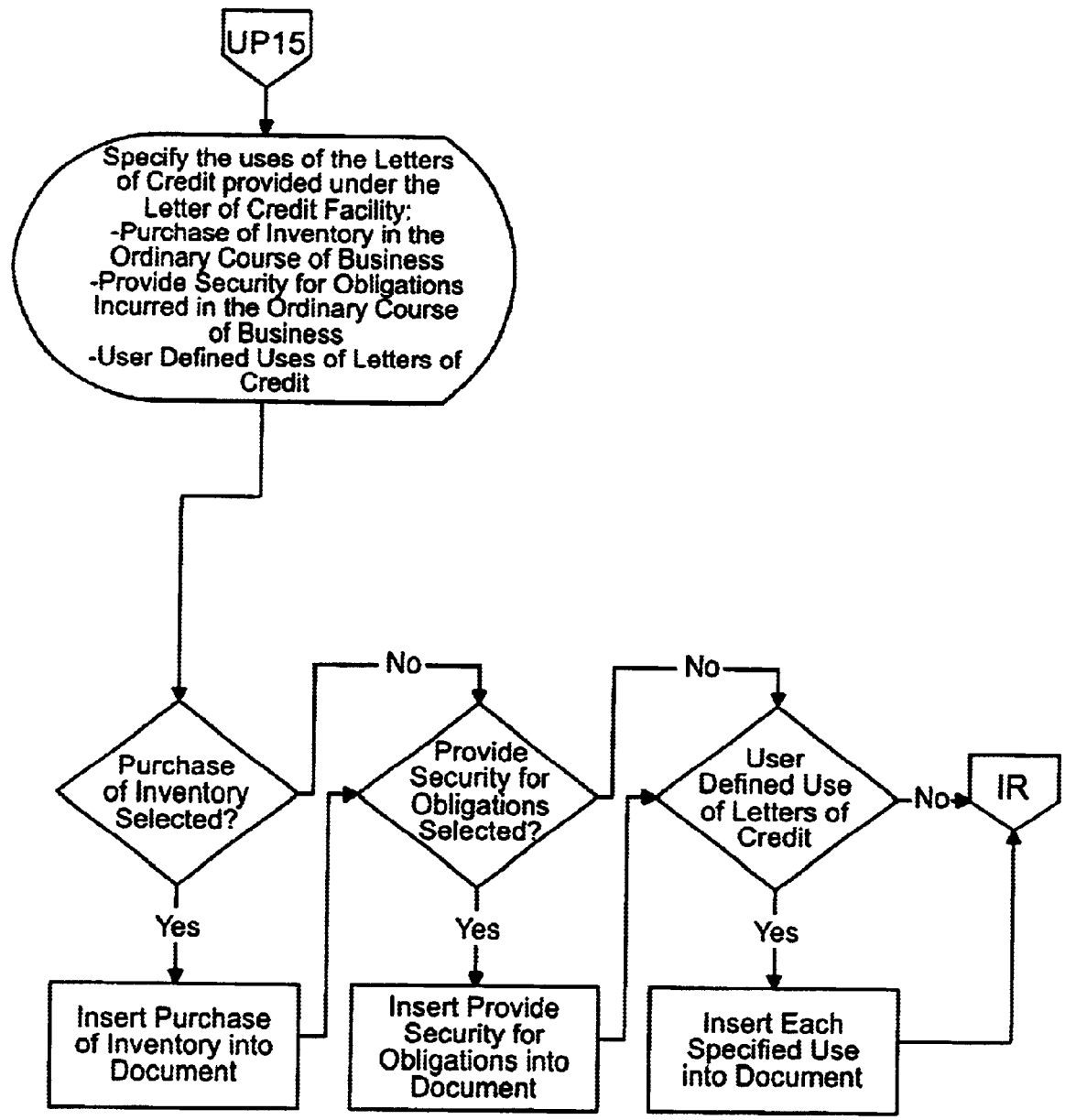

According to the invention, once sufficient data has been entered so that the document can be modified, at certain points prior to modifying the document, a confirmation dialogue may be presented to the user, as shown for example in FIG. 6I at step 6I1 and in FIG. 22. The confirmation dialogue is presented to give the user the opportunity to confirm the information provided prior to alteration of the document. Upon confirmation, the document is altered. If not confirmed, the program will proceed to the beginning of the program logic for the topic of the confirmation dialogue to solicit changed information. Further, the system of the invention stores the requests and responses thereto, and, on user command will display same. The user can then enter a different response (even if the document has been altered) to a selected question and the program will run from that point to ask any other questions which might be affected by the changed response. Once all new information is received, the user will receive a new confirmation dialog (assuming the confirmation dialogs are still turned on) or the document will be altered.

The confirmation dialogs are useful, although not required, in order to prevent unnecessary alteration of a document. The example shown in FIG. 22 relates specifically to the program flow at step 6I1 of FIG. 6I. Generally, at critical points in the program flow, the user may be presented with a summary of the information that has been provided by the user, prior to modification of the document. The user then has an opportunity to confirm that the information is correct, or, if the information is incorrect, to so indicate, at which point the program will return the user to the beginning of the dialog soliciting the requested information. Once the user confirms that the answers provided are correct, the document is then modified to reflect the entered information. See steps 6I1, 6I2, 6I3 and 6I4 of FIG. 6I, for example.

After general credit facility information has been entered, the program then proceeds to credit facility subroutine 400 of FIG. 5. If a revolving credit facility (RCF) has been selected, the program will proceed further into routine 400. See 6J1 and 6J2 of FIG. 6J. If the user has not selected a revolving credit facility, the system proceeds to the next routine consistent with the prior choices, in this case, subroutine 600. See step 6J3 of FIG. 6J. In this case, if an RCF was not selected, routine 500 would be inconsistent with not selecting an RCF, so the logic would proceed to routine 600. Routine 500 shows a term loan to repay revolving credit facility. If the user has not selected an RCF, routine 400, the user would not be presented with questions directed to routine 500, because routine 500 is inconsistent with rejecting an RCF in routine 400.

If the user has not selected an RCF, then the program flow is to routine 600 which reflects generation of a document having a term loan on a closing date (TLCD). Similarly, the other credit facilities which may be chosen include term loan A (700), term loan B (800), term loan C (900), standby term loan (1000) or letter of credit facility (1100). Detailed information regarding the appropriate credit facility is solicited from the user depending upon the type of facility selected. The detailed program logic for two of these credit facilities is shown in FIGS. 6J to 6T (revolving credit facility), 6U to 6Z and 6AA to 6CC (term loan on closing date). Similar principles can be used to develop program flowcharts for the other credit facilities shown in FIG. 5, as will be apparent to those of skill in the art, but which will not be described in detail herein. Further, as the program flows of FIGS. 6J to 6Z and 6AA to 6CC are self explanatory, and embody all of the techniques heretofore and hereafter described herein, a separate detailed description of these illustrated program flows will not be provided.

As an example, however, of the illustrated program flows, if a revolving credit facility (RCF) is selected, for example, see routine 400 of FIG. 5 and step 6J1 of FIG. 6J, the appropriate Autotext relating to a revolving credit facility is inserted into the document. See step 6J2 of FIG. 6J. At another point, the user is presented with a form screen as shown in FIG. 23 which allows the user to select from multiple items from a list using check box controls. See step 6K1 of FIG. 6K. The user can select more than one of the items listed in the check box. As discussed, the check box form shown in FIG. 23 is being used for soliciting information regarding the borrowing base of a revolving credit facility. However, the same type of check box control form can be used for soliciting other information.

The revolving credit facility portion FIGS. 6J to 6T of the program flow is illustrative of the operation of the invention. As previously discussed, the invention gives the user the ability to specify an approach to be taken to address a particular issue and then selects and modifies the user input screens based on the approach specified. In this case, the user has the option of using a revolving credit facility (RCF).

If the user opts for an RCF, then certain forms (screens) are presented requesting information relevant only to an RCF. If the user does not specify an RCF, information relevant to an RCF will not be requested. Thus, the queue of questions are dynamically altered in response to the approach taken, or put another way, in response to previous responses. Although the format of this form is not altered, the format of some forms can be altered. The text of the form is usually altered in response to the previous responses. The request for information from the program flow drives the form that is shown. Further, as illustrated in FIG. 6, not all user inputs result in immediate changes to the document. Some initially only determine the future requests for input, i.e., determine the forms and the content thereof, to be displayed subsequently.

The present invention thus provides a method and system for automatically generating a customized document by responding to a sequence of dynamically altered questions seeking information relevant to the preparation of the document. The system uses a program that allows logical functions to be employed at all stages of the program flow. Thus, the program initially provides a sequence of requests or questions. These requests solicit input which may require that logical functions be applied to information already received. At the stage when all information has been received necessary to modify a document, insofar as related to that information, the program invokes the Insert Text function to alter the document(optionally the program waits until all information has been received). Even at the stage of inserting text, the program may apply a logical function or functions to determine the text to be inserted. The logical functions can be used singly or in combination. Examples of the types of logical functions, without limitation, include SELECT CASE, IF THEN and loops and combinations of these. These logical functions are well known to those of skill in the art of computer programming. These logical functions can be implemented, as will be evident from reviewing FIG. 6, both in the Program Logic 10B and Insert Text 10C functions. Further, logical functions can be nested, or embedded, in other logical functions. For example, logical functions, such as SELECT CASE, are used to determine where in the program flow to go next. Logical functions are thereafter employed to process information already received or when inserting text into the document itself.

FIG. 24 shows a formatted form which allows the user to enter a numerical amount, for example, a dollar amount of a loan, using a number of drop down lists for number amounts. According to the invention, this form will populate all windows to the right (less significant digits) of the entry window with zeros. Thus, for example, if the amount of the loan is two million dollars, as shown, zeros will be entered automatically to the right of the window at which the 2 has been selected, including digits to the right of the decimal point.

FIG. 25 shows another form which can be used to allow the user to specify a certain number of periods including months and dates. Thus, the user can enter a starting and an ending period. The periods entered will automatically configure the format of other forms regarding these periods which are displayed later.

FIG. 26 shows another form for entering periods, in this case, for entering periods which are described, in words, instead of by dates. For example, the user may state that a period begins a certain amount of time after closing and ends another certain amount of time after closing. Alternatively, the periods may be specified as beginning on the second Tuesday of a certain month and ending on another specified day of a certain month.

FIG. 27 is an example of a form which allows a user to define an amortization schedule. The schedule can be set by date the payment must be made or by the number of each payment. The user then sets the amount for each period. As shown in FIG. 27, the payment amounts can be selected using drop down lists and the windows to the right of the selection are automatically populated by zeros or the drop down lists can be utilized to select the appropriate numerical entry. The program also preferably performs mathematical calculations to determine if the individual payment amounts are correct, e.g., determining that the payment amounts add up to the proper total.

FIG. 28 shows another form which can be use to specify periods and amounts available under a credit facility, in this case, a revolving credit facility. However, as discussed, the same form may be used for entry of other data in connection with other credit facilities.

FIG. 28 is illustrative of the system's ability to dynamically change the requests for user inputs as well as make alterations to the document. As shown in FIG. 28, the user has previously specified that there will be three periods with different amounts available under the RCF. The content of the form of FIG. 28 has been dynamically altered in response to that prior input to display the three periods and the amounts available. The Insert Text function will also dynamically modify the document 40 to indicate that there are three periods and to specify the amounts available in each period.

It is also possible to select multiple credit facilities, in which case the form of FIG. 29 may be utilized. This form is used to allow the user to select the credit facilities the user wants in a commitment letter. Certain credit facilities have radio buttons and others have check boxes. Some facilities will not allow the selection of other facilities whereas others will allow it.

Once the information concerning the particular credit facility has been entered (routines 300–110 completed) and the document modified, with any confirmation dialogs at the appropriate points as shown in FIGS. 6J to 6Z and 6AA to 6CC, a portion of the flow identified as "Use of Proceeds" is entered. In the use of proceeds portion, the user specifies the use of the loan proceeds. This is indicated by 1200 and 1300 in FIG. 5. The detailed program flow is shown in FIGS. 6DD to 6QQ. Once the document has been modified to specify the use of the proceeds in general as it applies to each selected credit facility, the program flow is to routines 1400 and 1500 of FIG. 5 where the applicable interest rate information is obtained, for example, the interest rate that applies, such as prime rate only, base only or some combination of prime and base, etc. Further, information is requested of the user concerning pricing and letter of credit fees. This is shown by routine 1500 of FIG. 5. Once all interest rate and letter of credit fee information is obtained, and any other fee information (1600) is provided by the user, the user is prompted for information regarding any prepayments (1700). All of the underlying substantive provisions relating to these sections of the document are well known to preparers of commercial loan commitment letters. Further, those of skill in the art of computer programming, given knowledge of the substantive provisions of loan commitment letters, could generate the program for obtaining the information necessary to generate the corresponding provisions of the document based on the disclosure contained herein. The disclosure herein could also be used to generate the program for preparing and generating other types of documents.

The user is thereafter prompted for information regarding parties 1800, guarantees 1900, collateral 2000, conditions precedent 2100, representation of warranties 2200, covenants 2300, 2400, 2500 and 2600, events of default 2700, and miscellaneous provisions 2800. These provisions are all known to preparers of commercial loan commitment documents, and those of skill in the art of computer programming can construct the program flow necessary to generate such provisions for inclusion in the document and to obtain the information to insert into these provisions based on the principles disclosed and illustrated herein. Further, similar principles can be applied to the generation of other types of documents, i.e., documents other than commercial loan commitment letters. For example, the invention could be used to prepare real estate contracts or trusts and wills, etc., or other documents that are legal or non-legal in nature.

Throughout the program flow, the template of FIG. 8 is used to modify the document at appropriate points with text being entered into the document at the appropriate points when all information necessary to effect the changes has been obtained. Confirmation dialogs may be presented to the user at appropriate points prior to alteration of the document.

In the miscellaneous (2800) portion of the program flow, certain miscellaneous items such as provisions related to tax, governing law, jury trial, jurisdiction, etc., are selected, as known to those of skill in the art of preparing such documents. Fields are updated to reflect name selections and a cleanup program is operated to clean up the format of the generated document.

FIG. 30 shows the format of a form used for modifying a selection, called Form Edit Record. It shows the contents of a data base record the user has selected. If the record is not static, the user will be allowed to make changes to the record either permanently or for this specific transaction. As shown in FIG. 30, this form includes buttons allowing changing the selection for the particular transaction as indicated at A, changing the selection permanently at B and returning to a previous list at C.

FIG. 30 illustrates the ability of the system of the invention to modify existing textual provisions while the program is running and either use the modified provision only once in connection with the preparation of a specific document or permanently modify the underlying provision. While running the program, the user can thus access the underlying textual provision to modify it to fit the requirements of the particular document being created. The modified provision can be used once or can become a permanent change.

Further, using the same screen (FIG. 30), the user can add alternative textual provisions. The user has the ability to add alternative choices to the list of textual provisions to be inserted into the document and these provisions can either be used only once in connection with running the program for a single document or can be saved to become additional alternative choices for future uses of the program for the generation of other documents. Single use provisions are added while the program is being used. Permanent additions can be added by making the additions directly to the data base while running the program.

In addition to being able to add alternative textual provisions in the data base, the user also has the ability according to the system of the invention to make permanent additions to the underlying template, shown in FIG. 8. The user can directly add to the underlying template any provisions that will always be included in the document.

FIG. 31 shows an example of a form which can be used for maintenance of the data base tables. In the case shown, the table of officers of a party is presented for modification. This screen can be used to edit the records of any given table. This form is called if the user wants to add a permanent item to any drop-down list. Maintenance of the data base tables can be performed directly by the user without running the program.

FIG. 32 shows the format of a form by which the user selects a table to be edited. A drop down menu appears listing all data base tables. Illustrated is the listing for the "City" table. To edit the table, the user clicks on "Edit table" and a form allowing editing of the selected Table (like FIG. 31) is displayed.

Although the invention has been described with reference to a word processing, application and a database application, other applications can also be employed, such as any other applications in Microsoft Office, for example, the Microsoft Excel spreadsheet can also be imported.

As discussed herein, the user is able to access certain portions of the program 10 directly from the document created by the program to run portions of the program 10 to modify the document. This can be done by generating mini-applications created using Visual Basic to address selected portions of the document so that the same type of logic and functionality used in the program 10 are employed.

Further, the database can also store, for any alternative provision, commentary to assist the user in using such provision in the document. Such commentary is displayed in the form together with the alternative provision.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A system for automated drafting of a customized document, the system interfacing with a word processing application having a plurality of word processing functionalities and with a data base having a plurality of data base functionalities, the system comprising:

a user interface and controller comprising a programming environment having a plurality of programming functionalities;

the user interface and controller interfacing with a user by presenting a sequence of requests to the user so that the user provides information necessary to prepare the document;

the user interface and controller communicating with the data base whereby the data base supplies first and second data stored in the data base to the user interface and controller, the first data being provided to the user interface and controller for providing a format for the requests to the user and the second data being provided to the user interface and controller for preparing text in the document;

the user interface and controller and the word processing application communicating so that the user interface and controller controls the word processing application to prepare and generate the document, the user interface and controller using combinations of the programming fuctionalities to prepare and generate the document;

wherein the user interface and controller comprises a program for providing the sequence of requests to the user to obtain the information from the user for the preparation of the document and further for manipulating the document using the word processing application in response to the information received from the user and the second data from the data base to draft the contents of the document, and further wherein the sequence of requests is dynamically altered by the program in response to the information provided in response to previous requests, the program determining the next request of the dynamically alterable sequence of requests to be provided to the user and when and how to manipulate the document to draft the contents of the document, the sequence of requests being such that each request is the logical extension of information provided by the user in response to previous requests and each request that is not the logical extension of information provided by the user in response to previous requests is omitted;

further wherein the sequence of requests is presented to the user by screen displays from a plurality of screen displays comprising a plurality of forms presenting the requests to the user;

further wherein the screen displays each having a specified format, the format of at least one form comprising at least one dynamically alterable request and an entry area for responding to the at least one request; and further wherein the data base comprises a plurality of alternative provisions for the document, and wherein the program evaluates the alternative provisions in response to information provided by the user in response to the requests to determine which of the provisions to display in a form of the plurality of forms; and wherein the program dynamically alters the document in response to information provided by the user in response to the sequence of requests to modify the document to present the information provided by the user.

2. The system of claim 1, further wherein the user interface and controller directly manipulates the document to prepare and generate the document.

3. The system of claim 1, wherein the word processing application includes a template containing text that is unaltered as well as at least one location in the template defining a location in the document for the insertion of text into the document by the word processing application.

4. The system of claim 3, wherein the user can manipulate the template to make changes to the template.

5. The system of claim 4, wherein the changes are optionally permanent.

6. The system of claim 1, wherein the data base provides said second data to the user interface and controller in response to commands from the user interface and controller, the user interface and controller inserting said second data into the document either directly or by instructing the word processing application.

7. The system of claim 1, further wherein the data base provides said second data to the word processing application in response to commands from the user interface and controller, the word processing application inserting said second data into the document.

8. The system of claim 1, further wherein the data base provides said second data directly into the document in response to commands from the user interface and controller.

9. The system of claim 1, wherein the first data provided by the data base to the user interface and controller for providing a format for the requests to the user comprises data used in determining the form of the plurality of forms displayed and the content of the form displayed to solicit information from the user to prepare the document.

10. The system of claim 1, wherein the forms are dynamically alterable in response to information provided in response to previous requests.

11. The system of claim 10, wherein the program executes at least one logical function.

12. The system of claim 11, wherein the program comprises a program logic and an insert text function that responds to the program logic to insert text into the document upon command when the program logic has received all information relating to a specified provision of the document.

13. The system of claim 12, wherein each of the program logic and insert text function execute at least one logical function.

14. The system of claim 12, wherein each of the program logic and insert text function and forms execute at least one logical function based on information obtained from the user in response to the forms.

15. The system of claim 12, wherein the insert text function modifies the document at all locations affected by the information relating to a specified issue in the document.

16. The system of claim 12, wherein the insert text function returns control to the program logic once text has been inserted into the document.

17. The system of claim 12, wherein the insert text function manipulates the document by providing instructions to the word processing application to manipulate the document.

18. The system of claim 12, wherein the insert text function directly manipulates the document.

19. The system of claim 15, wherein the program logic controls the data base to obtain the second data from the data base for displaying in a respective form at least one textual provision for insertion into the document.

20. The system of claim 11, wherein the program executes a plurality of logical functions or combinations of logical functions.

21. The system of claim 20, wherein the plurality of logical functions include the SELECT CASE function of Visual Basic.

22. The system of claim 1, wherein the forms communicate with the data base to obtain information necessary for preparation of the document and the data base provides said first data to the forms necessary to prepare a respective form to solicit information from the user for the preparation of the document.

23. The system of claim 1, wherein the document comprises a finance commitment letter.

24. The system of claim 1, wherein the user interface and controller comprises a programmed computer executing an application created using Visual Basic.

25. The system of claim 24, wherein the word processing application comprises Microsoft Word.

26. The system of claim 1, wherein the program includes at least one confirmation dialog to interface with the user to confirm at least one response to a previous request.

27. The system of claim 26, wherein after a user confirms that at least one response to the confirmation dialog is correct, the document is manipulated to alter the document in response to the information that is the subject of the confirmation dialog.

28. The system of claim 1, wherein the program allows the user to generate at least one alternative provision for insertion into the document.

29. The system of claim 28, wherein the user has the option to use the at least one alternative provision once or can save the alternative provision permanently for future use.

30. The system of claim 29, wherein a single use provision is inserted into the document and not saved.

31. The system of claim 30, wherein a saved provision for future use is added to the data base.

32. The system of claim 1, wherein the program includes text for insertion into the document.

33. The system of claim 1, wherein the data base has stored therein alternative provisions for insertion in the document.

34. The system of claim 1, wherein alternative textual provisions in the data base for the document are accessible by the user for modifying the alternative textual provisions or adding a further alternative textual provision.

35. The system of claim 34, wherein the user can access directly the alternative textual provisions in the data base when not responding to the sequence of requests.

36. The system of claim 1, wherein the forms comprise at least one form having at least one entry location for inserting a monetary amount, and wherein the entry location is divided into a plurality of fields of increasing order, so that the user can insert a number into a selected field of highest selected order without inserting a number into lower order fields and wherein the lower order fields are automatically populated with a zero in the absence of user insertion of a number into such lower order fields.

37. The system of claim 1, wherein the forms comprise at least one form allowing a user to input a date, the form comprising at least one entry area for month, day and year.

38. The system of claim 1, wherein the data base comprises Microsoft Access.

39. The system of claim 1, wherein the system comprises a general purpose digital computer having included therein the user interface and controller, the word processing application and the data base, the user interface and controller, word processing application and data base comprising software.

40. The system of claim 1, wherein the word processing application embeds in the document code to enable the user to continue modifying the document using only the word processing application.

41. The system of claim 1, wherein the program allows the user to make changes directly in the document while the sequence of requests is being presented to the user.

42. The system of claim 1, wherein the sequence of requests are dynamically alterable such that the user is not provided any redundant requests for information and any requests for information inconsistent with responses to previous requests.

43. The system of claim 1, wherein the system manipulates the document as requests are being presented to the user.

44. The system of claim 43, wherein the user interface and controller provides a simultaneous display to the user showing the requests to the user and at least a portion of the document as it is being prepared.

45. The system of claim 1, wherein the program determines and directs the word processing application as to where in the document textual provisions are to be inserted, locations for the insertion of the textual provisions in the document being dynamically added or changed by the program directing the word processing application.

46. The system of claim 1, further wherein the program includes at least one mathematical calculation routine.

47. The system of claim 1, wherein the database optionally stores a table of responses to the requests to prepare a document, wherein the table of responses can be displayed to a user so that the user can change responses to selected ones of the requests, the program allowing the user to change selected responses whereby the document is redrafted based on the responses including the changed responses.

48. The system of claim 1, wherein the database stores, together with selected alternative provisions, commentary to assist the user in using such alternative provisions in the document and further wherein such commentary is displayed in a form of the plurality of forms associated with the alternative provisions.

* * * * *